US010620898B2

(12) United States Patent
Mabey et al.

(10) Patent No.: US 10,620,898 B2
(45) Date of Patent: Apr. 14, 2020

(54) METHOD TO EXCHANGE VISUAL ELEMENTS AND POPULATE INDIVIDUAL ASSOCIATED DISPLAYS WITH INTERACTIVE CONTENT

(71) Applicant: QuirkLogic, Inc., Calgary (CA)

(72) Inventors: Michael Howatt Mabey, Calgary (CA); Alfonso Fabian de la Fuente, Victoria (CA); Nashirali Samanani, Calgary (CA)

(73) Assignee: QuirkLogic, Inc., Calgary (CA)

( * ) Notice: Subject to any disclaimer, the term of this patent is extended or adjusted under 35 U.S.C. 154(b) by 0 days.

(21) Appl. No.: 16/066,964

(22) PCT Filed: Dec. 23, 2016

(86) PCT No.: PCT/CA2016/051536
§ 371 (c)(1),
(2) Date: Jun. 28, 2018

(87) PCT Pub. No.: WO2017/117656
PCT Pub. Date: Jul. 13, 2017

(65) Prior Publication Data
US 2019/0026063 A1    Jan. 24, 2019

Related U.S. Application Data

(60) Provisional application No. 62/275,133, filed on Jan. 5, 2016.

(51) Int. Cl.
*G06F 3/14* (2006.01)
*G06F 3/0483* (2013.01)
(Continued)

(52) U.S. Cl.
CPC ............ *G06F 3/1446* (2013.01); *G06F 3/017* (2013.01); *G06F 3/0483* (2013.01);
(Continued)

(58) Field of Classification Search
CPC .. G06F 3/1446; G06F 3/04883; G06F 3/1454; G06F 3/017; G06F 3/0483;
(Continued)

(56) References Cited

U.S. PATENT DOCUMENTS

| | | | |
|---|---|---|---|
| 2004/0201628 A1* | 10/2004 | Johanson | G06F 3/023 715/764 |
| 2010/0179991 A1* | 7/2010 | Lorch | H04M 1/7253 709/206 |

(Continued)

OTHER PUBLICATIONS

International Search Report and Written Opinion issued in corresponding International Application No. PCT/CA2016/051536, dated Mar. 17, 2017. (9 pages).

(Continued)

*Primary Examiner* — Andrew Sasinowski
(74) *Attorney, Agent, or Firm* — Chamberlain, Hrdlicka, White, Williams & Aughtry

(57) ABSTRACT

In general, embodiments of the invention relate to a method for propagating content. The method includes detecting, from a user, an input on a device, interpreting the input to identify a command, and displaying, in response the command, updated content on the device. The method further includes making a determination, based on the command, that content displayed on at least one other device is to be updated. The method further includes, in response to the first determination, generating a command message based at least in part on the command, and transmitting the command message to a workspace management system (WMS), where the at least one other device is operatively connected to the WMS.

20 Claims, 36 Drawing Sheets

(51) Int. Cl.
*G06F 3/01* (2006.01)
*G06F 17/21* (2006.01)
*G06F 17/24* (2006.01)
*G09G 5/14* (2006.01)
*G06F 15/00* (2006.01)
*G06F 17/22* (2006.01)
*G06F 3/147* (2006.01)
*H04L 12/18* (2006.01)
*G06F 3/0488* (2013.01)
*H04L 12/58* (2006.01)

(52) U.S. Cl.
CPC ........ *G06F 3/0488* (2013.01); *G06F 3/04883* (2013.01); *G06F 3/14* (2013.01); *G06F 3/147* (2013.01); *G06F 3/1423* (2013.01); *G06F 3/1438* (2013.01); *G06F 3/1454* (2013.01); *G06F 3/1462* (2013.01); *G06F 15/00* (2013.01); *G06F 17/217* (2013.01); *G06F 17/2235* (2013.01); *G06F 17/242* (2013.01); *G09G 5/14* (2013.01); *H04L 12/1827* (2013.01); *G06F 2203/04803* (2013.01); *G09G 2340/04* (2013.01); *G09G 2340/045* (2013.01); *G09G 2340/0407* (2013.01); *G09G 2370/022* (2013.01); *G09G 2370/04* (2013.01); *G09G 2370/10* (2013.01); *G09G 2370/16* (2013.01); *H04L 51/10* (2013.01)

(58) Field of Classification Search
CPC .. G06F 17/242; G06F 17/2235; G06F 17/217; G06F 3/147; G06F 3/1462; G06F 3/1438; G06F 3/1423; G06F 15/00; G06F 3/14; G06F 2203/04803; H04L 12/1827; H04L 51/10; G09G 5/14; G09G 2370/04; G09G 2370/022; G09G 2340/045; G09G 2340/0407; G09G 2340/04; G09G 2370/10; G09G 2370/16

See application file for complete search history.

(56) References Cited

U.S. PATENT DOCUMENTS

| | | | |
|---|---|---|---|
| 2013/0067420 A1* | 3/2013 | Pittappilly | G06F 3/0236 715/863 |
| 2015/0116367 A1 | 4/2015 | Yada | |
| 2015/0200985 A1* | 7/2015 | Feldman | H04L 67/36 715/753 |

OTHER PUBLICATIONS

Extended European Search Report issued in corresponding European Application No. 16882826.7, dated May 27, 2019.

* cited by examiner

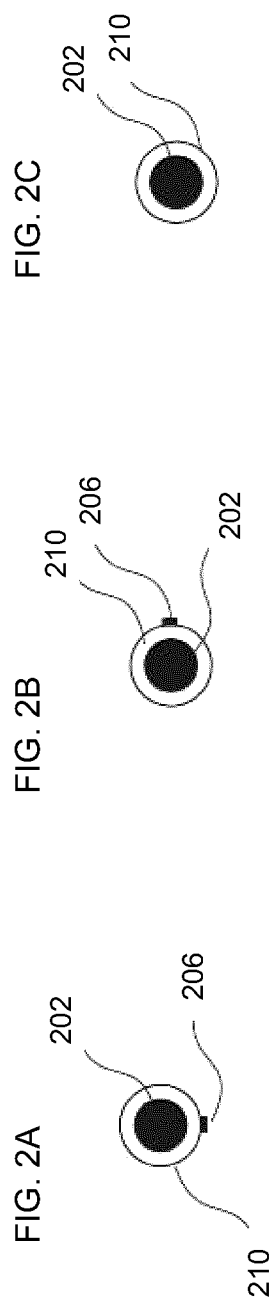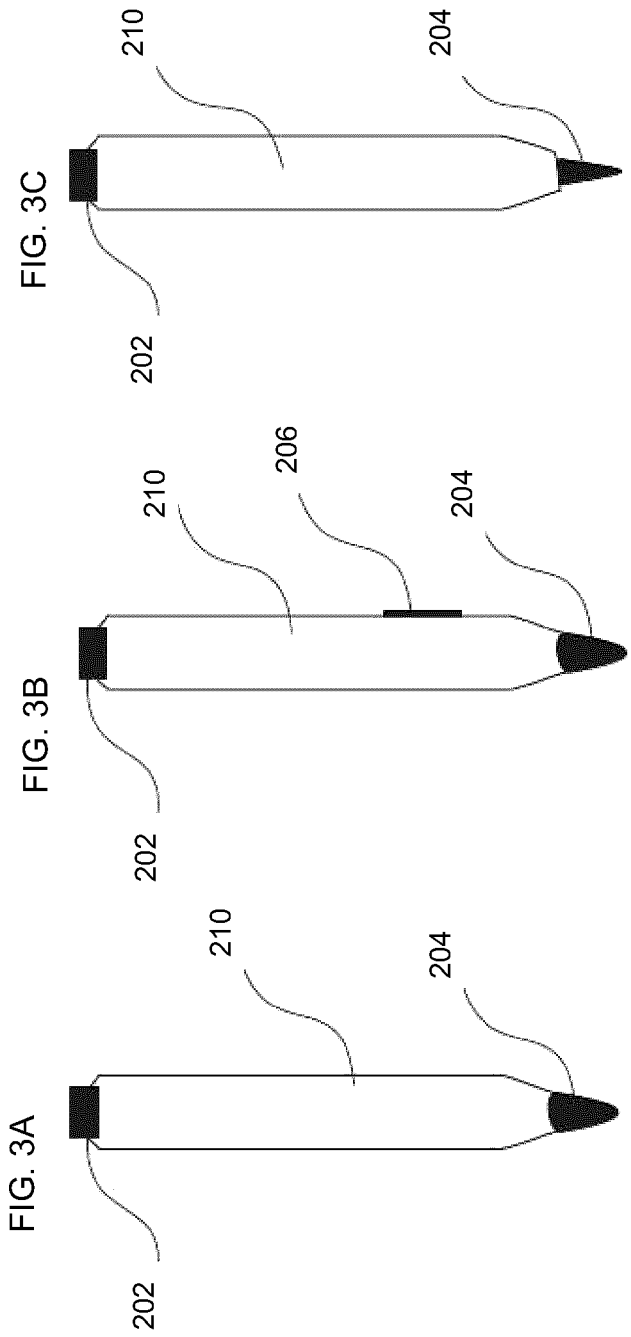

METHOD TO EXCHANGE VISUAL ELEMENTS AND POPULATE INDIVIDUAL ASSOCIATED DISPLAYS WITH INTERACTIVE CONTENT

CROSS-REFERENCE TO RELATED APPLICATIONS

This application claims priority under 35 U.S.C. § 119(e) to U.S. Provisional Patent Application Ser. No. 62/275,133, filed on Jan. 5, 2016, which is incorporated herein by reference in its entirety.

BACKGROUND

Flipcharts have not changed significantly for over 100 years. To this day, it is very common for any meeting room to have some form of a flipchart for writing notes or sharing ideas. Use of the flipchart has been augmented by blackboards and/or whiteboards for presenting information. These tools continue to thrive in the office environment despite the introduction of digital projectors, interactive displays, laptops, and mobile phone technology. Whiteboards and flipcharts are advantageous because they are transparent to users, they are easy to set up and use, and have no technological barriers. Although technology has now advanced in the office environment, whiteboards and flipcharts are fundamentally unchanged.

SUMMARY

In general, embodiments of the invention relate to a method for propagating content. The method includes detecting, from a user, an input on a device, interpreting the input to identify a command, and displaying, in response the command, updated content on the device. The method further includes making a determination, based on the command, that content displayed on at least one other device is to be updated. The method further includes, in response to the first determination, generating a command message based at least in part on the command, and transmitting the command message to a workspace management system (WMS), where the at least one other device is operatively connected to the WMS.

In general, in one aspect, the invention relates to a method for propagating content. The method includes detecting, from a user, an input on a device, interpreting the input to identify a command, generating a command message based at least in part on the command, transmitting the command message to a workspace management system (WMS), after transmitting the command message to the WMS, receiving a second command message from the WMS, and displaying updated content on the device in response to processing the second command message, wherein the second message comprises content identification information.

Other aspects of the invention will be apparent from the following description and the appended claims.

BRIEF DESCRIPTION OF DRAWINGS

FIGS. 2A-2C show hardware for operating an electronic flipchart in accordance with one or more embodiments of the invention.

FIGS. 3A-3C show hardware for operating an electronic flipchart in accordance with one or more embodiments of the invention.

DETAILED DESCRIPTION

Figure 1:
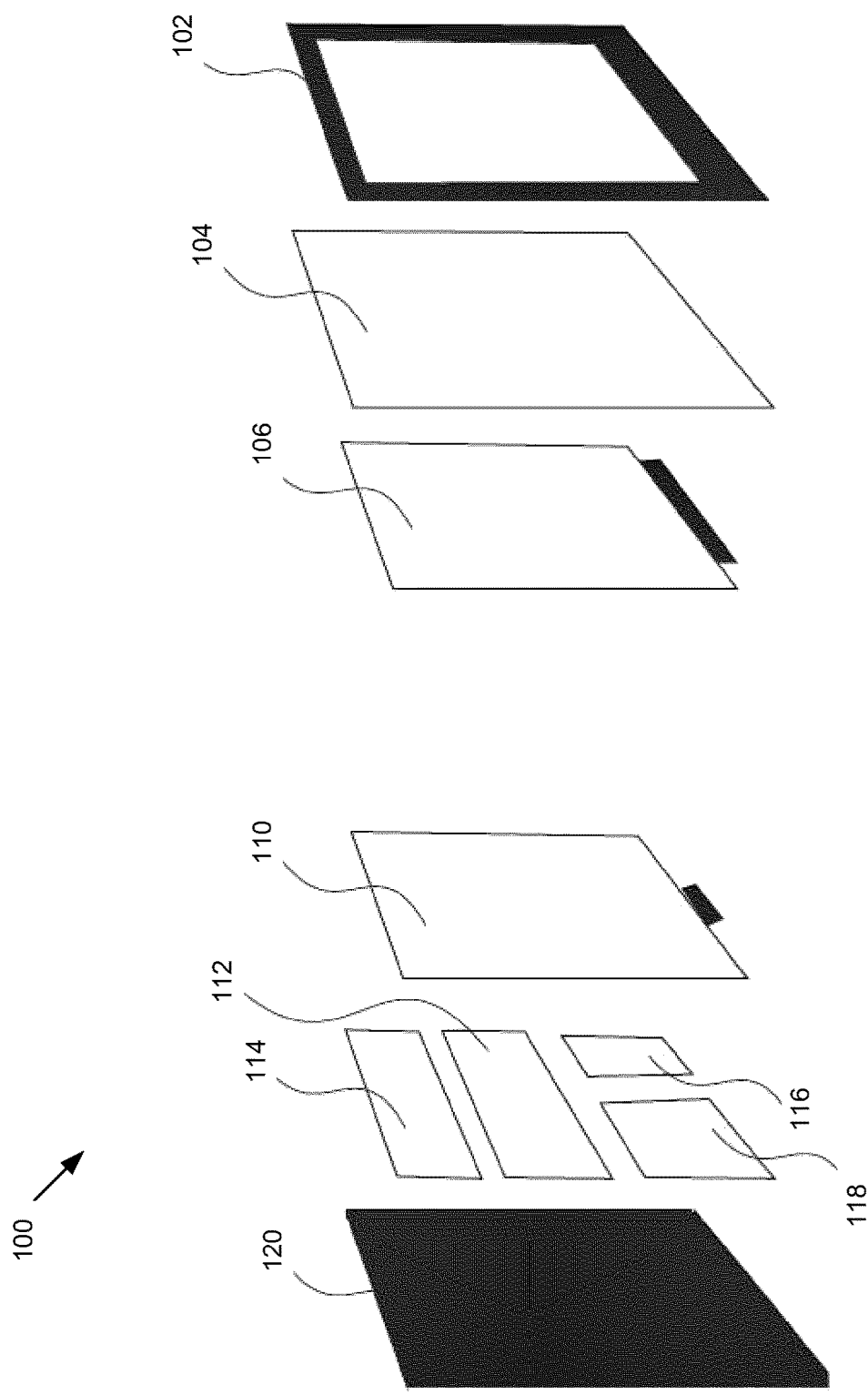
FIG. 1 shows an apparatus in accordance with one or more embodiments of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any elements to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-32B, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method for propagating content across a plurality of interactive devices. More specifically, one or more embodiments of the invention pertain to the interpretation of user input to update content throughout one or more device(s). User input, in the form of a touchscreen hand gesture, a digital pen gesture, and/or direct manipulation of a user interface (UI) control component, may trigger an assortment of updating and content propagation options.

Interactive devices as used in embodiments of the present disclosure may include, for example, e-flipchart apparatuses, smart phones, tablets, laptops, desktop computers, interactive white boards, gaming devices, electronic book readers, computer integrated monitors, smart televisions, or any other interactive computing device having a display area or screen for displaying content.

In the description below, FIGS. 1-10 describe one form of an interactive device, i.e., the e-flipchart apparatus, in accordance with embodiments of the invention. The invention is not limited workspaces that only include interactive devices that are e-flipchart apparatuses as described in FIGS. 1-10 below. FIGS. 11-20B are directed to the interaction of multiple interactive devices in a multi-device workspace in one or more embodiments of the invention. FIGS. 21A-32B are directed to displaying content and propagating content between devices in a multi-device workspace in accordance with one or more embodiments of the invention.

Turning to the FIGS. 1-10, one or more embodiments of the invention are directed to a method and apparatus for an electronic flipchart (herein after referred to as "e-flipchart"). The e-flipchart incorporates a reflective display. The e-flipchart described in embodiments herein may be implemented in a manner that is described as always "on" i.e., ready to use, and includes capability to keep a record of what is drawn or written on the e-flipchart. In one or more embodiments of the invention, the e-flipchart is configured to accept multiple forms of input, e.g., touch input, digital marker input, network input, etc. (see e.g., FIG. 6).

FIG. 1 shows a schematic diagram of an apparatus of an e-flipchart (also referred to as an e-flipchart apparatus) in accordance with one or more embodiments of the invention. While FIG. 1 shows a configuration of components, other configurations may be used without departing from the scope of the invention. For example, various components may be combined to create a single component. As another example, the functionality performed by a single component may be performed by two or more components.

Turning to FIG. 1, in accordance with one or more embodiments of the invention, the apparatus (100) may include one or more hardware elements, each having specific functionality. The main structure of the e-flipchart apparatus is formed between a back panel (120) and a front frame (102). In one or more embodiments of the invention, the front frame is a clear, opaque, or translucent material and includes an active area on which content may be displayed. In one or more embodiments of the invention, the back panel (120) is a rigid mechanical support structure made of a solid material, for example, plastic or metal. In between the back panel (120) and the front frame (102) is a low-power, reflective display (106). In one embodiment of the invention, the reflective display (106) may be viewed as an output device that, through reflection, harnesses ambient light in order to present content. For example, the reflective display (106) may host slow refresh rates, monochromatic coloring (e.g., black and white, or gray scale shading), and the presentation of low contrasting definition. However, on the other hand, the reflective display (106) may have one or more of the following features: (i) very low power consumption; (ii) the readability of content outdoors under sunlight; and (iii) the providing of strain relief on the eyes of a user. As such, in one embodiment of the invention, fundamental static digital media, such as monochromatic text and still images, may be delegated to a reflective display (106) for presentation. Examples of a reflective display include, but are not limited to, a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., Flap Display, digital micro-mirror device).

In one or more embodiments of the invention, at least one portion of the reflective display (106) of the e-flipchart apparatus may be bi-stable. In one embodiment of the invention, the reflective display may correspond to the reflective displayed described in U.S. Pat. No. 5,930,026. The invention is not limited to the reflective display described in the above referenced patent.

Continuing with the discussion of FIG. 1, in front of the reflective display (106) is a layer having at least one touch portion which may be a transparent rigid or semi-rigid board (104), or a frame that uses edge sensors, such as Infrared or optical sensing technology. In another embodiment, the layer having at least one touch portion (104) may be a capacitive film layer. In one or more embodiments, the layer having at least one touch portion (104) may only cover a portion of the reflective display, with the remaining surface area of the reflective display (106) being covered by non-touch sensitive material which may or may not be clear, opaque, translucent, transparent and/or non-transparent. In the back of the reflective display (106) is an optional electromagnetic layer, which may be an electromagnetic board (110). By combining the electromagnetic layer (110) and the layer having at least one touch portion (104), at least a dual system for touch input is obtained. In one or more embodiments, touch input may include a finger(s) and/or a touch by a digital marker or digitizer.

In one or more embodiments of the invention, the electromagnetic layer (110) is configured to generate an electromagnetic field capable of detecting a digital marker or digitizer (see e.g., FIGS. 2A-3C) when such a tool is used to provide an input to the e-flipchart. The electromagnetic layer (110) includes wires (not shown) that allows the electromagnetic layer (110) to transmit and detect input signals. In one or more embodiments of the invention, the electromagnetic board (110) is configured to determine a position of the touch input (described above) on the e-flipchart by detecting pressure or changes in the generated electromagnetic field caused by a designated portion of the touch input, for example, the tip of a digital marker and/or pressure applied by one or more fingers.

In one or more embodiments of the invention, the front frame (102) includes an active area or region with an active display, and an active input method that includes at least two input capabilities: the ability to detect a digital marker or digitizer and the ability to accept touch input from one or more finger touch points. Further, the apparatus (100) is configured to respond to each detected input type (see e.g., FIG. 6). For example, detecting a digital marker input may result in a line being drawn on the reflective display, while touching the same area with a finger may pan or zoom the display area.

Continuing with FIG. 1, controller (114) includes hardware and software/firmware to control the overall operation of the e-flipchart. More specifically, the controller (114) may include one or more processors (CPUs), persistent storage, and/or volatile memory. Persistent storage may include, for example, magnetic storage, optical storage, solid state storage (e.g., NAND Flash, NOR Flash, etc.), or any combination thereof. Volatile memory may include RAM, DRAM, or any combination thereof. In one or more embodiments of the invention, all or a portion of the persistent storage and/or volatile memory may be removable. In one or more embodiments, the persistent storage may include software instructions for executing operations of the e-flipchart. Specifically, the persistent storage may be configured to store software and/or firmware specific to e-flipchart operations. In one or more embodiments of the invention, the built-in CPU/processors of the controller (114) may execute an operating system and the software which implements e-flipchart functionality.

The controller (including components therein) (114) is powered by a battery and/or a power supply (112). In one or more embodiments, controller (114) is configured to detect and process input signals. For example, when an object touches the layer having at least one touch portion (104), a signal is sent to the controller (114) for detection of the input type and processing of the input. Further, the controller is configured to store e.g., in persistent storage and/or volatile memory, each stroke (in the form of touch input or digital marker) after such an action is performed on the e-flipchart (100) (see e.g., FIG. 6). In other words, the controller (114) is configured to store each stroke or action as it is produced in the active area of the front frame (102) of the e-flipchart apparatus (100). In one or more embodiments of the invention, the controller (114) includes functionality to implement the methods shown and described in FIGS. 6-8. Further, while the controller (114) has been described as a combination of hardware and software, the controller may be implemented entirely within hardware without departing from the scope of the invention.

In one embodiment of the invention, the e-flipchart may include one or more external communication interfaces (116). The communication interfaces permit the e-flipchart to interface with external components. The communication interfaces may implement any communication protocol, for example, Bluetooth, IEEE 802.11, USB, etc. The invention is not limited to the aforementioned communication protocols.

In one or more embodiments of the invention, the apparatus (100) of FIG. 1 is a lower-power reflective device that only draws power from the battery/power supply (112) when there is a screen refresh with new information displayed or when a user is drawing or inputting information in the apparatus. In other words, while the apparatus (100) is "always on" and in a mode that is ready to detect an input, the apparatus is in a low power state. When an input is detected by the apparatus (100) on the active area of the front frame (102), the e-flipchart apparatus is configured to change from the low power state to an active state and perform the methods described in FIGS. 6 and 8.

In one or more embodiments of the invention, the e-flipchart apparatus may be deemed to be in an active state when some or all the components on the e-flipchart apparatus are working accepting pen, touch, keyboard and LAN input, processing applications and/or saving data (and/or metadata) to memory. In the active state, the components of the e-flipchart apparatus are drawing energy from the controller (114). In contrast, the e-flipchart apparatus may be deemed to be in a low power state, (or ready-mode) when no pen, touch, keyboard or LAN inputs are detected (for at least a pre-determined period of time), but the apparatus still shows the last content displayed on it (or displays no content). In ready-mode, CPU processes are minimized, scan rate of finger and pen inputs are delayed and overall power consumption of the components in the e-flipchart apparatus are reduced, for example, by at least 50%. Power consumption may be reduced by a different amount without departing from the invention. For example, only the battery and the controller may be drawing power in ready-mode, reducing the overall power consumption of the e-flipchart apparatus to 40% relative to the power consumption of the e-flipchart apparatus when it is in the active mode. The management of the amount of power that is provided to components of the e-flipchart apparatus and the frequency of polling for input is performed by the controller (114). Specifically, the controller (114) may include an energy management process configured to control the state of various components of the e-flipchart apparatus based on whether the e-flipchart apparatus is in ready-mode or in the active mode.

To contrast the two states of the e-flipchart apparatus, in one or more embodiments of the invention, when the reflective display is in ready-mode, the polling for input occurs at a low frequency, for example, the apparatus may scan for input 2-10 times per second. However, once an input is detected by the apparatus, the apparatus may transition to an active state and increase polling to a higher frequency, e.g., 60-120 times per second, in order to capture all the input that may be occurring on the reflective display. Other polling frequencies may be used in the active state and/or in the ready-mode without departing from the invention.

In one embodiment of the invention, the term "low power state" is intended to convey that the power consumption of the e-flipchart apparatus in this state is relatively lower (or less) than the power consumption of the e-flipchart apparatus in the active state.

Though not shown in FIG. 1, the e-flipchart apparatus may include a camera for detecting certain types of input, e.g., a gesture interpretation.

In one or more embodiments of the invention, the e-flipchart is configured to enable a user to create, modify, store, and share an e-presentation. An e-presentation is described below in FIG. 4.

In one or more embodiments of the invention, the apparatus (100) of FIG. 1 is approximately 42 inches in diagonal with a 3:4 aspect ratio. Those skilled in the art will appreciate that the size of the e-flipchart apparatus is designed to mimic that of a typical paper flipchart; however, the dimensions and size of the reflective display apparatus of FIG. 1 may vary without departing from the scope of the invention. For example, additional dimensions may include 32" 4:3 aspect ratio for a personal sized flip chart, and 55" or 60" for larger collaborative surfaces. Even larger surfaces may vary the aspect ratio to allow for more usable width, without adding unusable height, such as a 9:16 ratio for an 80" diagonal size.

While FIG. 1 describes an e-flipchart with a series of components organized in particular manner, those skilled in the art will appreciate that the location of such various components in the e-flipchart, in particular, the reflective display (106), the layer having at least one touch portion (104), and the optional electromagnetic layer (110) may be arranged in different order without departing from the invention.

FIGS. 2A-2C shows the hardware for the digital marker or digitizer that may be used as one type of input capable of being detected by the e-flipchart apparatus described in FIG. 1 above. Specifically, FIGS. 2A-2C show a top view of the digital marker in the form of a cylinder (210). The top of the digital marker has an electronic eraser (202) and at least one button (206). In one or more embodiments of the invention, the button (206) is software programmable and, when pressed or otherwise activated, is configured to send one or more signals to the e-flipchart. For example, when the button (206) is pressed or otherwise activated, the button (206) may send a wireless signal that is detected by the e-flipchart. Those skilled in the art will appreciate that the button (206) may be hidden or built into the electronic eraser (202). Further, although only one button is shown in FIG. 2A-2C, the digital marker may include more than one button, where each button is separately programmable. In one or more embodiments, when the electronic eraser (202) comes into contact with the e-flipchart, the e-flipchart is configured to remove or otherwise clear content from the corresponding locations on the reflective display. Said another way, the electronic eraser (202) mimics the operation of a traditional eraser.

FIG. 2B shows a different orientation (i.e., a side view with a zero degree rotation of the cylinder) of the digital marker or digitizer, in which the button (206) is located at the side of the electronic eraser (202) rather than at the bottom of the electronic eraser (202). FIG. 2C shows another top view of the digital marker, in which the cylinder is rotated 90 degrees. In FIG. 2C, the button (not shown) is hidden from view.

FIGS. 3A-3C depict side views of the digital marker or digitizer in accordance with one or more embodiments of the invention. In FIGS. 3A-3C, the entire length of the cylinder (210) form of the digital marker can be seen. In FIG. 3A, on a top end of the digital marker, the electronic eraser (202) is shown. In addition, the tip (204) of the digital marker or digitizer is shown on a bottom end of the cylinder (210). The tip (204) material may be selected such that the tip (204) slides easily over the writing surface. Materials for the tip (204) may include, but are not limited to, high density polyoxyethylene, hard felt, elastomer, polyoxymethylene, polyacetal, or polyoxyethylene. Other materials may be used without departing from the invention.

In one or more embodiments of the invention, the tip (204) of the digital marker may be used to draw or write directly on the active area of the front frame (102) of the e-flipchart apparatus. In FIG. 3B, the button (206) is shown on a side of the cylinder (210) of the digital marker. In FIG. 3C, the tip (204) of the digital marker is shown as being thinner and sharper in comparison with the tip of FIGS. 3A-3B. Those of ordinary skill in the art will appreciate that the tip (204) of the digital marker is a hardware component that may be interchangeable and designed to mimic a pencil, pen, marker, stylus, or any other suitable writing tool having varying widths and sharpness. In FIG. 3C, the button is not shown.

While FIG. 3A-3C show a cylinder shape for the digital marker, those skilled in the art will appreciate that the shape of the digital markers may take other forms without departing from the scope of the invention.

As described above, users of the e-flipchart are able to create, display, store, modify, and share e-presentations. Each e-presentation includes one or more pages organized in a sequential manner. The controller includes functionality to store the information necessary to maintain the e-presentation and allow the user to interact with the e-presentation as described below. An exemplary e-presentation is shown in FIG. 4.

Figure 4:
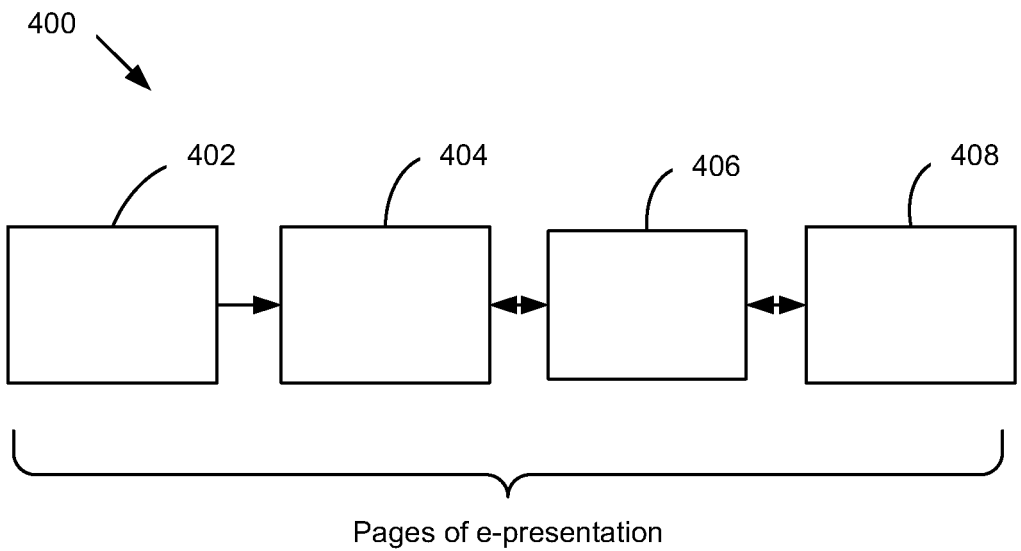
FIG. 4 shows a data structure for an electronic flipchart in accordance with one or more embodiments of the invention.

FIG. 4 shows an e-presentation (400) in accordance with one or more embodiments of the invention. The e-presentation may include one or more pages (402, 404, 406 408), where each page represents an electronic page of the e-flipchart. Each page of the e-presentation (400) corresponds to content that may be displayed on the e-flipchart apparatus. In one or more embodiments of the invention, the e-presentation (400) shown in FIG. 4 may be stored in memory or persistent storage associated with the e-flipchart apparatus or in a cloud computing environment to which the e-presentation is backed-up, or any combination thereof. For example, the e-presentation may be stored in persistent storage locally, and mirrored in the cloud environment.

In one or more embodiments of the invention, the e-pages (402, 404, 406, 408) are linked as the e-presentation is populated, in real-time. The link between the pages is represented by the bi-directional arrows shown in FIG. 4. Specifically, the link between pages of the e-presentation and the metadata stored to track the various information associated with the e-presentation is shown in FIG. 5.

Figure 5:
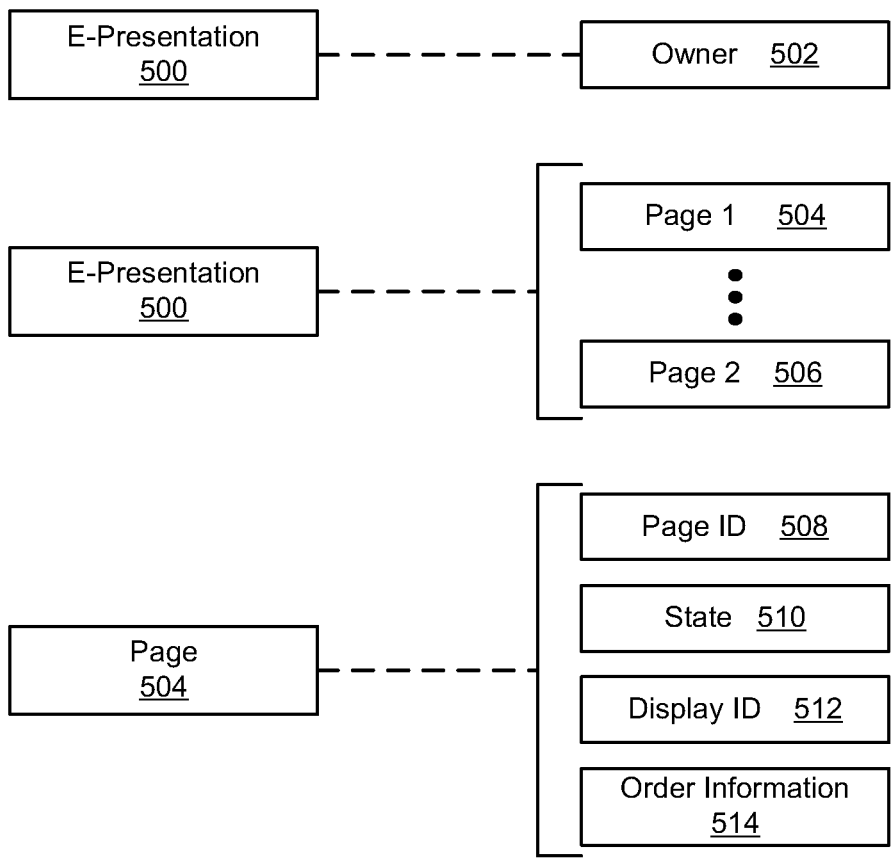
FIG. 5 shows data relationships for an electronic flipchart in accordance with one or more embodiments of the invention.

Specifically, in FIG. 5, each e-presentation (500) may be associated with an optional owner (502). In one or more embodiments of the invention, the owner (502) may be the entity or device on which the e-presentation is initially created. In this case, the owner (502) may be represented by a device ID which identifies the device on which the e-presentation is created. For example, when the e-presentation (500) is created on the e-flipchart apparatus, the owner (502) field may be populated with the local ID of the e-flipchart. Alternatively, the owner (502) may be an individual or group of individuals. In this case, the owner (502) may be represented by one or more user IDs. In one or more embodiments, although not shown, an e-presentation may also have permissions associated with the presentation as a whole, or each page of the e-presentation. Specifically, permissions to read/view/edit an e-presentation may be given by the owner (502) of the e-presentation (500), or by a user of the e-flipchart or other device that is specified as the owner of the e-presentation.

In addition, as shown in FIG. 4 above, the e-presentation (500) may be composed of one or more pages (e.g., Page 1 (504), Page N (506)). Each page (504, 506) is in turn associated with content (data) and metadata. For example, as shown in FIG. 5, page (504) has a page ID (508), a state (510), a display ID (512), and order information (514). The page ID (508) uniquely identifies that page in the e-presentation. The page ID (508) may be numerical, alphabetical, symbolic, or any combination thereof. In one embodiment of the invention, each page may be associated with a state (510). In such embodiments, the state (510) of the page (504) may be, but is not limited to, an active or an inactive state. An active state indicates that page (504) is currently displayed or being written to via the e-flipchart or via another device (see e.g., FIG. 10). An inactive state indicates that page (504) is part of the e-presentation but is not the page that is currently displayed (i.e., the page is not shown) or being written to. Those skilled in the art will appreciate that a page may be associated with other states without departing from the scope of the invention, such as for example, an edit state in which the page is being edited offline, or an offline state in which the page is linked to the e-presentation but is offline or stored in persistent memory.

In one embodiment of the invention, each page may be associated with a display ID (512). In such embodiments, the display ID (512) associates the page (504) with a display device. For example, in a scenario in which the page (504) is displayed on the e-flipchart, the display ID may be the ID of the e-flipchart. In an alternate embodiment, suppose page (504) is linked to an e-presentation currently being modified on the e-flipchart, but is not the active page of the e-presentation. In this case, the page (504) may be shared with second device over a network, so that the owner of the second device may edit the page (504) (see e.g., FIGS. 9A-9C, 10). In this scenario, the display ID (512) associated with the page (504) is the ID of the second device on which the page (504) is being edited. Accordingly, the display ID (512) of a page (504) linked to an e-presentation may change at any time. In one or more embodiments, there may be multiple display IDs (512), each one corresponding to a device that is currently viewing the page (504). Further, in one or more embodiments, the display ID may only be assigned when the state of a page is active. When the state of page is inactive, the display ID field in the data structure of the e-presentation may be null.

In one or more embodiments of the invention, the order information (514) of a page (504) links the page (504) to other pages in the e-presentation in a specific order and indicates how the pages of an e-presentation may be traversed. Specifically, the e-flipchart apparatus mimics use of a typical paper flipchart apparatus, in which a new page is obtained by flipping a current page over the flipchart apparatus. In the typical flipchart apparatus, the pages are flipped in an order, such that pages cannot be skipped to obtain a particular page of the e-presentation. Similarly, with the e-flipchart apparatus, each page (504) of the e-presentation may be linked to at least one page prior to the page (504) and at least one page following the page (504) in the e-presentation. In one or more embodiments of the invention, the order information (514) may include the page IDs of at least the page prior to the page (504) and the page following the page (504). Those skilled in the art will appreciate that the controller may facilitate skipping to a page out of order without departing from the scope of the invention.

In one or more embodiments of the invention, the metadata associated with an e-presentation, as shown in FIG. 5, may be populated and stored into a data structure as the e-presentation is created and modified. The data structure may then be stored locally in the e-flipchart apparatus persistent storage, or in a cloud computing environment. A specific example of how the data structure is populated is described in FIG. 8 below.

Figure 6:
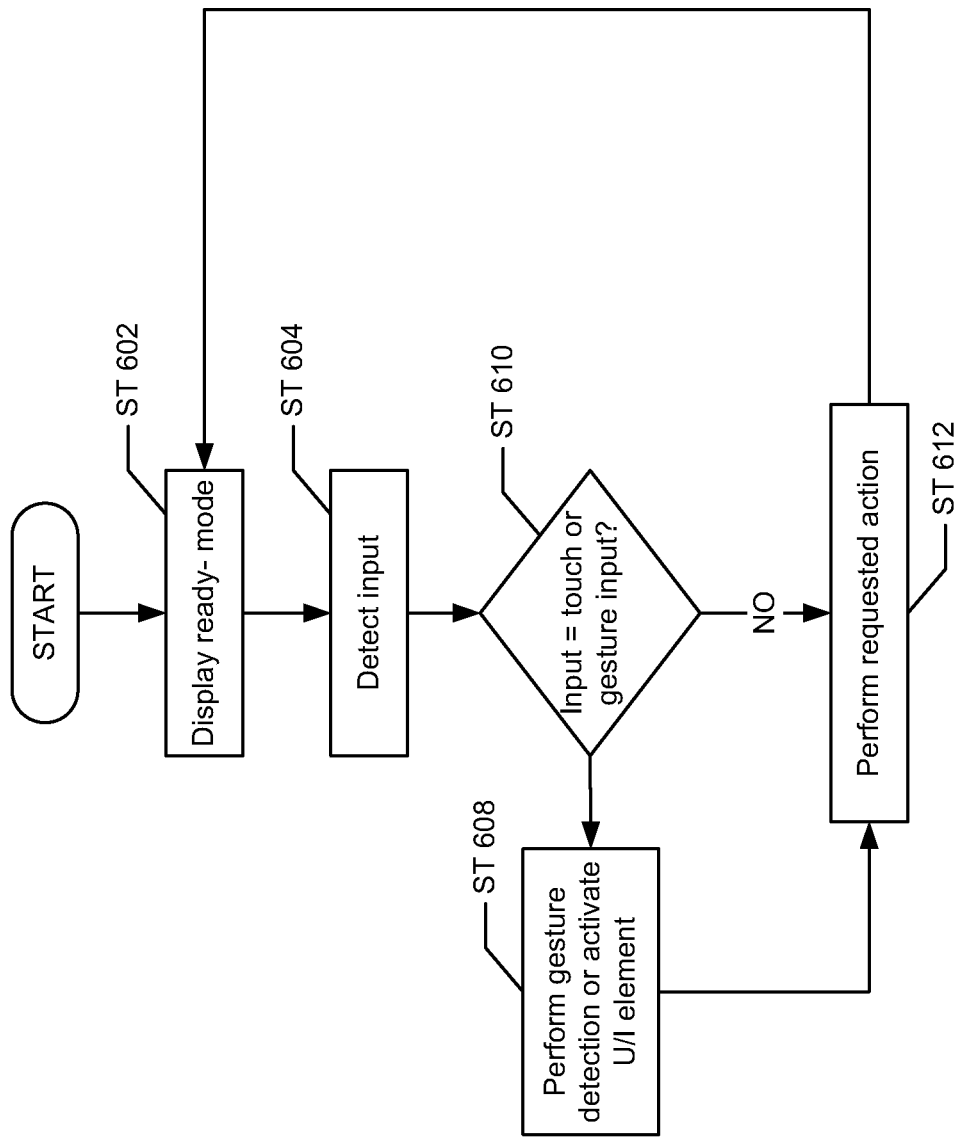
FIG. 6 shows a flowchart in accordance with one or more embodiments of the invention.

FIG. 6 shows a flow chart in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 602, the e-flipchart apparatus is in display ready-mode. As described above, the e-flipchart apparatus may be always "on," and therefore, ready for use when a user walks up to the apparatus or provides another type of input that is detected by the apparatus (Step 604). Specifically, in the ready-mode (or base state), the e-flipchart apparatus polls for an input at a low frequency or input scan rate. In this mode, the display area of the e-flipchart apparatus may include the image from the last time it was fully active. When an input is detected, the apparatus changes state from ready-mode to the active state. For example, in one or more embodiments of the invention, when input is sensed by the electromagnetic board, a signal is sent to a controller CPU which is running the energy management software to "wake up" some or all the components and put them in "active mode". The same process occurs when a signal is detected via a GUI, touch input, or in a "wake up on LAN" input.

The input detected by the e-flipchart apparatus in Step 604 may be a wireless input provided by the press of a button, such as a Bluetooth signal, radio frequency signal, or other wireless network signal, a digital marker input, a touch input, a gesture input, or any other suitable type of input. Based on the type of input detected, a specific action may be performed by the e-flipchart apparatus. Thus, upon detection of an input, a determination is made as to whether the input is a touch input or a gesture input (Step 606). If the detected input is a user gesture, the e-flipchart apparatus may be configured to perform gesture detection or activate a user interface (UI) component (Step 608). For all other input types, an appropriate action is performed by the e-flipchart apparatus (Step 610). For example, when the detected input is not a touch or gesture input, but rather, is a wireless signal, for example, a press of the button on the digital marker, corresponding external events may be activated (Step 610). For example, in Step 610, when the input is a Bluetooth signal, the e-flipchart apparatus may be configured to activate a peripheral device or external Bluetooth receiver. External event inputs may also be, in one or more embodiments of the invention, proximity sensors, motion sensors, sound sensors that detect sound above a particular decibel threshold, etc., for detecting the presence of one or more people close to or in the vicinity of the e-flipchart apparatus. For example, proximity sensors may include ultrasonic sensors or infrared sensors. In yet another embodiment of the invention, when the detected input is a pen stroke using a digital marker or digitizer, the e-flipchart apparatus may be configured to detect the path of the digital marker tip and convert the motion to a display of simulated ink strokes (Step 612). Accordingly, the specific action performed by the e-flipchart may vary depending on the type of input received.

When the detection input is a gesture or a touch input, the activated components may display data on the display area, flip a page, zoom into the content displayed, or perform any other suitable action in response to the touch/gesture input. In one or more embodiments of the invention, after performing the action in response to the detection of an input, the e-flipchart apparatus returns to the base state of "ready-mode." In one or more embodiments, in this mode the e-flipchart apparatus to continue to display an image without any power used by the bi-stable reflective display component of the apparatus. Examples of the types of actions that may be performed are described below in FIGS. 7A-7E.

Figure 7C:
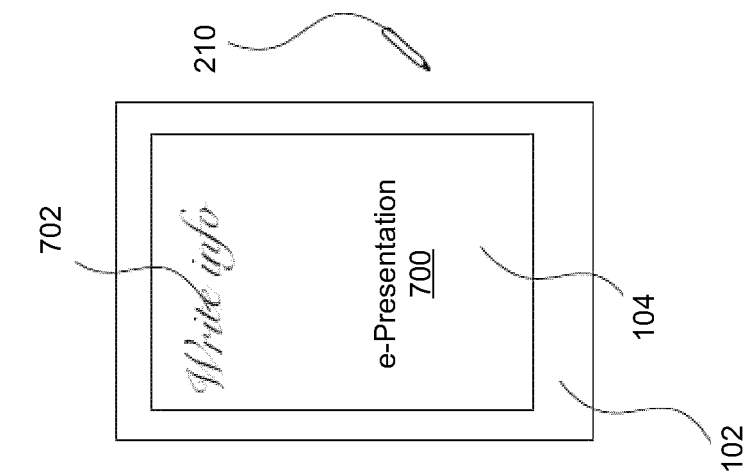
FIGS. 7A-7F show examples in accordance with one or more embodiments of the invention.
Figure 7B:
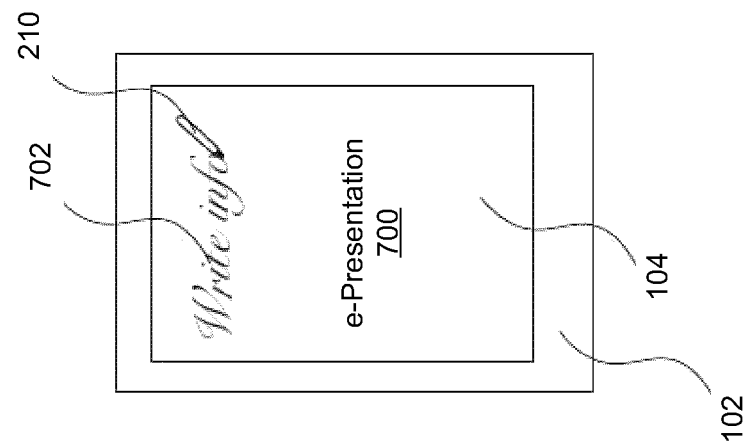
Figure 7A:
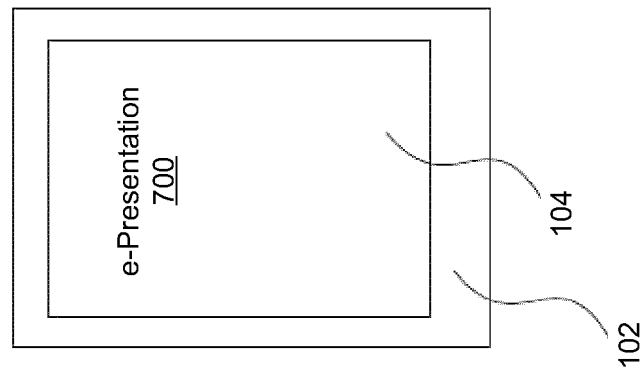

Specifically, in one or more embodiments of the invention, FIG. 7A shows an example front frame (102) of an e-flipchart apparatus. The front frame (102) mimics a screen and has an area which is capable of accepting at least two type of input: touch and digital marker. When one of the aforementioned types of input is detected, for example in the active region or display area of the layer having at least one touch portion (104), an e-presentation (700) is created and displayed. Specifically, when a user walks up to the e-flipchart apparatus in ready-mode and provides an input, the e-presentation (700) is created. Creation of the e-presentation may include generating and populating the data and metadata shown in FIG. 5. In FIG. 7A, the display area is blank. In FIG. 7B, an example input of writing (702) using a digital marker (210) on the active area of the e-flipchart apparatus is shown. Specifically, in FIG. 7B, when the tip of the digital marker or digitizer (210) is pressed onto the active area of the e-flipchart apparatus, the path of the digital marker (210) is detected and converted by the software of the e-flipchart apparatus into simulated ink strokes (702) which are displayed on a first page of the e-presentation (700). FIG. 7C shows at least one embodiment in which the displayed stroke images are maintained on the e-flipchart apparatus without any power consumption by the reflective display component of the e-flipchart apparatus. In one or more embodiments of the invention, the reflective display displays the latest information that resulted from input to the e-flipchart, and does not change until new input is received by the controller.

Figure 7E:
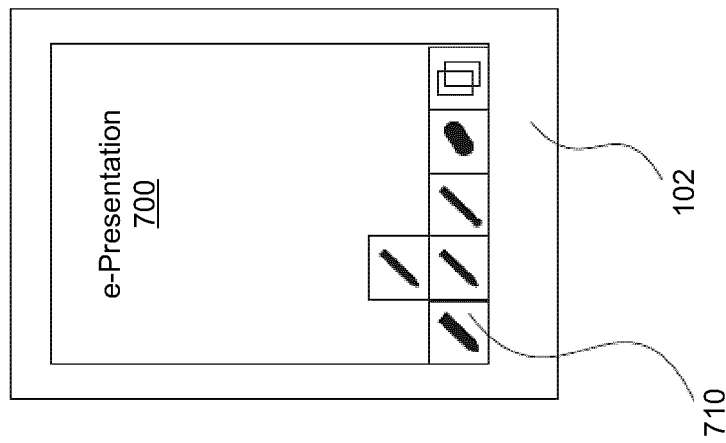
Figure 7D:
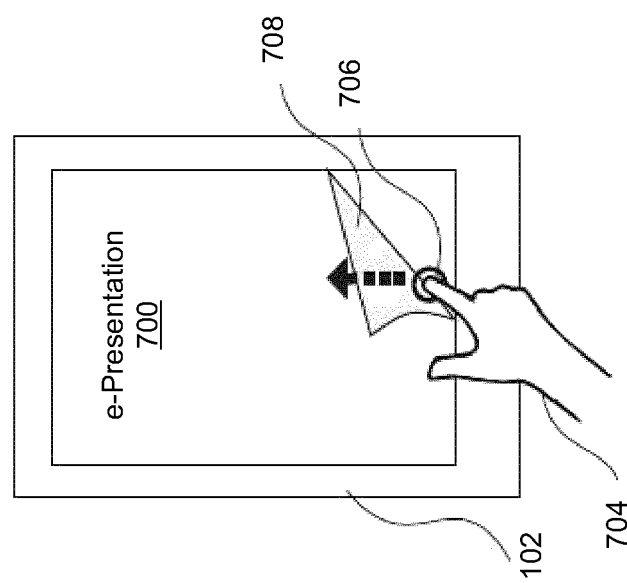

In FIG. 7D, a touch input (704) is detected by the e-flipchart apparatus. In the example shown, a user touches the display screen (706) and, in one or more embodiments, moves his/her finger in an upward motion (indicated by the arrow pointed upward), resulting in the current page (708) flipping over to begin a new page of the e-presentation (700). Those skilled in the art will appreciate that a page may be flipped using a gesture input as well, in addition to or instead of a touch display as shown in the example of FIG. 7D. For example, a visual gesture (e.g., movement of a hand in a particular path without touching the e-flipchart) which may be detected by the camera and that is interpreted as a page flip may result in the software interpreting the flip gesture as a page flip action. A page flip action results in transitioning from a current page to another page of the e-presentation. In FIG. 7E, a graphical user interface (GUI) (710) is displayed on the screen of the e-flipchart apparatus. The GUI (710) may be invoked by the pressing of a button on the digital marker, by a gesture, or by any other designated input. In one or more embodiments of the invention, the GUI (710) may be invoked from a menu on a secondary screen that is, for example, connected to a cloud server by a bi-directional communication channel. In one or more embodiments, the GUI (710) may be used to select particular features or perform selected actions such as, for example, sharing the current page of an e-presentation, selecting an eraser, changing the font, style, or color of the displayed line strokes, etc.

Figure 7F:
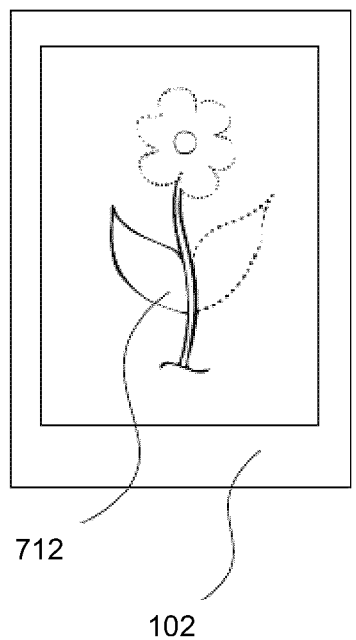

FIG. 7F shows an example of an e-presentation having a drawing. In one or more embodiments of the invention, as shown in FIG. 7F, the e-flipchart apparatus may display a pencil skeleton image (712) to aid a user in creating an e-presentation. The pencil skeleton may provide a light image so that a user may, at a later time, trace the light pencil drawing with a marker to draw a predetermined object. This feature may be used, for example, to create an illusion that the user is creating artwork on the fly. Although FIG. 7F shows a pencil skeleton of a flower, those of ordinary skill would appreciate that the pencil skeleton may depict any object, or may more generally provide any type of aid for writing or drawing. For example, the pencil skeleton may be a combination of light horizontal and vertical lines mimicking graph paper or notebook paper.

Figure 8:
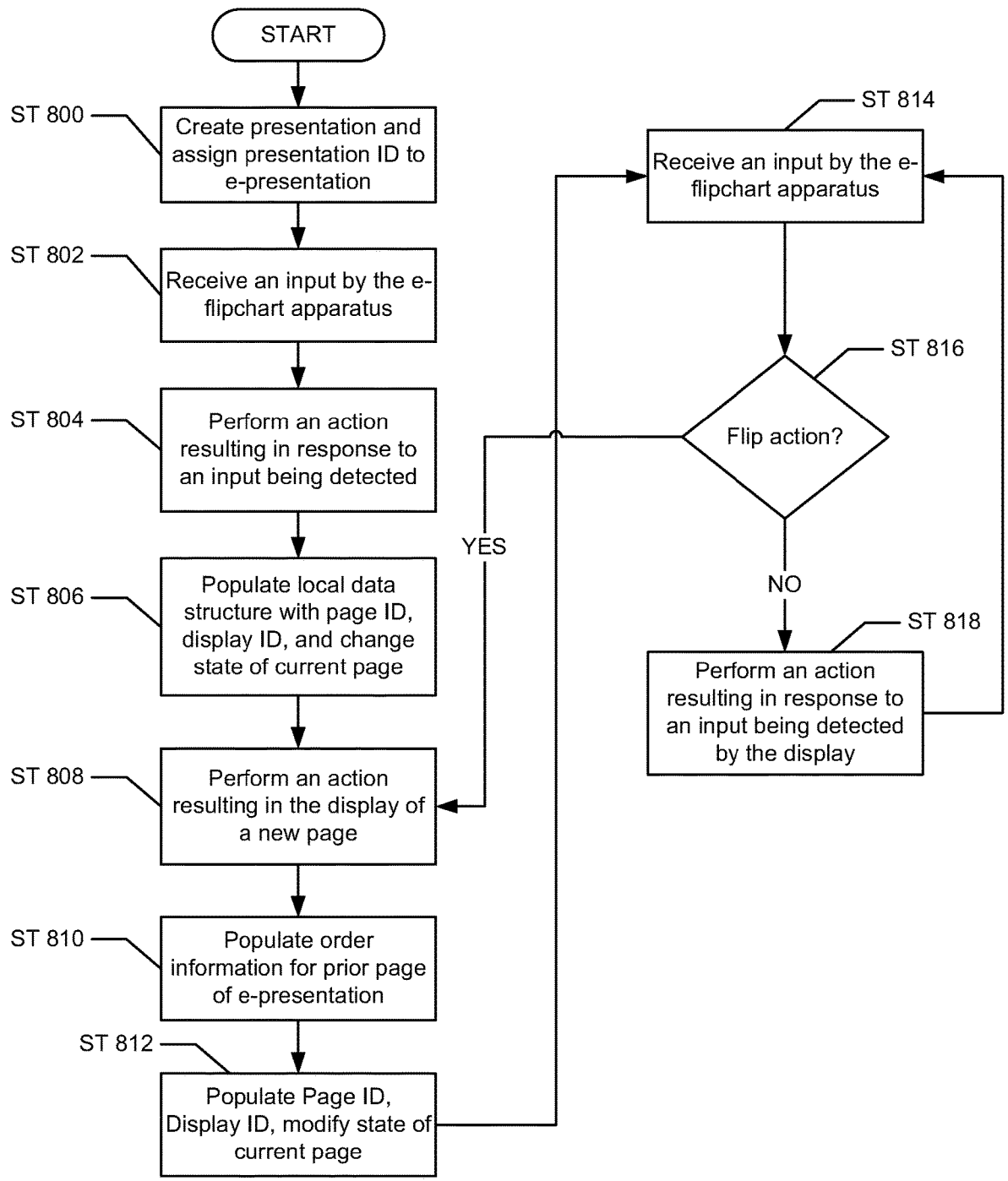
FIG. 8 shows a flowchart in accordance with one or more embodiments of the invention.

FIG. 8 shows a flow chart in accordance with one or more embodiments of the invention. Specifically, FIG. 8 shows a flowchart for creating and maintaining an e-presentation in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In step 800, an e-presentation is created and associated with a presentation ID. In one or more embodiments of the invention, the presentation ID may be assigned by an e-presentation server, or alternatively, may be generated by the e-flipchart or provided in response to an input prompt to the user. The e-presentation server may be a remote server that is connected to the e-flipchart apparatus via a network. The functionality and purpose of the e-presentation server is described below in FIG. 10. The presentation ID may be a numerical ID, alphabetical ID, a symbolic ID, or any combination thereof, and is configured to uniquely identify the e-presentation displayed on the e-flipchart apparatus. When an e-presentation is initially created, it may not contain any content. Further, if the e-flipchart apparatus does not receive any user input within a certain period of time, the e-flipchart apparatus may transition to ready-mode. In one embodiment of the invention, step 800 may be performed when the e-flipchart apparatus is in either ready mode or active mode.

In Step 802, an input is detected by the e-flipchart apparatus in ready-mode. In ready-mode, the apparatus is scanning for input at a low frequency, e.g., twice per second. As described above, the input detected by the reflective display may be a touch input, a digital marker input, a proximity sensor input (e.g., when a user approaches the e-flipchart apparatus), a network signal, or any other suitable type of input. As described above, when an input is detected, the apparatus changes state from ready-mode to the active state. For example, in one or more embodiments of the invention, when input is sensed by the electromagnetic board, a signal is sent to the controller CPU which is running the energy management software to "wake up" some or all the components and put them in "active mode". The same process occurs when a signal is detected via a GUI, touch input, or in a "wake up on LAN" input. Step 802 may also be performed when the e-flipchart apparatus is in active mode.

In step 804, an action is performed in response to the received input. For example, the corresponding action may be to activate one or more components of the e-flipchart apparatus, convert input strokes to display rendered stroke images, display a GUI, share information with another device, etc. In one or more embodiments of the invention, when the input is received via a digital marker on the surface of the apparatus, the apparatus may identify a tip width of the digital marker via various methods. For example, the electromagnetic board may detect the tip width of the digital marker. Alternatively, the layer having at least one touch portion may be configured to detect the tip width of the digital marker. In yet another embodiment, the digital marker may transmit a signal to the apparatus that includes information about the tip width. In one or more embodiments of the invention, using information about the tip width associated with the input received, the apparatus may be configured to display a certain line width for rendered strokes.

In Step 806, a data structure (shown in FIG. 5, for example) for storing metadata associated with the e-presentation is populated with a page ID and a display ID. In addition, the state of the current page with the page ID is changed to active. In one or more embodiments of the invention, the data structure may be populated and stored locally, in the memory associated with the e-flipchart apparatus, or may be stored remotely, for example, in an e-presentation server or cloud computing environment. If the data structure is stored locally, the data structure may be backed-up (e.g., mirrored) on a remote server or in the cloud computing environment. At this stage, various actions may be performed resulting in writing or drawing on the current page. In step 808 an input resulting in display of a new page may be detected. For example, a touch input or gesture which results in a page flip.

In step 810, when a second page is created as part of the e-presentation, the data structure is populated with order information, linking the first page to the new second page in the e-presentation. In step 812, the new page of the e-presentation may be assigned its own page ID, following that of the first page ID, and display ID. In addition, the state of the first page is changed to inactive, and the state of the current page, i.e., the second page, is changed to active. In step 814, input is received by the e-flipchart apparatus.

In step 816, a determination is made as to whether the input received in Step 814 is a page flip action. If a page flip action is detected, the method proceeds to Step 808 and the data structure continues to populate itself with a third page ID and ordering information for the second page is updated to reflect the link to the third page. This process may repeat each time a page flip action is detected by the e-flipchart apparatus. Alternatively, if no page flip action is detected, then the process proceeds to step 818. In step 818, an action corresponding to the input received is performed. In one embodiment of the invention, the process may not end (i.e., various steps in FIG. 8 may be repeated), because the e-flipchart apparatus does not turn "off." Rather, when input is not detected for a predetermined amount of time, the e-flipchart apparatus returns to "ready-mode" and waits for an input (Step 814).

Figures 9A, 9B:
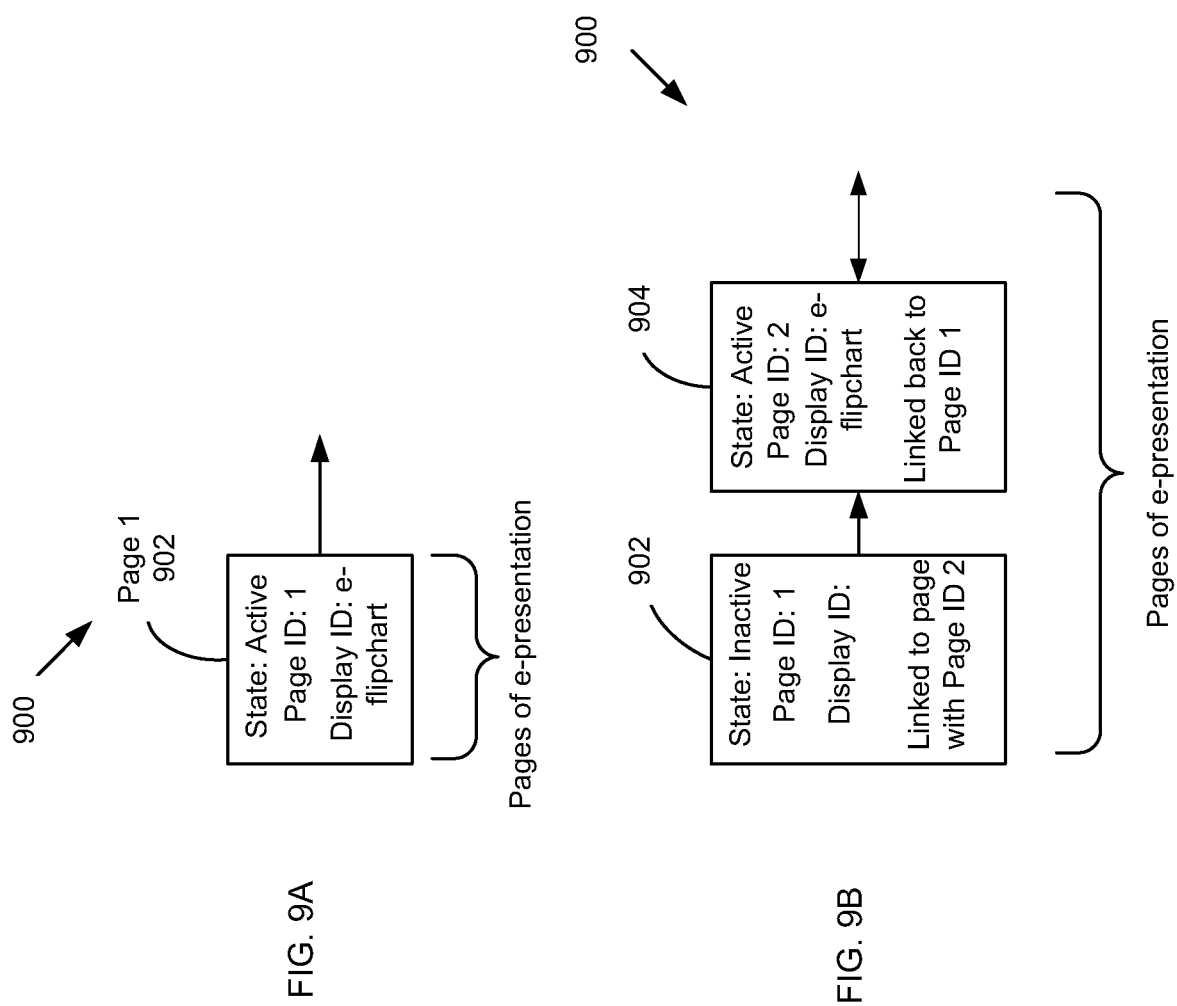
FIGS. 9A-9C show examples of storing data for an electronic flipchart in accordance with one or more embodiments of the invention.

FIGS. 9A-9E show examples of the method described in FIG. 8 above in accordance with one or more embodiments of the invention. In FIG. 9A, consider a scenario in which an e-presentation is created by the e-flipchart apparatus. At some point after the e-presentation is created, assume that a user walks up to the e-flipchart apparatus and provides an input in the form of pressing a button on or writing with a digital marker. Once the input is detected, the action associated with the input is interpreted and, in this example, result in content being associated with the first page (902) of the e-presentation. The first page (902) (i.e., the page on which characters are written, for example) is displayed on the active area of the e-flipchart apparatus with a white background. At this stage, the data structure (900) which stores metadata associated with the e-presentation begins to be populated with metadata. As shown in FIG. 9A, the metadata associated with page 1 (902) includes the state of active, a page ID of 1, and a display ID that identifies the e-flipchart apparatus. The owner ID of the e-presentation may also be the ID of the e-flipchart apparatus, or may be null for purposes of this example. Those skilled in the art will appreciate that no order information exists for a single page e-presentation.

Now suppose the user gestures or provides a touch input which the software of the e-flipchart apparatus interprets as a page flip action. As shown in FIG. 9B, a second page is added to the e-presentation, and the metadata for both page 1 (902) and page 2 (904) is updated/populated in the data structure (900). Specifically, the state of page 1 (902) becomes inactive as it is no longer the page that is displayed. Further, the display ID field of page 1 (902) is updated to null. Order information is added to page 1 (902) linking the page to the second page (904) in order. For page 2 (904), an active state is retained, a new page ID is assigned and the display ID is updated to be the ID of the e-flipchart apparatus. Order information for page 2 (904) is populated to reflect that page 2 (904) is linked to page 1 (902). More specifically, page 2 (904) comes after page 1 (904). The order information becomes important when a page flip action is performed. Specifically, during normal operation, because the e-flipchart apparatus mimics a traditional paper flipchart, pages must be flipped in order (i.e., when using the page flip action, one cannot jump from page 1 to page 4, for example, without also flipping pages 2 and 3, although pages may be flipped in groups).

Figure 9C:
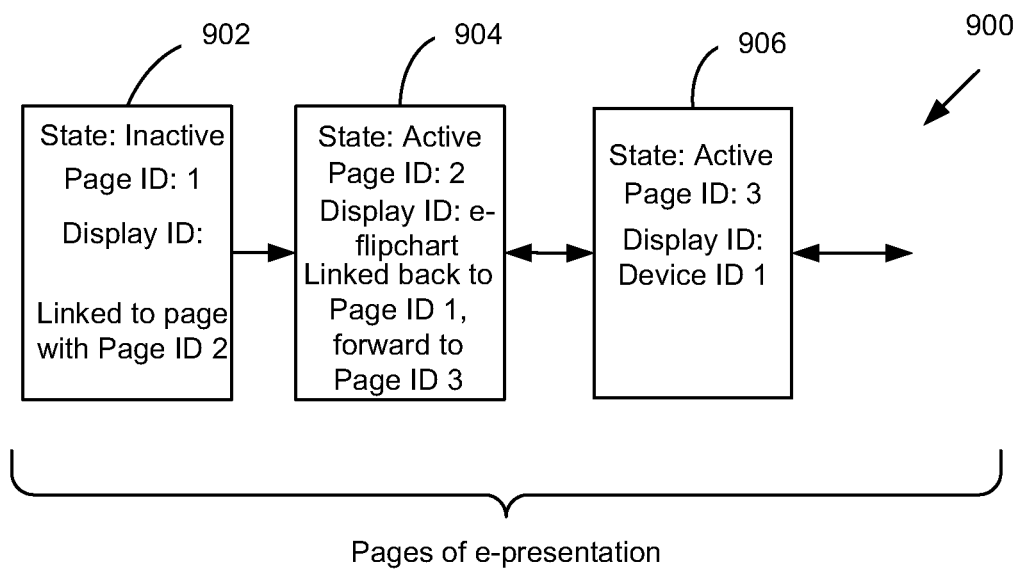

Continuation with the example, FIG. 9C depicts the metadata associated with an e-presentation that is shared with other owners/devices in order to collaborate on the e-presentation. In FIG. 9C, a third page (906) is added to the e-presentation. In this example, the third page is shared directly with another device (Device 1), while the second page (904) is still displayed on the active area of the e-flipchart apparatus. Device 1 (not shown) may be any smart phone, tablet, laptop, or desktop computer, a smart/interactive white board, or any other suitable device capable of displaying content and connecting to the e-flipchart apparatus or the shared e-presentation server (1002). Further, Device 1 may be connected to the e-flipchart apparatus via a point-to-point or a network connection that may be wired or wireless, such as via the Internet, or indirectly connected via a cloud server. Continuing with the data structure (900) content, the first page (902) remains inactive, and the second page (904) is updated to reflect that it is linked to page 1 (902) before and page 3 (906) after. In one or more embodiments of the invention, the state of the third page is also active, because even though it is not displayed on the e-flipchart apparatus, it is being displayed on another device (i.e., Device 1). Accordingly, the Display ID of the third page (906) is Device ID 1, which identifies Device 1.

Those skilled in the art will appreciate that page 3 (906) of the e-presentation as described in FIG. 9C above may be shared locally (i.e., in the same room with others viewing the e-presentation) or remotely (i.e., via a network connection to someone viewing the e-presentation on a remote device). Further, information may be sent and received by Device 1 and the e-flipchart apparatus bi-directionally, either through a server configured to store and manage the entire e-presentation file, or directly. Accordingly, a portion of or the entirety of e-presentations created on the e-flipchart apparatus may be shared and edited by a plurality of devices, all connected to the e-flipchart apparatus or to a shared e-presentation server. This allows for collaboration with audience members who are not physically located in the room where the e-flipchart is located.

Figure 10:
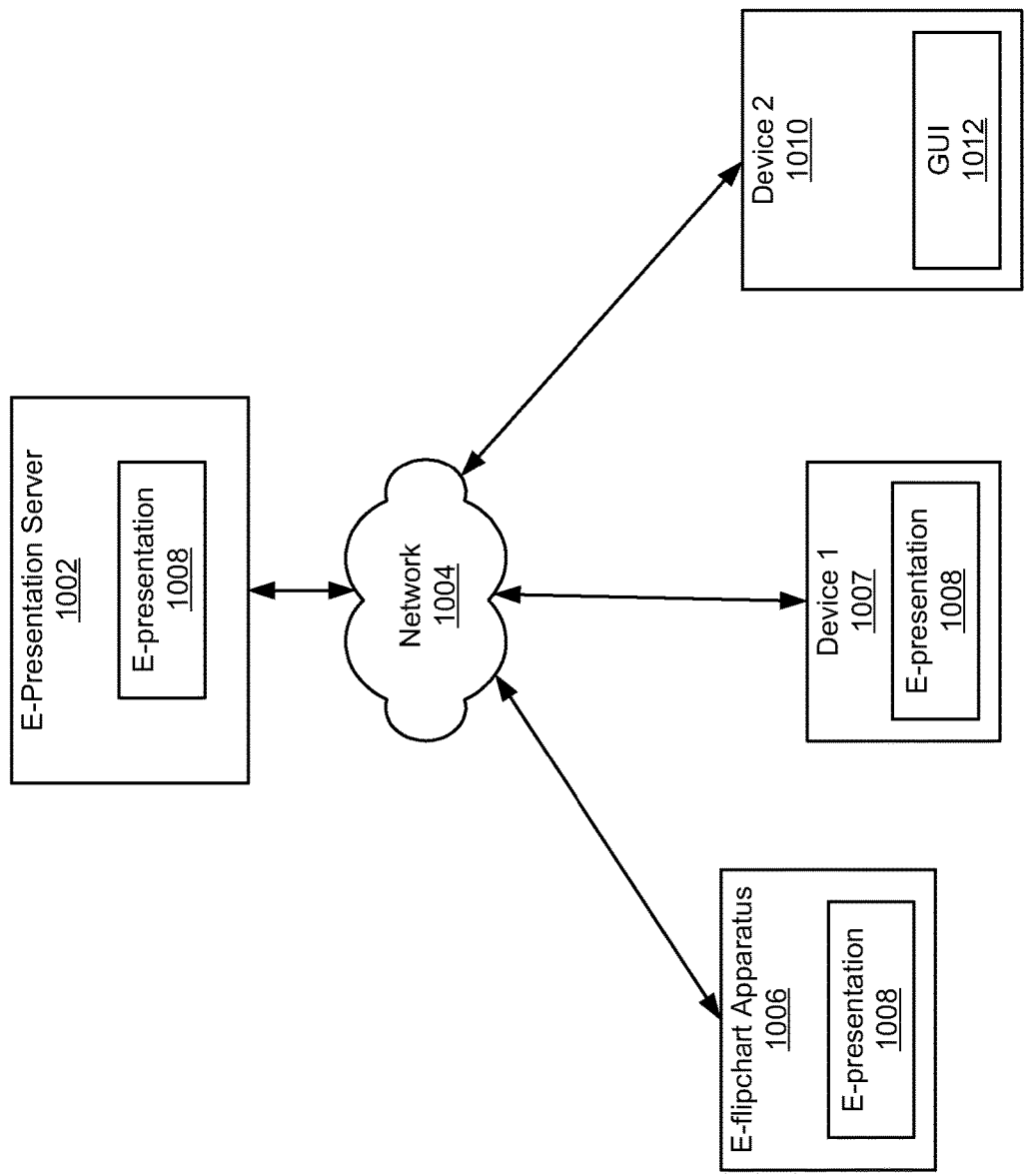
FIG. 10 shows a system for collaboration using an electronic flipchart in accordance with one or more embodiments of the invention.

FIG. 10 shows a system for sharing an e-presentation created on an e-flipchart apparatus in accordance with one or more embodiments of the invention. Specifically, FIG. 10 shows an e-presentation server (1002) connected via a network (1004) to the e-flipchart apparatus (1006) on which an e-presentation (1008) is created. In one or more embodiments of the invention, the e-presentation server (1002) may be a remote server configured to store and manage the e-presentation as a shared file. For example, the e-presentation server may be a cloud computing server or any other suitable type of server. In such cases, as shown in FIG. 10, the e-presentation server includes a copy of the e-presentation (1008). In one or more embodiments of the invention, the e-presentation server (1002) is configured to assign an e-presentation ID to an e-presentation when it is created or displayed on the e-flipchart apparatus display (1006). All the pages of an e-presentation are then associated with this e-presentation ID. In addition, the e-presentation server (1002) is configured to enforce the permissions of the e-presentation and may maintain and/or back-up the data structure (see e.g., FIG. 5) that is created for each e-presentation. The e-presentation server (1002) may also be configured to synchronize a shared e-presentation based on multiple contemporaneous inputs from other devices (e.g. 1007) connected to the same e-presentation.

In one embodiment of the invention, if multiple devices are concurrently editing an e-presentation, then when a specific device makes a change to the e-presentation, the device sends an incremental update to the e-presentation server (1002). In response to receiving the update, the e-presentation server updates its copy of the e-presentation and then sends the incremental update to all other devices (except the device that sent incremental update).

Continuing with the discussion of FIG. 10, the network (1004) may be any wired or wireless network configured to facilitate bi-directional communication between the e-presentation server (1002) and the e-flipchart apparatus and directly between device 1 (1007) and device 2 (1010). As described above, the network (1004) may be the Internet or any other suitable network. Device 1 (1007) and Device 2 (1010) may be local devices in the same room as the e-flipchart apparatus, or remote devices all connected to the e-flipchart apparatus via the e-presentation server (1002). Device 1 (1007) and Device 2 (1010) may be tablets, smart phones, laptops, desktop PCs, a wearable device, such as a an interactive watch or bracelet, or any other suitable device. Alternatively, one or more of Device 1 (1007) and Device 2 (1010) may be additional e-flipcharts. The system of FIG. 10 allows users to see and collaborate on e-presentations that may be updated by a remotely connected device in real-time. The following example illustrates this concept using the components of FIG. 10.

Suppose that Device 1 (1007) is in the same physical location as the e-flipchart (1006) and Device 2 (1010) is a remote device. A presenter/user of the e-flipchart apparatus (1006) may, while editing or showing the e-presentation, invite audience members to collaborate and provide input in the form of writing or drawing into the e-presentation that has been created and is being presented on the e-flipchart apparatus. In this case, the presenter/user may provide an input that results in Device 2 (1010) being granted permission to edit the e-presentation. In such scenarios, Device 2 (1010) may connect to the e-presentation server via the network (1004), download the e-presentation, and then edit the e-presentation concurrently with Device 1 (1008) and e-flipchart apparatus (1006). When Device 2 (1010) is finished editing, the e-presentation server may delete the Device 2 Display ID. Multiple pages of the e-presentation may be shared individually, or the entirety of the e-presentation may be shared using the system of FIG. 10. Further, multiple pages of an e-flipchart apparatus may be edited in parallel, and the e-presentation server may be configured to synchronize the e-presentation when editing is completed.

In an alternative embodiment, Device 2 (1010) may display a GUI (1012) on its screen with various buttons for different functions, one of them being a button with a page flip function. Using the GUI, Device 2 (1010) may manipulate what is being displayed on the active area on the e-flipchart apparatus, without having actual editing capability. In order for Device 2 (1010) to manipulate the content displayed on the e-flipchart, Device 2 (1010) must be connected to the e-flipchart apparatus (1006) or to the e-presentation server (1002). The connection may be wireless or wired. In this scenario, the owner of the e-presentation may provide Device 2 (1010) with the GUI by providing an input that allows Device 2 viewing permissions, but not editing permissions.

Those skilled in the art will appreciate that the e-flipchart apparatus may be used in any suitable environment, for example, where traditional paper flipcharts would conventionally be useful. For example, the e-flipchart apparatus may be used in conference rooms, classrooms, boardrooms, or any other suitable environment. In one or more embodiments of the invention, the e-flipchart apparatus is designed to connect to the outside world using digital technology such as network connections, and to keep a written record of what was written on the apparatus. In addition, with the e-flipchart apparatus of the present invention, the ability to create and store a presentation before it is presented before an audience on the e-flipchart apparatus is available. For example, the e-flipchart apparatus may have removable memory on which a presentation may already be created and stored, and when the removable memory is installed into the e-flipchart apparatus, the pre-created e-presentation may be shown on the reflective display. E-presentations created using the e-flipchart apparatus may be stored, copied, shared, revised, transferred, and managed using the information described above. Moreover, because the e-flipchart apparatus uses a reflective display, it mimics the look and feel of traditional paper flipcharts.

As discussed above, the invention relates to linking or otherwise combining multiple interactive devices to create a multi-device workspace. FIGS. 10-20B describe various embodiments for creating and using a multi-device workspace in accordance with one or more embodiments of the invention.

Figure 11A:
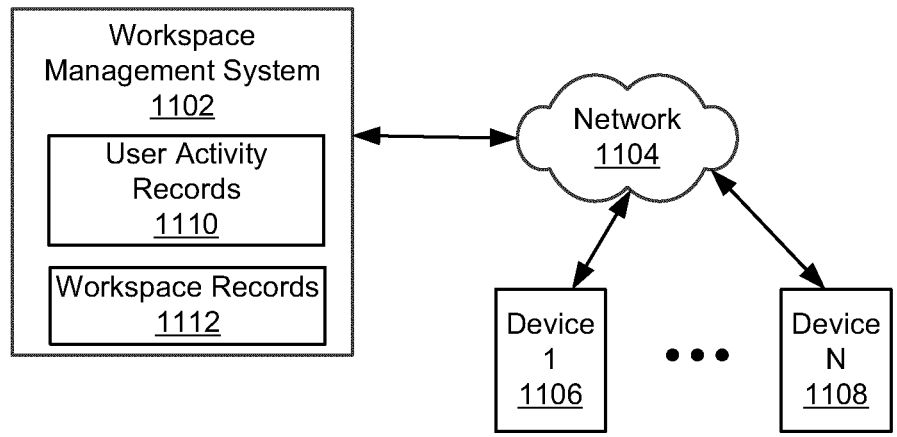
FIG. 11A shows a system in accordance with one or more embodiments of the invention.

FIG. 11A shows a system in accordance with one or more embodiments of the invention. The system includes a workspace management system (1102) and one or more devices (Device 1 (1106), Device N (1108)) connected over a network (1104).

In one or more embodiments of the invention, the workspace management system (1102) may be any computing system (see e.g., FIG. 21) that is configured to track and manage the metadata associated with the multi-device workspace (not shown). In one or more embodiments of the invention, the workspace management system (1102) may operate in a cloud computing environment. Specifically, the workspace management system (1102) may include cloud storage for storing a user activity record (1110) (in accordance with FIG. 11B) and track one or more workspace devices (1112), each of which have a display area that makes up a portion of the multi-device workspace. In one or more embodiments of the invention, the workspace management system (1102) may store workspace records (1112) (i.e., interactive devices that are associated with each workspace) by storing an identifier for such interactive device. The user activity record (1110) and the workspace records (1112) may be data structures for storing data related to a user.

As described above, each device (Device 1 (1106), Device N (1108)) that is a part of the multi-device workspace includes a display area that forms a portion of the multi-device workspace on which content may be displayed. In one or more embodiments of the invention, devices (Device 1 (1106), Device N (1108)) forming the multi-device workspace are interactive devices on which a user may provide input (e.g., touch input, input via digital marker or stylus, etc.) and view content objects. Each device (Device 1 (1106), Device N (1108)) may include its own CPU, memory, display, connection to a network, and other hardware/software capabilities. Such devices (Device 1 (1106), Device N (1108)) may include, for example, smart phones, tablets, desktop computers, gaming devices, e-flipchart apparatuses (see e.g., FIGS. 1-10), interactive whiteboards, or any combination of devices from the aforementioned types of interactive devices.

Those skilled in the art would appreciate that other suitable interactive devices could include any such interactive device with functionality to connect to the network (1104) may be used without departing from the invention. Thus, for example, if the workspace devices (Device 1 (1106), Device N (1108)) include four e-flipchart apparatuses in a room, then the multi-device workspace would be formed of the total display area of each e-flipchart apparatus. That is, the combined display area of each of the four e-flipchart apparatuses would be known as the multi-device workspace and may be used to present or view content objects. Similarly, if the workspace devices (Device 1 (1106), Device N (1108)) include a smart phone and three interactive tablets, then the combined display areas of all four devices in total would be the multi-device workspace on which content objects may be viewed/presented.

Those skilled in the art will appreciate that a multi-device workspace may be formed with only a single interactive device. Further, those skilled in the art will appreciate that although each workspace device has a separate display area, the display area of each workspace device becomes part of a larger multi-device workspace that is linked to the display areas of the other workspace devices when a single user logs into all the workspace devices. Accordingly, from the perspective of the user the multi-device workspace while made up separate physical devices may be viewed as a single display area. Said another way, the user may interact with the multi-device workspace in a similar manner that the user interacts with a single display device.

In one or more embodiments of the invention, the devices (Device 1 (1106), Device N (1108)) may be private devices owned by a user (e.g., a smart phone that belongs to a user), public devices provided in, for example, offices, schools, or any other public place where multiple users may have access to the devices, or a combination of private and public devices. In order for devices to become part of the multi-device workspace, in one or more embodiments of the invention, the same user may be logged into all of the devices.

The network (1104) over which the devices (Device 1 (1106), Device N (1108)) connect to the workspace management system (1102) may be a local area network (LAN), a wide area network (WAN) such as the Internet, a mobile network, or any other suitable type of network.

Figure 11B:
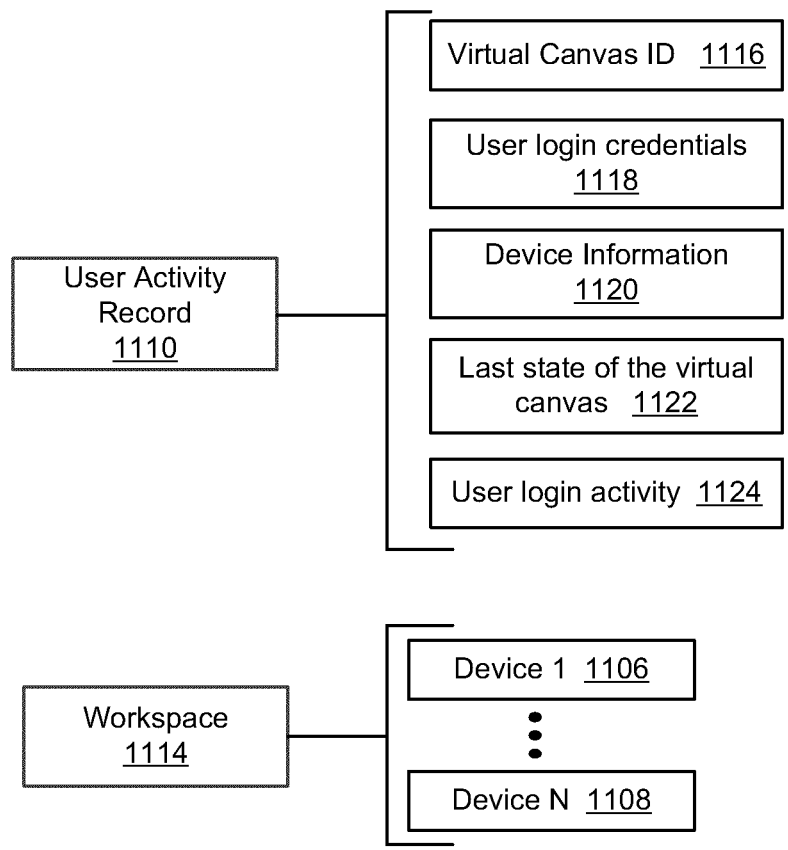
FIG. 11B shows data relationships in accordance with one or more embodiments of the invention.

FIG. 11B shows the data that may be stored and/or tracked by the workspace management system of FIG. 11A in accordance with one or more embodiments of the invention. More specifically, as shown in FIG. 11B, the workspace management system may store one or more user activity records (1110) (described below). In addition, the workspace management system may also track which devices (1106, 1108) are associated with a given workspace (1114). The workspace records (1112) may include an identifier of each device (Device 1 (1106), Device N (1108)), or any other suitable information that may be used to track the devices that form (or are a part of) the multi-device workspace.

Turning to the user activity records, the user activity record (1110), in one or more embodiments of the invention, may be any data structure such as a table, array, linked list, etc., that is configured to store the information that identifies the common user that is logged into the workspace devices that make up the multi-device workspace. Specifically, in one or more embodiments of the invention, the user activity record may store an virtual canvas ID (1116), user login credentials (1118), device information (1120), a last state of the virtual canvas (1122), and a log of user login activity (1124). Each of these pieces of data are described below.

In one or more embodiments of the invention, the virtual canvas ID (1116) uniquely identifies an virtual canvas. In one embodiment of the invention, an absolute represents content objects that may be selected and/or displayed in the multi-device workspace. Content objects may include text and/or image data. In one or more embodiments of the invention, the virtual canvas may be a file, and content objects associated with that file may be the text and/or image data that is included in the file. The file in its entirety, including all of the data in the file, is what is known as the virtual canvas. For example, an e-presentation shown on an e-flipchart apparatus described in FIGS. 1-10 above is a file that may be referred to herein as the virtual canvas (1116). Content objects within the virtual canvas may include portions of a file. For example, content objects may be a portion of text data from the file, or one or more images contained in the file. Using the e-presentation example, content objects may be the pages of the e-flipchart presentation.

In one or more embodiments of the invention, content objects may be grouped together to form content object groups. Content object groups are simply multiple portions of content in the form of text or images within the virtual canvas (1116) grouped together for display on the multi-device workspace. For example, if the virtual canvas (1116) is an e-presentation having pages, then an example of a content object group within the virtual canvas may be the text and/or image data that forms one or more pages of the e-presentation. When the virtual canvas is any file, content object groups may be paragraphs, sentences, one or more drawings, or other groupings of text/image data that may be selected and displayed on a portion of the multi-device workspace. Those skilled in the art would appreciate that the granularity of content object groups may depend on the type of content objects of the virtual canvas. For example, if the content objects are logically grouped into pages, then content object groups may be one or more pages. However, if the content objects are brainstorming notes, for example, then content object groups may be specific phrases or words within the notes. Further, those skilled in the art will appreciate that while a given virtual canvas may include an initial set of content object groups (e.g., pages), the content objects within a given virtual canvas may be regrouped any point. For example, a user may create multiple content object groups from content objects on a single page within the virtual canvas. Alternatively, the user may create a content object group that spans multiple pages. The above examples are not intended to limit the scope of the invention.

Continuing with the discussion of FIG. 11B, in one embodiment of the invention user login credentials (1118) stored in the user activity record (1110) may include one or more types of user authentication information that may be used to identify the user. For example, user login credentials (1118) may be a username/password pair, biometric data, a radio frequency identifier, a Bluetooth identifier, a near-field communication (NFC) tag ID, or any other unique identifier or any combination of the aforementioned types of user login credentials. As described above, the same user is logged into each workspace device in order for the workspace device to be a part of the multi-device workspace. However, user login may be performed in different ways on each workspace device. For example, a user may login using a username/password pair on a first workspace device, and use an optical label to log into a second workspace device. Alternatively, as described below in FIGS. 12-17, the same login method may be used to log into all of the multi-workspace devices. Because the workspace management system tracks the user activity in the user activity record (1110), each different type of login is recognized as being the same user. Further, the user login activity (1124) stored as part of the user activity record (1110) is a log that tracks which devices the user is logged into, the timestamp for when the login occurred, and the login method used for each workspace device login. In one embodiment of the invention, the user activity record may only track whether the user is successfully logged into a given device without recording the specific credentials that the user used to log into the device.

Continuing with the discussion of FIG. 11B, in one embodiment of the invention device information (1120) may include information on the location of each workspace device. Location information may be obtained and stored in the user activity record using GPS information for workspace devices equipped with such functionality. Location information may be geographical location information. The geographic location of a workspace device stored as device information (1120) may be a city, a building, a room, or any other geographic information at any granularity. The location information of workspace devices may be obtained from a secondary user device that is used to log into the workspace devices. For example, in one or more embodiments of the invention, a user may use a personal smartphone encoded with an NFC tag or equipped with Bluetooth Low Energy (BLE) to log into the workspace devices. In this case, the location information for the workspace devices may be obtained by the user's smartphone, which is used as a secondary device used to identify the user and log into the workspace devices. In another embodiment of the invention, the user may be prompted to provide the location of a given device and then the workspace management system may store this information in the workspace management system.

The device information may also include, but it not limited to, the size of the display on the device, the dimensions of the display, the orientation of the device (e.g., landscape, portrait, etc.), and the display resolution of the device.

In one embodiment of the invention, the user record includes a device ID (which uniquely identifies the device). In such cases, the device ID is also associated with a device record (not shown) that may be located using the device ID. The device record may include the device information (1120) described above.

In one or more embodiments of the invention, the last state of the virtual canvas (1122) represents the last display state of the content objects displayed in the multi-device workspace. In other words, the last state of the virtual canvas (1122) represents the display state of data (content objects) as seen by the multi-device workspace across the plurality of workspace devices, immediately before a user logs outs of one or more of the devices that make up the multi-device workspace. Thus, by identifying the user when the user logs out a device, the workspace management system is able to capture the last state of the multi-device workspace on which the user was working. In one embodiment of the invention, the user may be automatically logged out of one or more devices in the multi-device workspace after a predetermined time of inactivity in the multi-device workspace has elapsed.

Figure 12:
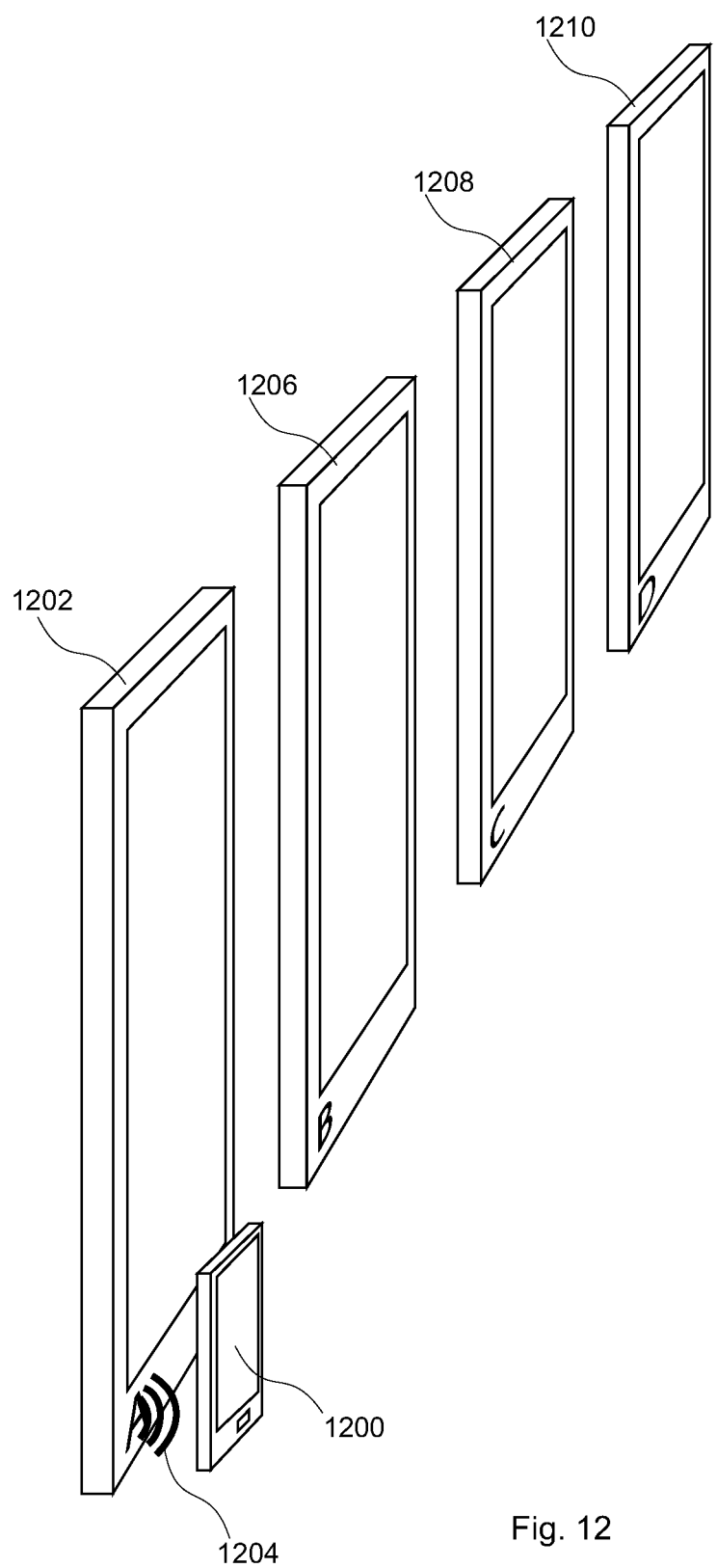
FIGS. 12-17 show examples of porting multi-device workspace data in accordance with one or more embodiments of the invention.
Figure 13:
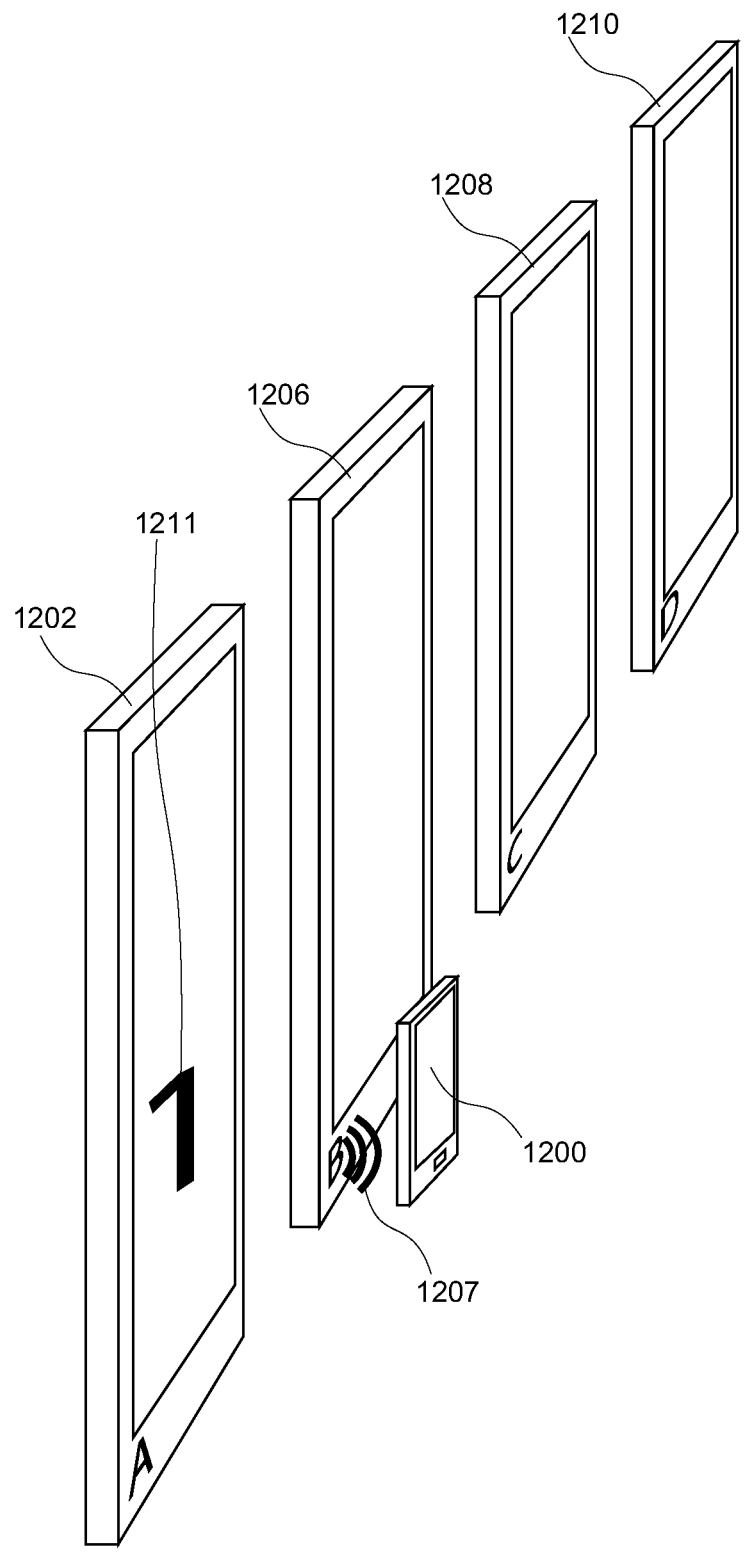

FIGS. 12-17 shows an example of a user logging into multiple workspace devices to create (or form) a multi-device workspace. The example is not intended to limit the invention. Turning to FIG. 12, in FIG. 12, a secondary device (1200), i.e., a user's smartphone, is used to log into a first device (1202). In the embodiment shown in FIG. 12, the user logs into the first of four devices (1202) using the secondary device (1200), which has NFC capability. Specifically, the user's smartphone (1200) encodes an NFC tag, and the first workspace device (1202) has an NFC transmitter/receiver that emits a signal (1204) that detects the presence of the NFC tag, decodes it, and loads the user's credentials to the device (1202). In one or more embodiments of the invention, the user's credentials are temporarily loaded onto the first device (1202), either for a predetermined period of time, or until the user logs out (or is logged out) of the device or the multi-device workspace. In one or more embodiments of the invention, once the first device (1202) is identified by the workspace management system, the workspace management system recognizes that this is the first device in a multi-device workspace. Accordingly, the first device (1202) may be assigned a work space device ID 1 (1211), as shown in FIG. 13. The assigning of content and clustering of workspace devices is discussed below in FIG. 18.

In one embodiment of the invention, the workspace device ID uniquely identifies the device within a given workspace. Further, once a workspace device is assigned to a given device, the workspace device ID may be displayed temporarily on the workspace device (see e.g., FIG. 17) in order to provide a visual indication to the user about which workspace device ID is assigned to each workspace device.

FIG. 13 is a continuation of FIG. 12, in which the user logs into a second device (1206) using the same NFC capability described above. The second device (1206) emits a signal (1207) that detects the presence of the NFC tag on the user's secondary device (1200), decodes it, and loads the user's credentials onto the second device (1206). As explained above, the second device (1206) is recognized by the workspace management system as being part of the multi-device workspace and is assigned work space device ID 2 (1213).

Figure 14:
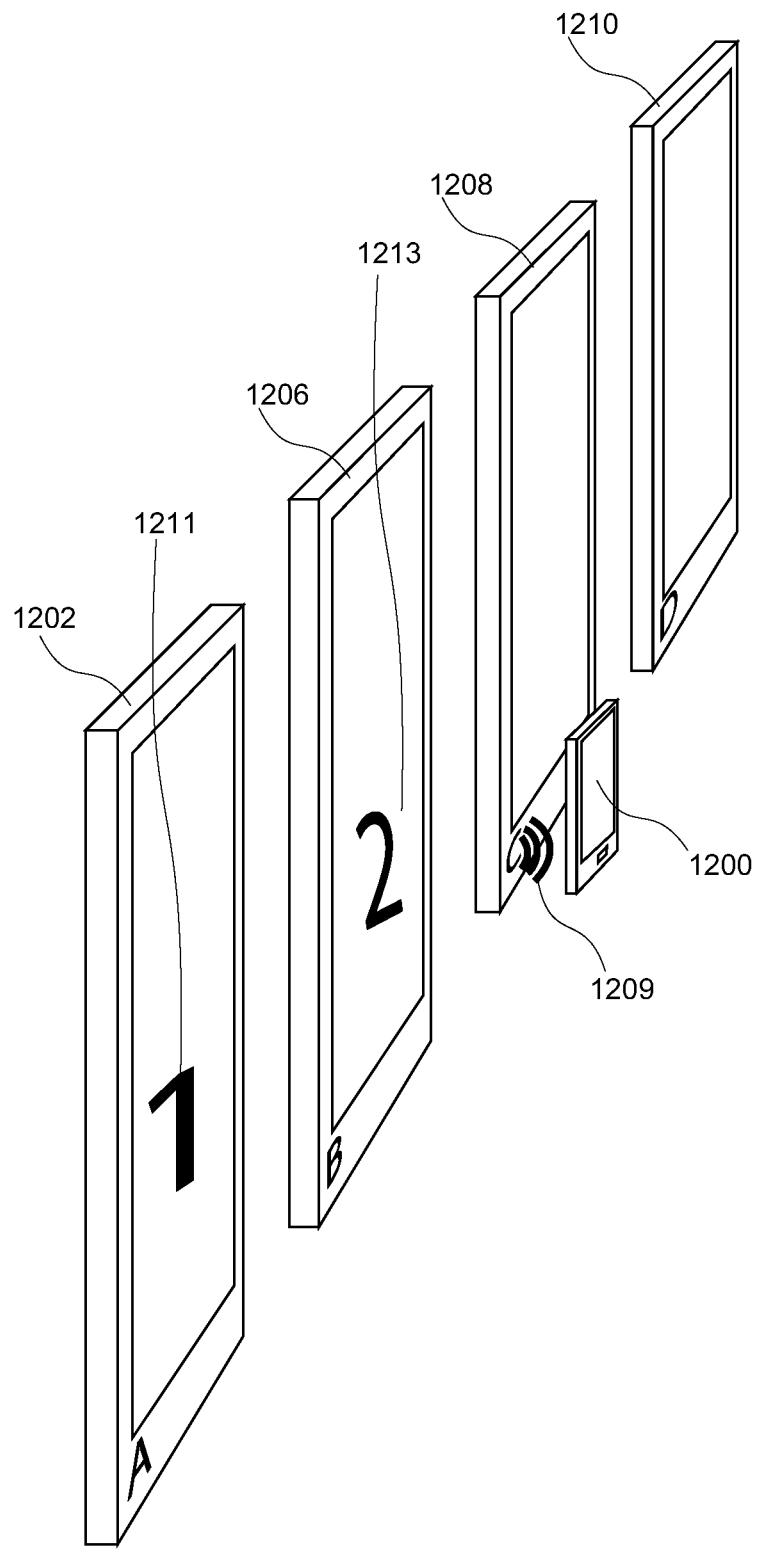

The process of logging into the third device (1208) continues in FIG. 14. NFC capability (1209) is used to log into the third device (1208) using the user's secondary device (1200). As explained above, the third device (1208) is recognized by the workspace management system as being part of the multi-device workspace and is assigned work space device ID 3 (1215).

Figure 15:
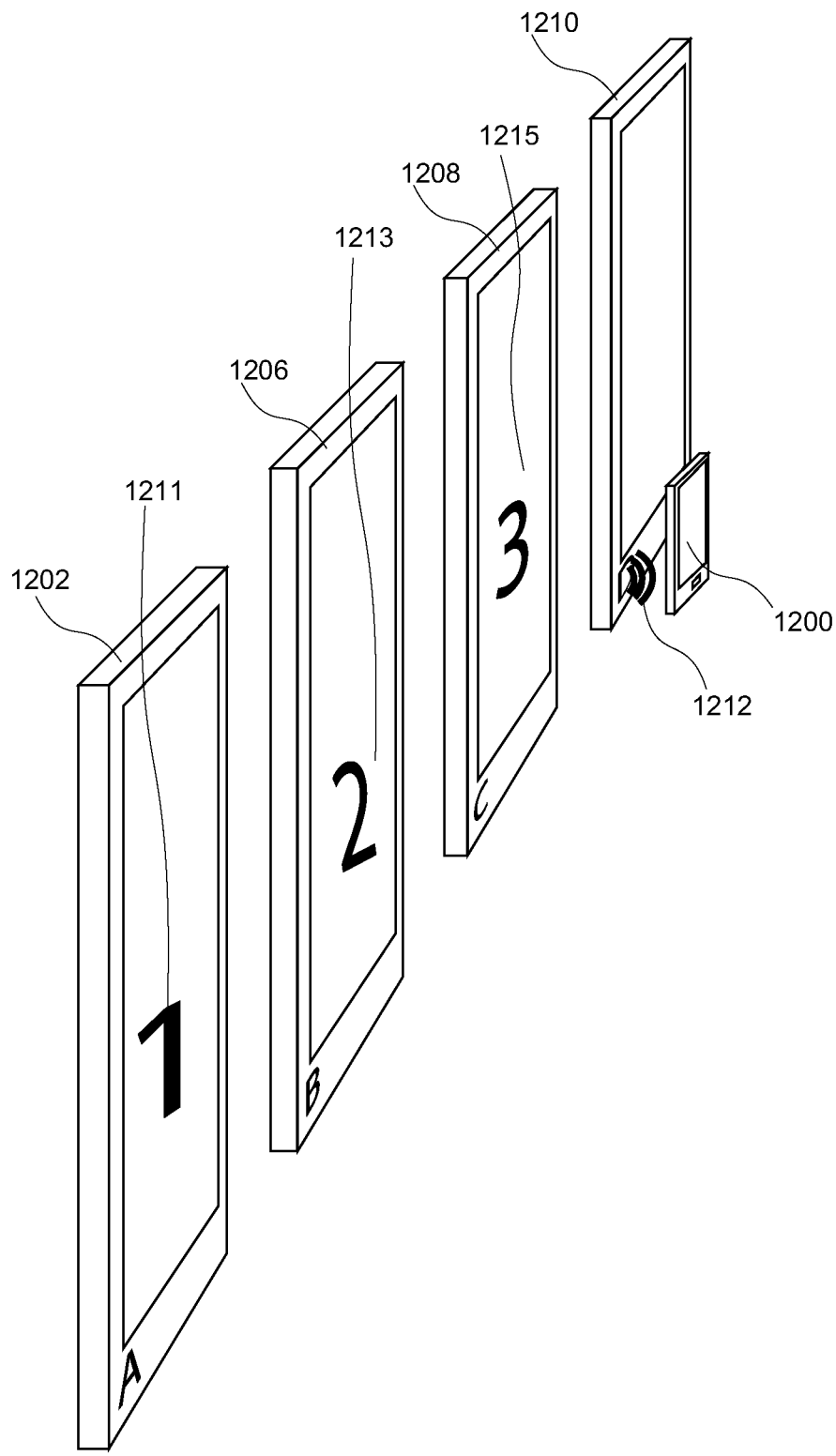

In FIG. 15, the user logs into the fourth device (1210) and, after a successful log in, the fourth device is associated with the multi-device workspace that includes the three other devices (1202, 1206, 1208). Finally, as shown in FIG. 16, the fourth device (1210) is assigned workspace device ID 4 (1217).

Figure 16:
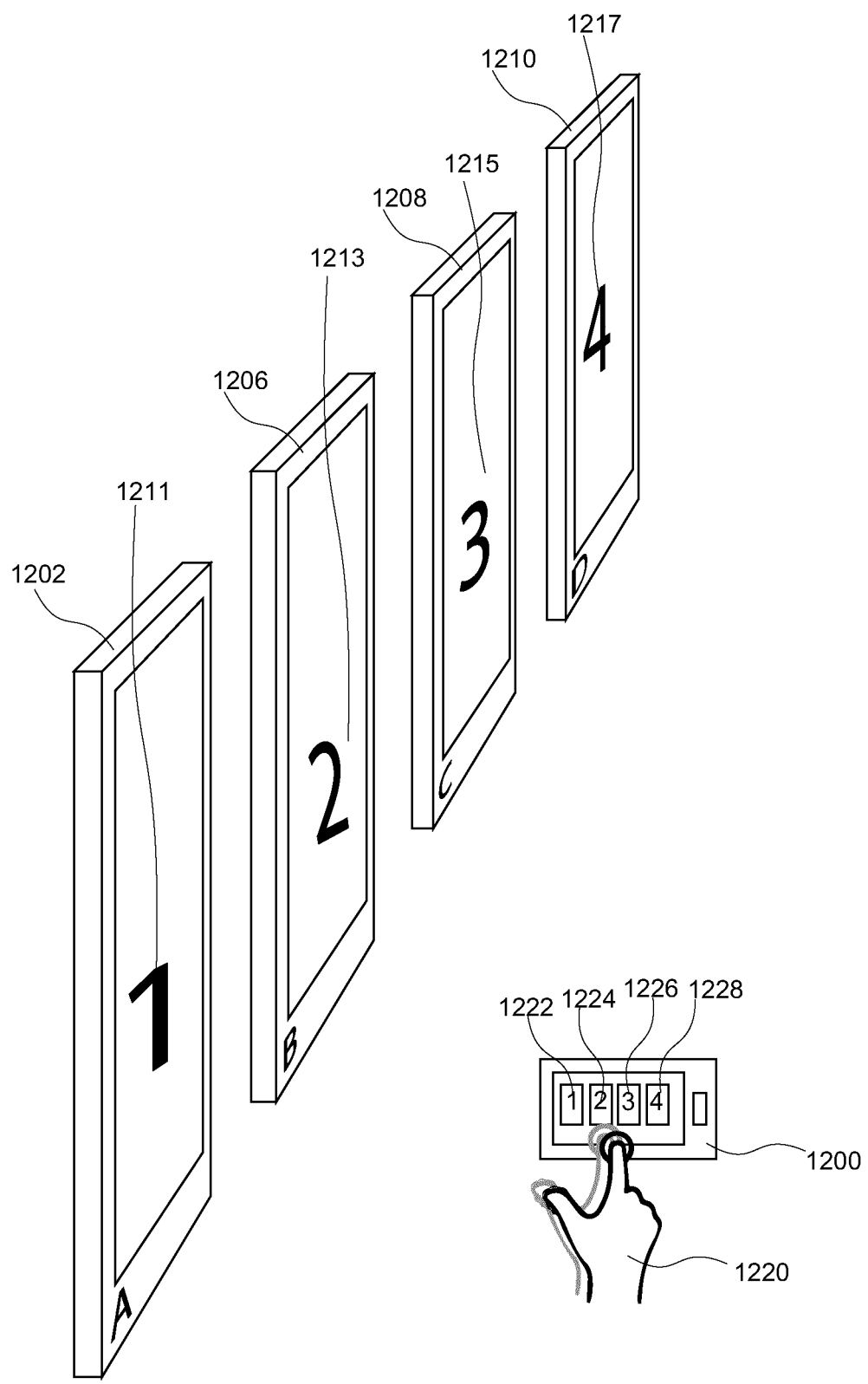

FIG. 16 shows all four workspace devices (1202, 1206, 1208, 1210) are logged into with the user's credentials, where each device has been assigned a workspace device ID. The assignment of workspace device IDs is tracked by the workspace management system, e.g., in the workspace records (1112). As discussed more fully below in FIG. 18-19, in one or more embodiments of the invention, workspace device IDs may be assigned based on the last previously known setup the user was working on, even if that was in a different location and even if it was with more or fewer devices than the current multi-device workspace setup. In addition, workspace device IDs may be assigned based on the location of the workspace devices and the timestamp of the login of one workspace device relative to another workspace device. As shown in FIG. 16, the user's secondary device (1200) that was previously used to login or transmit the user's credentials to the workspace devices (1202, 1206, 1208, 1210) may have on its display the information regarding the devices (1222, 1224, 1226, 1228) to which the credentials or login information has being transmitted.

In one or more embodiments of the invention, the user's secondary device (1200) may also be used as a secondary controlling device with a GUI as described above in FIG. 10. The user may use touch input (1220), for example, to control the display of one or more of the workspace devices into which the user is logged in. For example, in one or more embodiments of the invention, a content object(s), a content object group(s) or content icon may be displayed on the user's secondary device (1200). Using his or her finger(s) (1220), the user may select which content object group(s) from the virtual canvas is/are to be displayed on each of the workspace devices by using the GUI on the secondary device (1200).

Alternatively, in one or more embodiments of the invention, the secondary device (1200) may also be a workspace device with a display area that is part of the multi-device workspace, along with the display screens/areas of devices 1202, 1206, 1208, and 1210.

Figure 17:
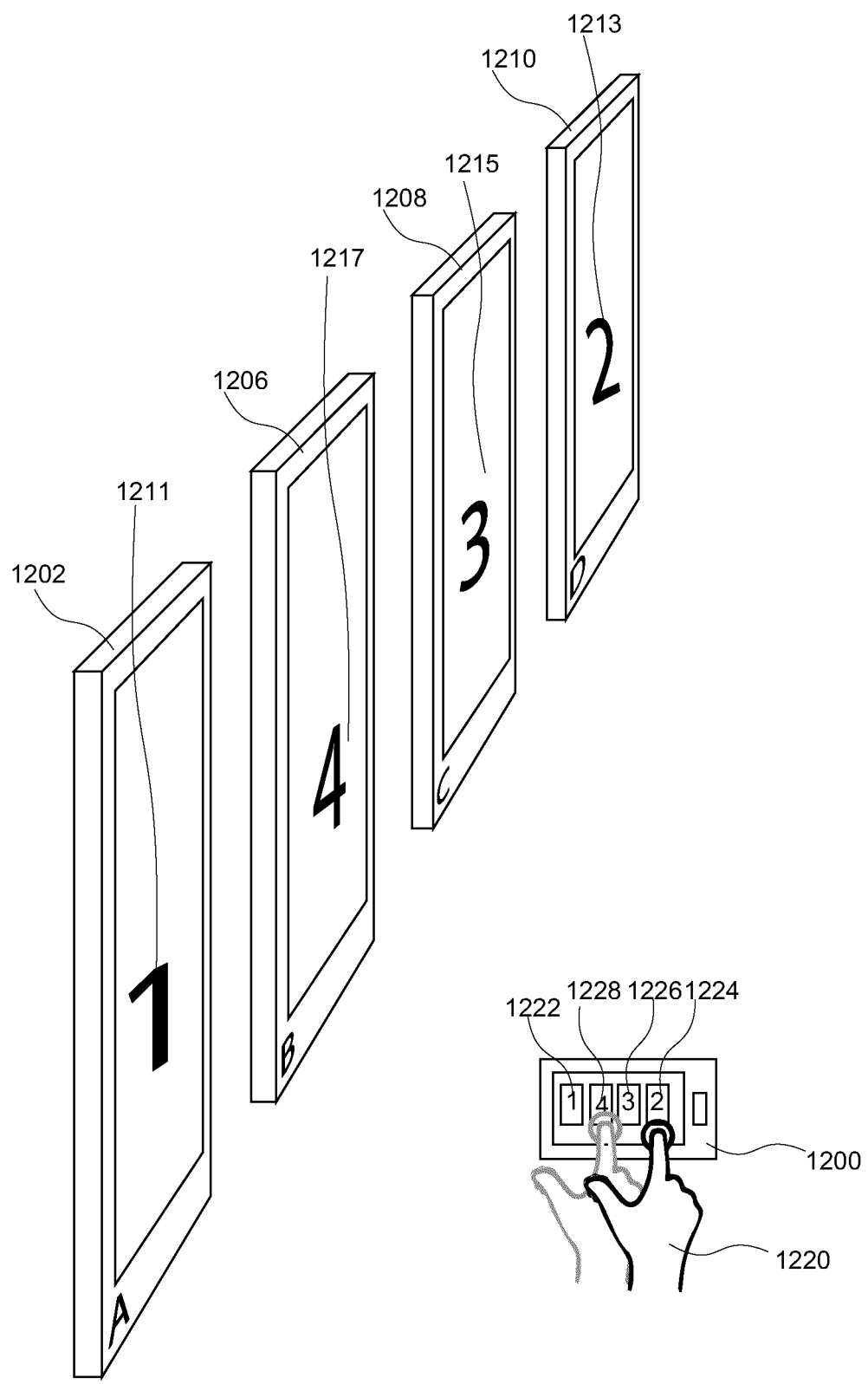

FIG. 17 shows a similar multi-device workspace described above in FIG. 16, where the user logged into the 4 boards in a different order from the left-to-right order of FIG. 16. FIG. 17 shows that the user using the secondary device (1200) is able to align the order of the workspace device IDs to correspond with the physical left-right order of the devices. Specifically, in FIG. 17, the workspace management system has updated its records to reflect that the fourth registered device (1206) is located to the right of first registered device (1202) and the third registered device (1208) is located to the right of the fourth registered device (1206), and the second registered device (1210) is to the right of the third registered device (1208). Using this information, the workspace management system will allow the user to send content objects to the expected device with UI operations such as "send this content to the device on the left".

Those skilled in the art will appreciate that other login methods may be used to log into each workspace device. For example, in one or more embodiments of the invention, the user may use another secondary device such as USB key, a username/password pair, an optical label, an NFC token, a Radio Frequency ID, a Bluetooth ID, or a combination of one or more of these methods to log into the workspace devices. For example, an optical label having the user's login credentials may be generated and displayed on the user's secondary device and scanned by the cameras of each of the workspace devices to read, obtain, and apply the user's credentials for log in to the devices. In another example, an optical label may be displayed on the workspace (or on a portion thereof). The optical label may be subsequently read by a user's secondary device. The secondary device may decode the optical label in order to extract connection information that will allow the secondary device to provide user credentials to one or more workspace devices. Further, those skilled in the art will appreciate that the data structures discussed in FIG. 11B above would be populated as the user logs into each workspace device shown in FIGS. 12-17. That is, for each log in, the timestamp of the log in, the device locations, the workspace device IDs, etc. would all be stored in the user activity record as described above so that the workspace management system is able to track and manage the workspace devices and user interaction with the workspace devices.

Figure 18:
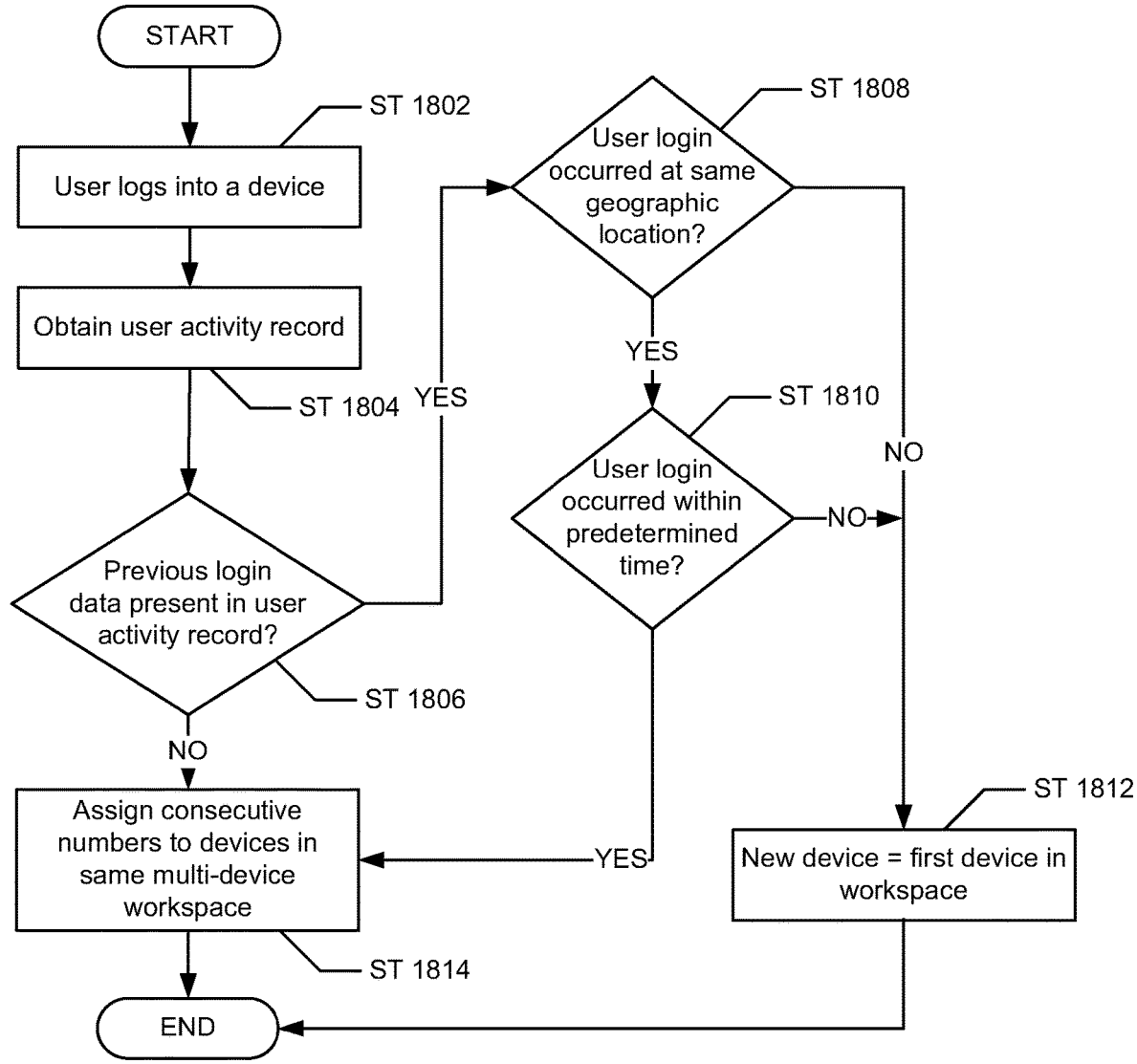
FIGS. 18-19 show flowcharts for porting multi-device workspace data in accordance with one or more embodiments of the invention.

FIG. 18 shows a flow chart in accordance with one or more embodiments of the invention. Specifically, FIG. 18 shows a process for creating a multi-device workspace. In step 1802, a user logs into a device. This device is referred to as a workspace device, even if it is the only device onto which the user logs in. Based on the user's log in, the workspace management system is able to identify the user, and the user activity record for that user is obtained in step 1804. At this stage, the user activity record is examined to determine whether previous login data is present in the user login activity stored in the user activity record (step 1806). When previous login data does not exist in the user activity record, this indicates to the workspace management system that the user may be creating a new multi-device workspace. Accordingly, the process proceeds to step 1812 in which a new multi-device workspace is created and the device is denoted as the first device in the new-multi-device workspace.

Returning to step 1806, when previous login data is present in the user activity record (step 1806), the user activity record is checked to determine whether the latest login to the device in step 1802 occurred at a same location as the most recent previous device log in (step 1808). In one or more embodiments of the invention, a same location may be any suitable level of granularity. For example, the login in step 1802 may be performed on a device in the same geographic location as the most recent previous user log in to another device. The same geographic location may be the same room, the same building, the same city, etc. Moreover, workspace devices may be in the same location without being physically adjacent to one another.

Returning to step 1808, if the device login is within a same location as the most recent previous log in, then a second determination is made as to whether the login of step 1802 occurred within the predetermined period of time (step 1810). Said another way, the timestamp of the most recent previous log in to a workspace device is compared to the timestamp of the login that occurs in step 1802. If the logins occurred within a span of a predetermined period of time, then a next consecutive number is assigned to the device onto which the user logged in step 1802. In other words, the workspace management system uses location and time of log in as two criteria by which to determine whether the user wishes to create a multi-device workspace. The process then proceeds to step 1814 in which the device is associated with an existing workspace and assigned the next consecutive number (i.e., workspace device ID) for the workspace (see e.g., FIGS. 12-17). Those skilled in the art will appreciate that the invention is not limited to location and timing of the login to determine when a multi-device workspace is being created, and that other suitable criteria may be used for such a determination. For example, the user may include some default criteria in the user activity profile to indicate to the workspace management system when a multi-device workspace is being created. Further, in one embodiment of the invention, only time (e.g., step 1810) is used to determine whether a given device is part of a workspace. In such embodiments, the geographic location is not required and/or may not be known (or available).

Continuing with FIG. 18, when either the location of the workspace devices from the previous user login and the current user login or the time of login to the workspace devices does not meet the conditions set up by the workspace management system (step 1808 or 1810 result in a "No"), then the workspace management system assumes that the device onto which the user logged into in step 1802 is a device that is part of a new workspace, and assigns that device a first number in the new multi-device workspace (step 1812), and the process ends.

The above process describes how unique identifiers and sequence numbers are assigned to workspace devices forming a multi-device workspace. In one or more embodiments of the invention, workspace devices may be clustered together by the workspace management system. When a cluster of devices are connected together and the system has identified which device is the first, second and subsequent devices using the process of FIG. 18, a user only needs to interact with a single device in the cluster in order to populate any of the workspace devices within with content objects.

In one embodiment of the invention, performing steps 1802, 1804, 1806, and 1812 or performing steps 1802, 1804, 1806, 1808 and/or 1810, and 1812 results in the creation of a new multi-device workspace that includes a single device. Further, in one embodiment of the invention, steps 1802, 1804, 1806, 1808, 1810, and 1814 may be performed to add any number of other devices to the multi-device workspace. In this manner, a multi-device workspace may be dynamically created.

Figure 19:
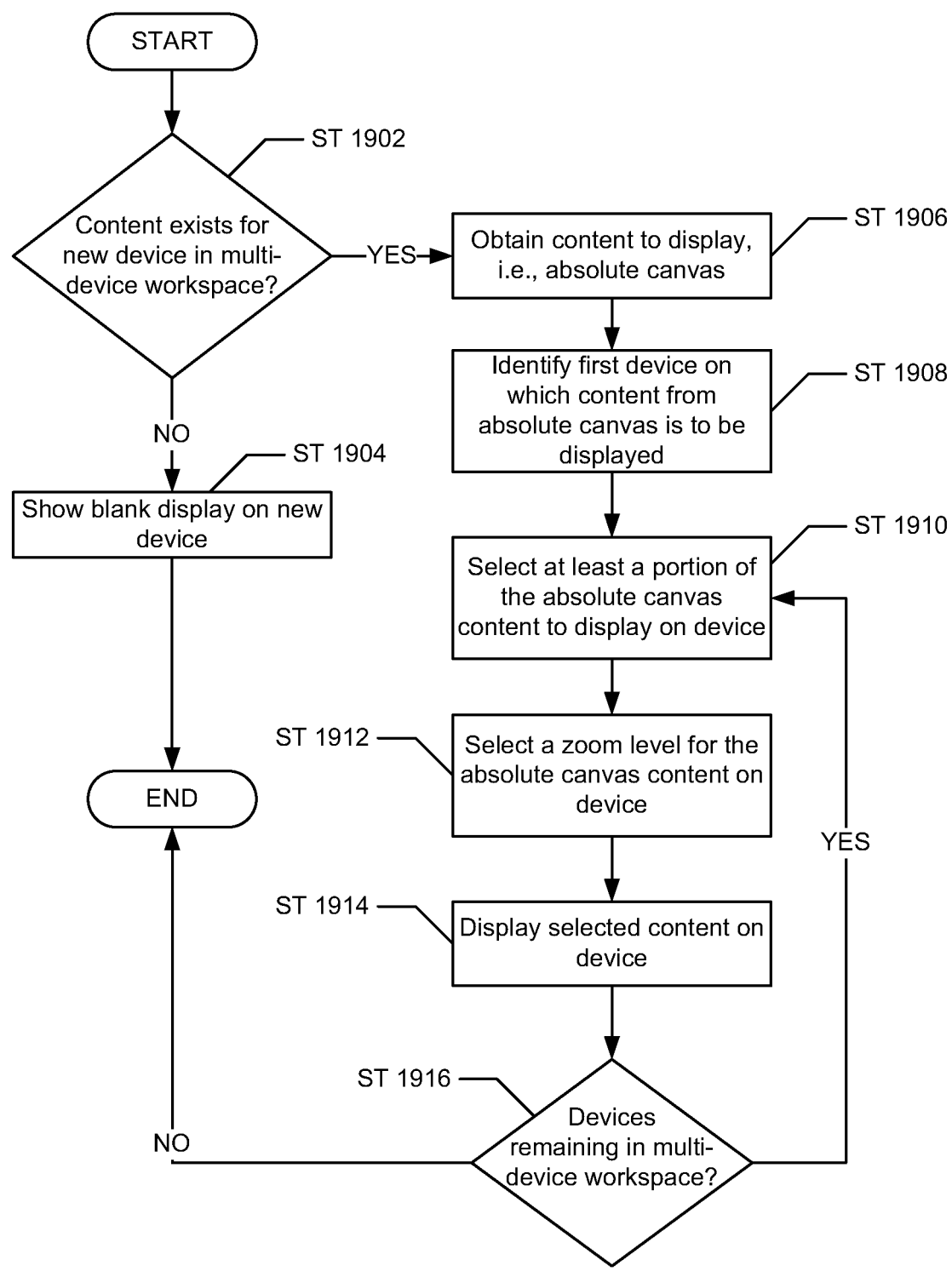

After a multi-device workspace (with one or more devices) has been created, the process in FIG. 19 may be performed.

FIG. 19 shows a flow chart for displaying content in a multi-device workspace in accordance with one or more embodiments of the invention. In step 1902, a determination is made as to whether content exists for the new device in the multi-device workspace. Specifically, in one or more embodiments of the invention, after the multi-device workspace has been created, the workspace management system determines whether the user generated content objects in a previous multi-device workspace session (e.g., the last time the user logged in and added, deleted and/or modified a content object(s) in a virtual canvas). More specifically, the workspace management system may analyze the user active record(s) for the user (i.e., the user that created the multi-device workspace) to determine whether there exists a last state of the virtual canvas (see FIG. 11B, 1122). If there is no last state of the virtual canvas, then the process proceeds to step 1904. Alternatively, if there is a last state of the virtual canvas, then the process proceeds to step 1906. In one embodiment of the invention, even if there is a last state of the virtual canvas, the user may opt to proceed to step 1904 to create a new virtual canvas instead of proceeding to step 1906.

In another embodiment of the invention, the determination on step 1902 is based on whether there are one or more content objects to automatically display in the multi-device workspace. If there are content objects to display, the process proceeds to step 1906.

In step 1904, all the display areas of the workspace devices may be blank until the user generates content objects during the current multi-device workspace session.

In step 1906, the content objects to display in the multi-device workspace are selected. In one embodiment of the invention, selection the content objects to display results in the selection of an virtual canvas of which the selected content objects are a part. In another embodiment of the invention, step 1906 involves the selection of an virtual canvas instead of the selection of individual content objects (or groups of content objects).

Continuing with the discussion of step 1906, selecting of content objects to display may include, for example, obtaining the last display state of the virtual canvas. In another embodiment of the invention metadata associated with the virtual canvas may be used to select content objects to display. For example, the virtual canvas may be associated with information related to a certain place or time when a user login is made. Specifically, a user may have a document that is for a meeting scheduled for a particular day/time on the user's calendar, and, the user may store a default/pre-configured option that when he or she taps or logs in at a workspace device at the meeting location, by default, he or she wants particular content objects to be shown. Thus, rather than displaying the last display state of the virtual canvas upon log in, the user may set particular calendar events that trigger other content objects (from another file, for example) to be displayed on the multi-device workspace when the calendar conditions are met. In other words, the workspace device may display content objects addressed by the metadata. In one or more embodiments of the invention, this metadata may be stored in the user activity record.

Those skilled in the art will appreciate that content objects may be generated using other types of metadata without departing from the scope of the invention. For example, the metadata may be a calendar variable which indicates, at the user's preference's, that when the user taps or logs into a workspace device at a certain time or date, then a particular file will be shown across the multi-device workspace. For example, every Monday at 9:00 am is the user's weekly preparation meeting at the office. When the user taps or attempts to log into a workspace device in the meeting room or in his office on Monday at around 9:00 am, the workspace management system may store the calendar variable and recognize that the content objects generated for the virtual canvas from which the user may select particular content objects groups for display in the multi-device workspace should be "week's preparation meeting document."

In yet another embodiment of the invention, the workspace management system may be configured to "learn" the patterns of use of the user, over time. For example, if every day, the user starts the day by logging into his office workspace device and working on "File x", then, every Monday morning, the user continues drafting a presentation at the company's meeting room and Wednesday night, the user logs into a workspace device at the Rotary club meeting room to present some graphics. By analyzing the user's activity records, the workspace management system may be configured to detect that there is a continuation at Monday's meetings. In this case, when the user logs in to the workspace device on Monday, the first document shown (i.e., the content objects generated for the virtual canvas) may be the continuation of the work from the previous Monday.

Continuing with FIG. 19, once the content objects to display are selected in step 1906, the workspace management system identifies the first workspace device on which content objects from the virtual canvas are to be displayed (step 1908). The determination is step 1908 may be performed using the workspace device IDs (see e.g., FIGS. 12-17) assigned to the devices that are part of the multi-workspace generated using the process of FIG. 18. In other words, the sequential assignment of numbers to each workspace device in the multi-device workspace is obtained and the first device is identified.

In step 1910, at least a portion of the content objects in the virtual canvas (identified in step 1906) may be selected by the user (or automatically selected by the workspace management system) for display on the first device's display area. In one or more embodiments of the invention, selection of content objects from the virtual canvas for display on each workspace device may be performed in multiple ways. For example, the user's secondary device (see e.g., FIG. 17) with which the user logged into the workspace devices may be used as a user interface to control the display of content. The user may be able to see the entirety of the virtual canvas on the secondary device. In this case, the user may select various combinations of content objects (i.e., forming content objects groups) and indicate on which workspace device the selected content should be shown. Alternatively, in one or more embodiments of the invention, default options may be pre-configured and stored for display of content objects in a multi-device workspace. For example, when workspace devices are public devices with the same or similar display area on each device in the same geographic location (e.g., adjacent e-flipchart apparatuses), the content objects from the virtual canvas may be evenly distributed across all of the workspace devices such that the entire file represented by the virtual canvas is displayed across the workspace devices. Alternatively, when workspace devices in the same multi-device workspace are a mix of public and private devices, content objects from the virtual canvas may be mirrored onto each device, such that each device displays the same content objects.

In yet another embodiment, the workspace management system may prompt the user to select the content objects (or content object groups) that the user desires on each workspace device. For example, upon logging into a workspace device, the user may be prompted to choose whether the user wishes to display the last state of the virtual canvas, generate new content objects on a blank multi-device workspace, or use particular metadata stored in the workspace management system to obtain content objects for display.

Upon selection of at least a portion of the virtual canvas for display on the first workspace device (step 1910), the user may select a zoom level for the display of the selected content object groups on the first workspace device (step 1912). In one or more embodiments of the invention, the zoom level may be selected by the user based on the size of the display area of the first workspace device. For example, if the user was working on a file in his office and moves to share the file in a conference room on an e-flipchart apparatus with a relatively large display area, the user may zoom in on the content objects displayed on the e-flipchart apparatus. In one or more embodiments of the invention, the zoom level for different types of workspace devices may be pre-configured and stored in the user activity record. Alternatively, the default zoom level for every workspace device may be the same.

Those skilled in the art will appreciate that other display characteristics besides the zoom level may also be selected by the user. For example, the orientation of the display (e.g., landscape or portrait) is another display characteristic that the user may be prompted to select before the selected portion of the virtual canvas is displayed on the first workspace device.

In one embodiment of the invention step 1912 is performed automatically by the workspace management system.

In step 1914, the selected content object(s) and/or content object group(s) from the portion of the virtual canvas are displayed on the first workspace device, at the selected zoom level. In one embodiment of the invention, step 1914 involves transmission of the selected content object(s) and/or content object group(s) to the appropriate workspace device. At this stage a determination is made as to whether there are additional devices in the multi-device workspace (step 1916). If there are additional devices, then the process returns to step 1910 for the user to select the content object groups for the next device in the multi-device workspace. When no additional devices remain in the multi-device workspace (step 1916), then process ends.

Those skilled in the art will appreciate that while FIG. 19 discusses the process of selecting and displaying content sequentially for each device starting with the first device in the multi-device workspace, in alternate embodiments of the invention, devices in a multi-device workspace may be populated with content objects simultaneously. For example, when the devices are to display the same content objects (the devices mirror each other), all devices in the multi-device workspace may be populated with selected content objects at the same time. In this scenario, the devices may show the same content objects at different zoom levels and in different orientations (depending on the size of the display area of each workspace device), or with the same display characteristics.

Figure 20A:
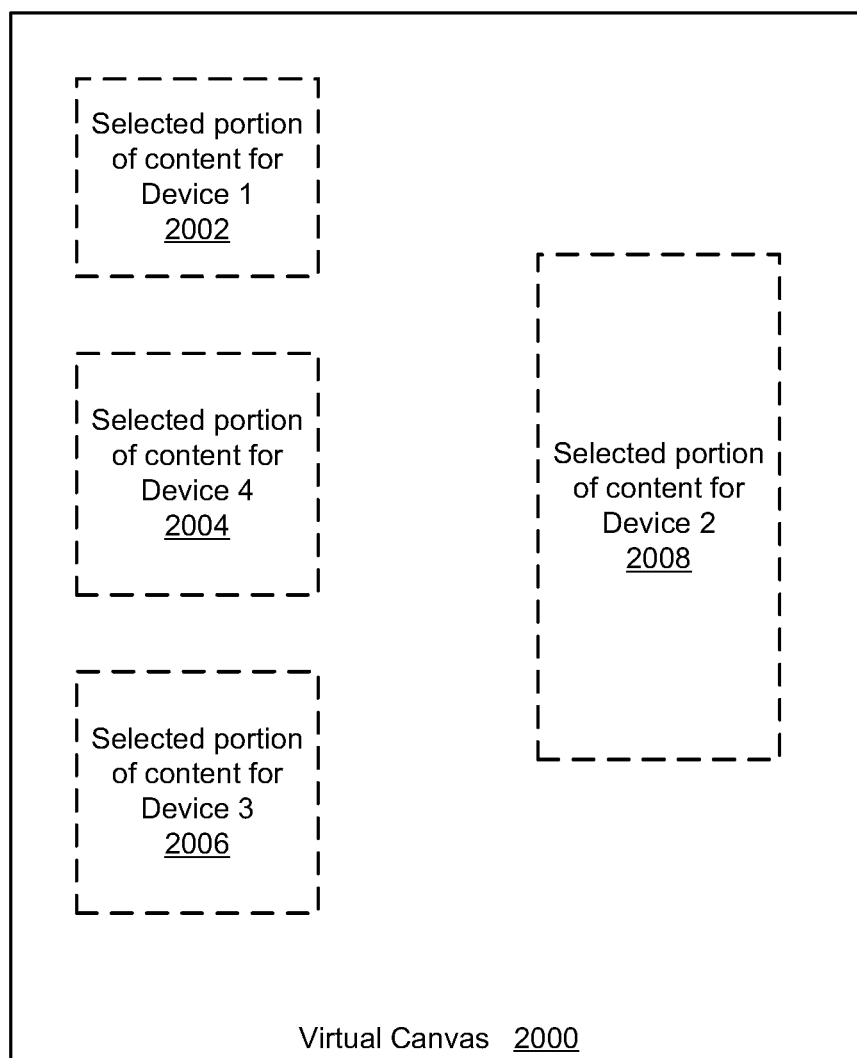
FIGS. 20A and 20B show examples of populating data from a virtual canvas onto multiple devices in accordance with one or more embodiments of the invention.

FIG. 20A shows an example of display areas of four devices (Device 1, Device 2, Device 3, Device 4) which display content objects from the virtual canvas 2000. In one or more embodiments of the invention, the virtual canvas (2000) in FIG. 20A represents a virtual space of content, from which content object groups (2002, 2004, 2006, 2008) may be selected for display on each workspace device of a multi-device workspace. More specifically, all of the content from a file, including text and image data, is represented by the virtual canvas (2000) of FIG. 20A. This file may be, for example, multiple pages of an e-presentation (as described in FIG. 4 above) or a single page of notes. In one or more embodiments of the invention, the content object groups selected and displayed for each device each make up a portion of the virtual canvas. Each selection portion may be a portion of a single page, or may be portions of multiple pages when the content from an entire file is laid out across the virtual representation shown in FIG. 20A.

Further, in the example of FIG. 20A, devices 1, 3, and 4 have similar display areas, and thus, the selected content object groups may be displayed at the same zoom level and in the same orientation. Alternatively, device 2 has a different display area as compared to the other devices, and thus, may display the selected content object group (2008) at differing display characteristics than devices 1, 3, and 4.

In one or more embodiments of the invention, the "position" of the devices shown in FIG. 20A may be determined by the x,y quadrant of the top left corner of the display of each device, and the zoom level may be determined from 100% zoom. The x, y coordinates of the display of each workspace device may be stored in the workspace devices data structure of FIG. 11B.

As can be seen from the example of FIG. 20A, the content object groups displayed on each workspace device (2002, 2004, 2006, 2008) may constitute non-contiguous portions of the virtual canvas. Further, portions of the virtual canvas may not be selected for display on any of the devices in a multi-device workspace.

Figure 20B:
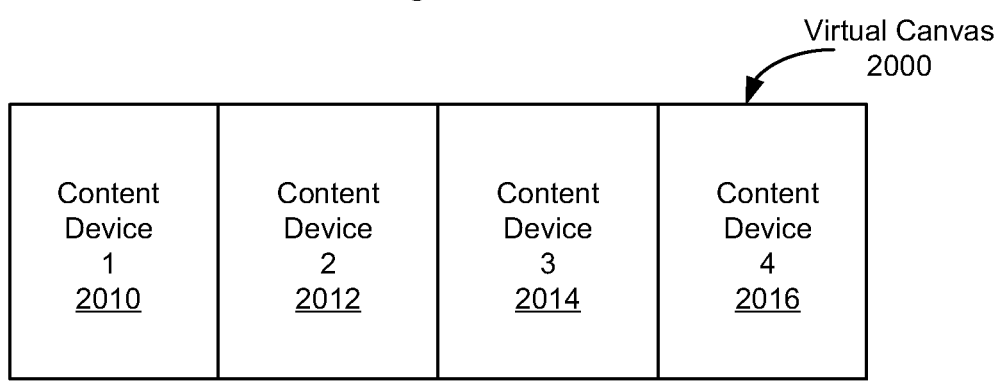

FIG. 20B shows the same virtual canvas (2000) as in FIG. 20A. In FIG. 20B, the content object groups (2010, 2012, 2014, 2016) displayed on each of the four devices display the virtual canvas (2000) in its entirety (all content in the file represented by the virtual canvas). More specifically, the content object groups of the virtual canvas (2000) are displayed as contiguous portions of the virtual canvas (2000). Thus, a single file is evenly distributed across the multi-device workspace in FIG. 20B, where each of the four devices show different content object groups (2010, 2012, 2014, 2016) in a contiguous manner. For example, FIG. 20B represents the example in which the file represented by the virtual canvas has four pages, and page 1 is displayed on device 1, page 2 is displayed on device 2, page 3 is displayed on device 3, and page 4 is displayed on device 4. Those skilled in the art will appreciate that the virtual canvas content may be evenly distributed across all of the multi-device workspace regardless of the number of pages or any other organization of the virtual canvas. The virtual canvas is divided evenly across the workspace devices, such that each workspace device displays a portion of the virtual canvas in a contiguous manner.

The following examples are described to illustration various applications of embodiments of the invention, and are not meant to limit the scope of the invention.

Consider a scenario in which a user previously was working on devices A and B. After a period of time has elapsed, the user logs into device C using the user's smartphone. A determination is then made about whether the new device should be added to an existing workspace that includes devices A and B. If the determination is positive (e.g., the determinations in steps 1808 and 1810 are both "YES"), then device C will be considered a third device in the existing multi-device workspace. Alternatively, if the determination is negative (e.g., the determinations in steps 1808 and/or 1810 are "NO"), then device C will be considered a first device in a new multi-device workspace In another example, suppose a pair of devices are part of a multi-device workspace that only includes two devices. Device A is displaying a layout of a house and Device B is displaying other content. Assume that the user logs out of the first multi-device workspace and then logs into a third device (Device D) which is smaller than devices A and B. In this example assume that Device D becomes the first device in a new multi-device workspace. Further, assume for this example, that the existing virtual canvas for the user is selected for display in the new multi-device workspace. Because the size of the display area of Device D is less than the display area of Devices A and B, the workspace management system automatically selects a subset of the virtual canvas to display on Device D. Accordingly, in this example, only a portion of the house layout is displayed on Device D. In another embodiment, the workspace management system does not specify the subset of the virtual canvas to display and leaves that decision to Device D or the user.

In another example, suppose a pair of devices are part of a multi-device workspace that only includes two devices. Device A is displaying a layout of a house and Device B is displaying other content, where both devices are oriented in a portrait orientation. Assume that the user logs out of the first multi-device workspace and then logs into a third device (Device D) which is smaller than devices A and B, where device D is in a landscape orientation. In this example assume that Device D becomes the first device in a new multi-device workspace. Further, assume for this example, that the existing virtual canvas for the user is selected for display in the new multi-device workspace. Because the size of the display area of Device D is less than the display area of Devices A and B and because the orientation of the new multi-device workspace is different than the existing multi-device workspace, the workspace management system automatically selects a subset of the virtual canvas to display on Device D. The selection of the portion of the virtual canvas to display takes into account both the size and the orientation of Device D. In another embodiment, the workspace management system does not specify the subset of the virtual canvas to display and leaves that decision to Device D or the user.

Figure 21A:
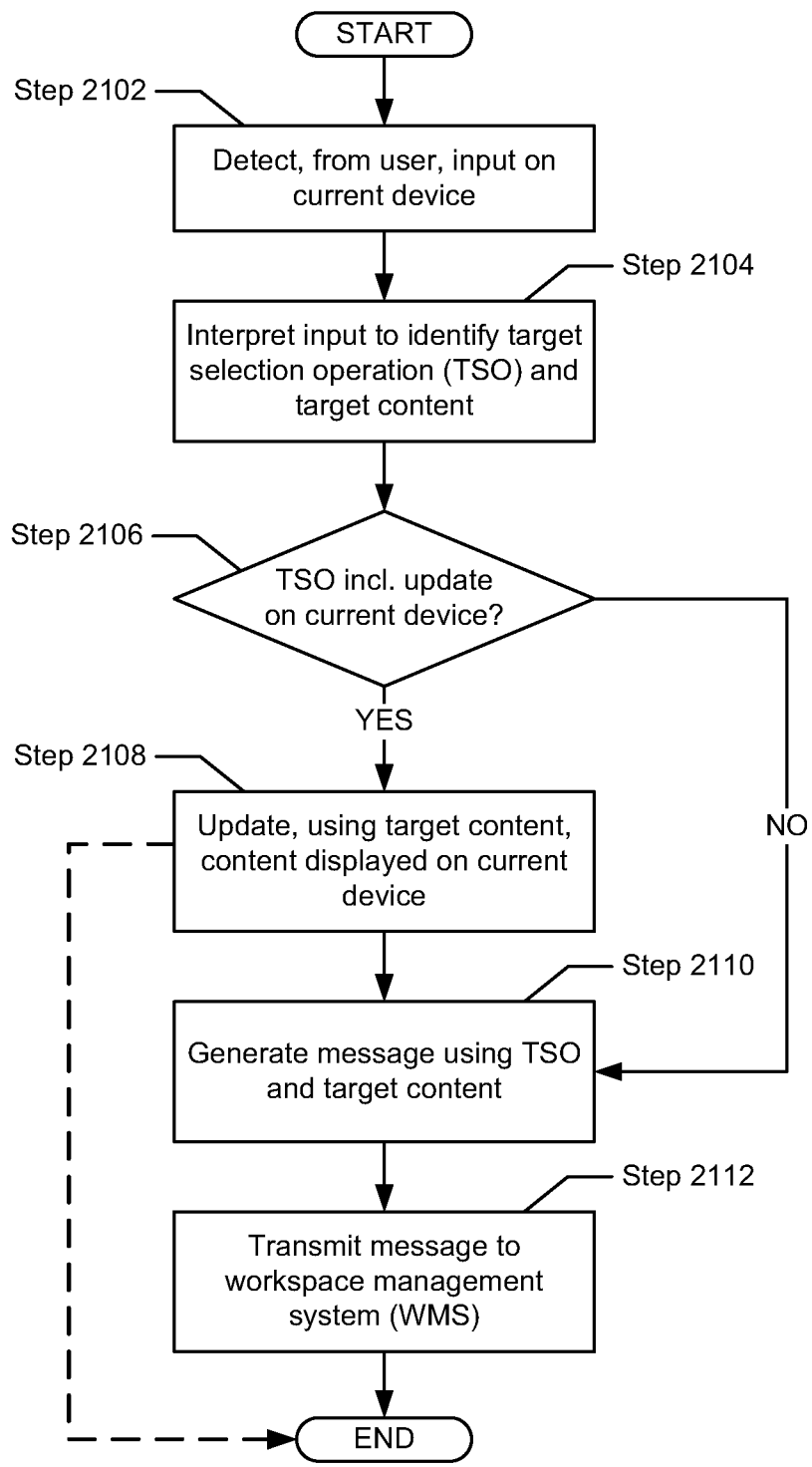
FIGS. 21A, 21B, and 22 show flowcharts in accordance with one or more embodiments of the invention.
Figure 21B:
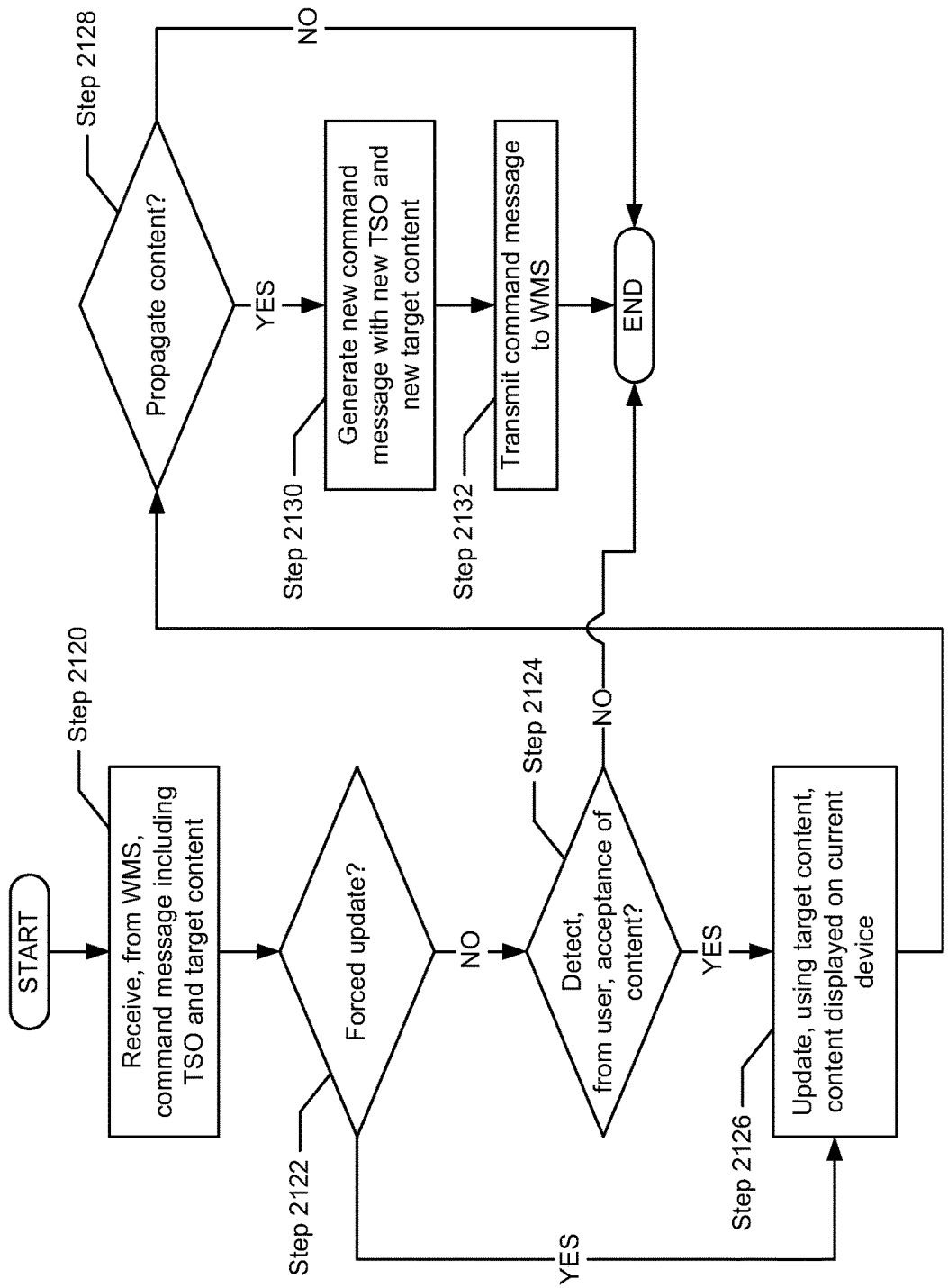
Figure 22:
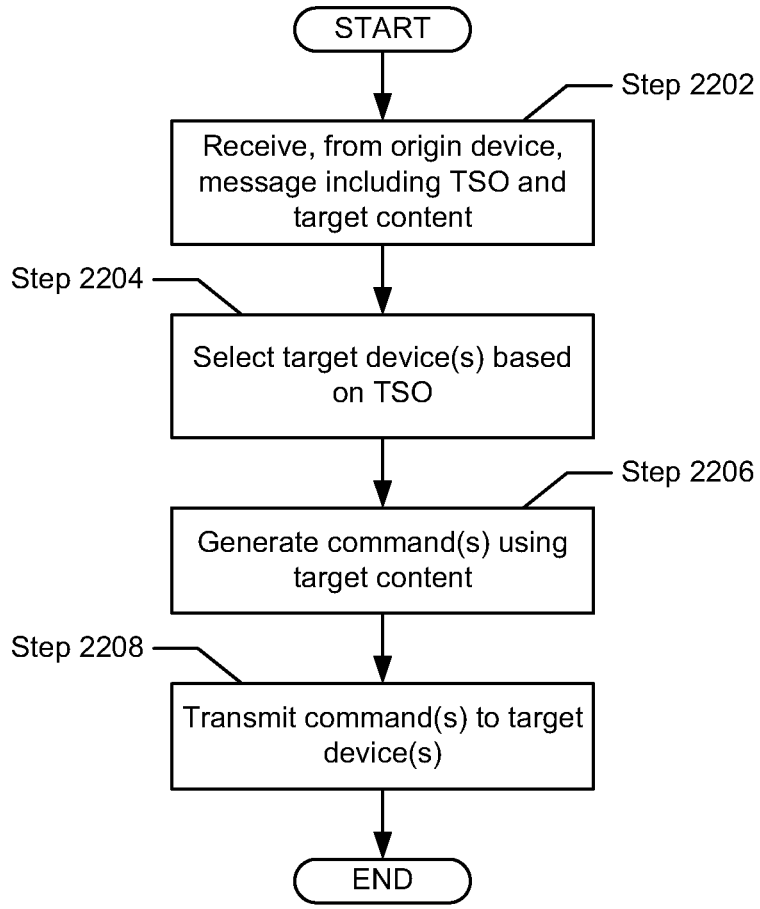

FIGS. 21A, 21B, and 22 show flowcharts in accordance with one or more embodiments of the invention. While the various steps in these flowcharts are presented and described sequentially, one of ordinary skill, having benefit of this disclosure, will appreciate that some or all steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

FIG. 21A shows a flowchart that describes a method for updating content based on user input in accordance with one or more embodiments of the invention. In Step 2102, an input, performed by a user, is detected on a current device (e.g., a multi-device workspace device). In one embodiment of the invention, the input may be a gesture performed by the user's fingers or a digital pen. Further, the gesture may be detected via the fingers' or digital pen's contact with the touchscreen layer of the current device. Moreover, in such an embodiment, the gesture may be representative of a compound gesture, which includes a sequence (i.e., more than one) of gesture strokes. These gesture strokes, whether performed as one continuous or multiple discrete movement(s), capture the gesture. In another embodiment of the invention, the input may be a direct manipulation of a user interface (UI) control component. A UI control component may be an interactive component in the graphical user interface on the display of the current device. UI control components may include, for example, buttons, sliders, dropdown menus, editable text fields, etc.

In Step 2104, the input is interpreted in order to identify an associated target selection operation (TSO) and target content (which may be collectively referred to as a command). As discussed above, in one embodiment of the invention, the input may be a touchscreen hand gesture or a digital pen gesture. In such an embodiment, interpretation of the input may involve: (i) identifying the sequence of one or more gesture stroke(s) that capture the gesture; (ii) accessing a repository (either internal or external to the device), which stores a set of acceptable gesture stroke sequences; (iii) matching the sequence of gesture strokes identified in (i) with one of the gesture stroke sequences stored in the aforementioned repository; and (iv) based on the matching, identifying the TSO and target content corresponding to the gesture stroke sequence. In one embodiment of the invention, the repository may store gesture stroke sequences and corresponding TSOs and target content as key-value pairs, where the gesture stroke sequence may be the key, and a corresponding TSO and target content may be the value. Alternative data structures for storing gestures, TSOs, and target content may be used without departing from the invention.

Further to the discussion above, in another embodiment of the invention, the input may be the direct manipulation of one or more UI control component(s). In this embodiment, interpretation of the input may be representative of the callback function for the interactive component(s). One of ordinary skill would recognize that a callback function includes executable code that performs one or more task(s) in response to different states of an interactive component. To that end, an interactive component may change states depending on a particular interaction with a user. Subsequently, the change of states may trigger the performance of a predetermined set of tasks. As such, in one embodiment of the invention, the callback function of an interactive component (e.g., a UI control component) may result in the identification of a TSO and target content.

In one embodiment of the invention, a target selection operation (TSO) may refer to instructions, directed at a particular device (e.g., current or otherwise), regarding the handling of the corresponding target content. Further, in one embodiment of the invention, the target content may refer to at least a portion of the virtual canvas, to which one or more device(s) are linked. In other words, the target content may include, for example, one or more content object(s), one or more content object group(s), or any other granularity of content enclosed within the file representing the virtual canvas. See e.g., FIGS. 26A-32B.

Returning to the discussion of FIG. 21A, in Step 2106, a determination is made whether or not the TSO (identified in Step 2104) includes instructions to update the current device. If it is determined that instructions to update the current device is included in the identified TSO, the process proceeds to Step 2108; otherwise, the process proceeds to Step 2110.

In Step 2108, having determined that the TSO includes instructions to update the current device, the content displayed on the current device is updated using the target content (identified alongside the TSO in Step 2104). In one embodiment of the invention, updating of the content displayed on the current device may include the supplementation of the currently displayed content with specified content object(s), content object group(s), etc. In another embodiment of the invention, updating the content displayed on the current device may include redirection of the viewed content on the current display towards another portion (of any granular size) of the virtual canvas or toward another device in the multi-device workspace that is viewing the virtual canvas—that is, any granularity of data (e.g., content) in the virtual canvas file. From here, the process may proceed to Step 2110, granted the TSO includes additional instructions; otherwise, the process ends.

In Step 2110, having determined that the TSO does not include instructions to update the current device (following Step 2106), or alternatively, the TSO includes additional instructions supplemental to updating the current device (following Step 2108), a message (also referred to as a command message) is generated using the TSO and target content. In one embodiment of the invention, instructions additional, or alternative, to updating the current device, may be directed at updating content presented on one or more other device(s) sharing (or otherwise linked to) the virtual canvas. To that end, in one embodiment of the invention, the TSO and target content enclosed in the message may be the TSO and target content identified in Step 2104. In another embodiment of the invention, the message may include a new TSO (e.g., a new set of instructions) and new target content. This may be the case when, for example, an input specifies an original TSO to direct a current device to be updated with an original target content, following which the current device generates a new TSO instructing other devices to be updated using previous content (e.g., the new target content) that was presented on the current device prior to the update. In other words, an input may specify new content for a current device, where the old content on the current device is redirected to another device in the multi-device workspace.

In Step 2112, the command message generated in Step 2110, which includes a TSO and a target content, is transmitted to the workspace management system (WMS) (see e.g., FIG. 11A) via the network.

FIG. 21B shows a flowchart that describes a method for handling content in response to receiving a command message in accordance with one or more embodiments of the invention. In Step 2120, a command message that includes a TSO and target content (or information which identifies the target content), is received from the WMS. In Step 2122, a determination is made as to whether the command message includes instructions for forcing the application of the received target content onto the current device (see e.g., FIGS. 26A-32B). Subsequently, if the command message includes such an instruction(s), the process proceeds to Step 2126; otherwise, the process proceeds to Step 2124.

In Step 2124, provided the command message (received in Step 2120) does not include an instruction specifying the forced update of the content displayed on the current device, another determination is made as to whether or not the user operating the current device has accepted the received target content. In one embodiment of the invention, upon receiving a command message, at least a portion of the associated target content may be presented on at least a portion of the display of the current device, whereupon the user may choose to accept or reject the target content. At this point, if it is detected that the user has accepted the received target content, the process proceeds to Step 2126; otherwise, with the user having rejected the target content, the process ends. In another embodiment of the invention, regardless of whether the user accepts the target content, the process proceeds to step 2128. In such instances, the content displayed on the device which received the command message in step 2120 is not updated; however, the updating of content on other devices in the multi-device workspace (see e.g., FIG. 16) may continue.

In Step 2126, having determined that the received command includes an instruction to force content onto the current device (following Step 2122), or alternatively, if it is detected that the user has accepted the target content (following Step 2124), the content displayed on the current device is updated using the target content (received in Step 2120). Similar to Step 2108, in one embodiment of the invention, updating of the content displayed on the current device may include the supplementation of the currently displayed content with specified content object(s), content object group(s), etc. In another embodiment of the invention, updating the content displayed on the current device may include redirection of the viewed content on the current display towards another portion (of any granular size) of the virtual canvas—that is, any granularity of data (e.g., content) in the virtual canvas file. The process proceeds to Step 2128

In Step 2128, a third determination is made as to whether or not the TSO (received in Step 2120) contains instructions to propagate content to additional devices sharing (or otherwise linked to) the virtual canvas. Subsequently, if it is determined that the received TSO includes instructions to propagate content, the process proceeds to Step 2130; otherwise, if content propagation is not an included instruction, the process ends.

In Step 2130, having determined that content is to be propagated to at least another device, a new message is generated, which includes a new target selection operation (TSO) and new target content. In one embodiment of the invention, the new TSO may resemble the instructions provided in the TSO received in Step 2120. In another embodiment of the invention, the new TSO may encompass alternative instructions. Similarly, the new target content may be the target content received in Step 2120, or alternatively, may be representative of, for example, content that had previously been displayed (before the update of Step 2126) on the current device. Lastly, in Step 2132, the new message (generated in Step 2130) is transmitted to the workspace management system (WMS).

Those skilled in the art will appreciate that the process of FIG. 21B may repeat for each device in the multi-device workspace that may receive a message with a TSO and target content. In other words, the process of FIG. 21B may repeat if, for example, the message generated in Step 2130 also includes instruction to propagate the content of the least another device to yet another device in the multi-device workspace.

FIG. 22 shows a flowchart that describes a method for the dissemination of command messages to devices in accordance with one or more embodiments of the invention. In Step 2202, a message (also referred to as command message) is received from an origin device. In one embodiment of the invention, the message includes a target selection operation (TSO) and corresponding target content (or information which identifies the target content). In Step 2204, one or more target device(s) are selected based on the received TSO. As mentioned above, the TSO may refer to instructions, directed at a particular device (e.g., current or otherwise) in the multi-device workspace, regarding the handling of the corresponding target content. Further, in one embodiment of the invention, the workspace management system may have the benefit of knowing the ordering of devices associated with a virtual canvas. In one embodiment of the invention, an ordering of devices may represent an arrangement of the devices, associated with a virtual canvas, through which content is propagated. For example, consider there were four devices (Device 1, Device 2, Device 3, Device 4) linked to a given virtual canvas with an ordering of devices arranging the devices in the following manner: Device 2↔Device 3 ↔Device 1↔Device 4. Given the aforementioned ordering of devices, the WMS may conclude that when receiving a message from Device 3 with a TSO directing some target content to the device following it in the ordering of devices, the WMS accordingly propagates the target content onto Device 1.

In one embodiment of the invention, after determining which target device(s) are to receive the target content provided by the origin device, one or more command message(s) directed at the one or more target device(s) are generated in Step 2206. In one embodiment of the invention, a command message may include the same or an alternative TSO (e.g., instructions), received in Step 2202, as well as the target content. In Step 2208, the one or more command(s) are transmitted towards their respective target device(s) using address information. In one embodiment of the invention, the address information used to transmit the command message (s) through the network to their respective target device(s) may be stored in the records on the WMS.

Figure 23A:
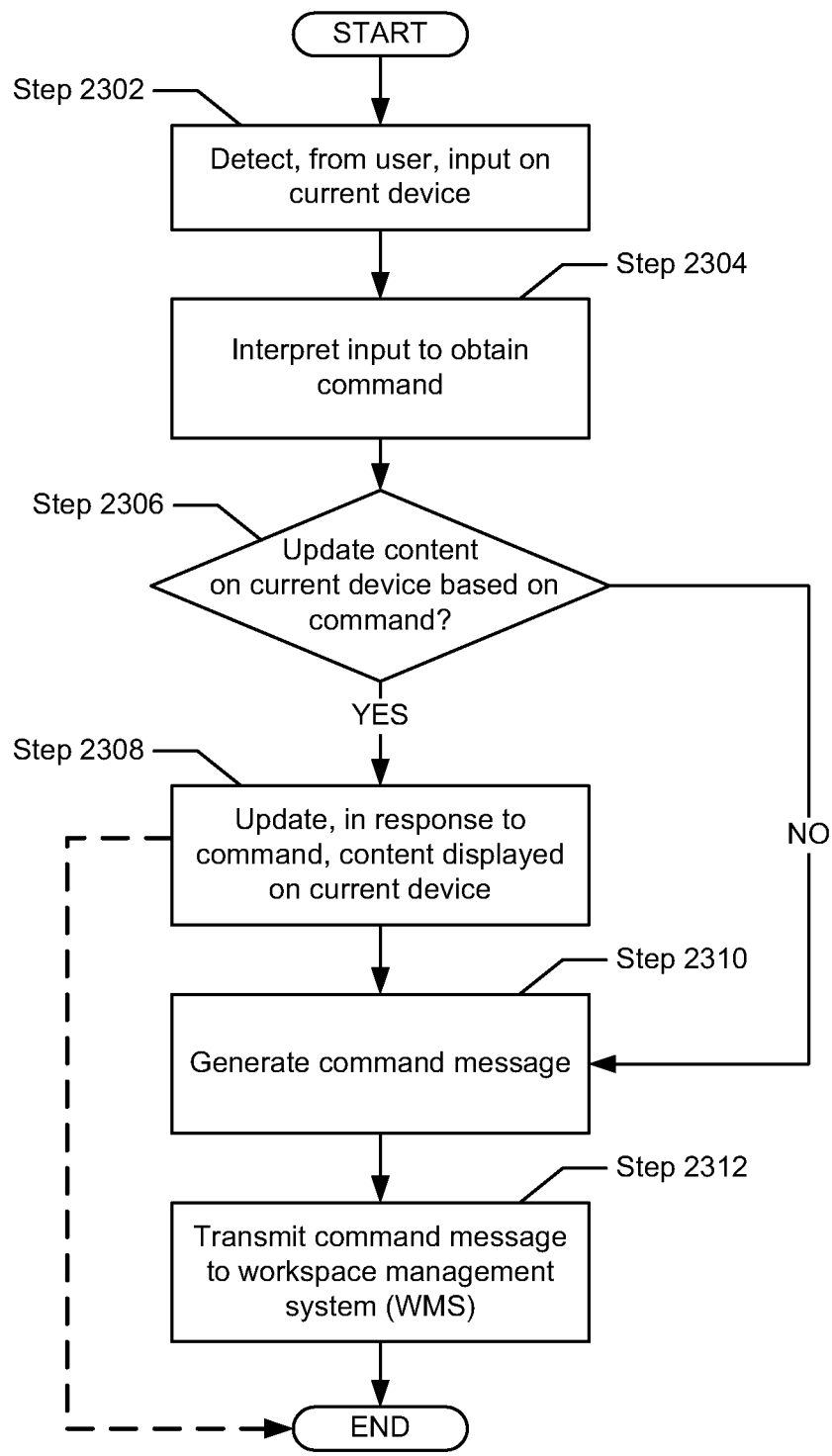
FIGS. 23A, 23B, and 24 show flowcharts in accordance with one or more embodiments of the invention.
Figure 23B:
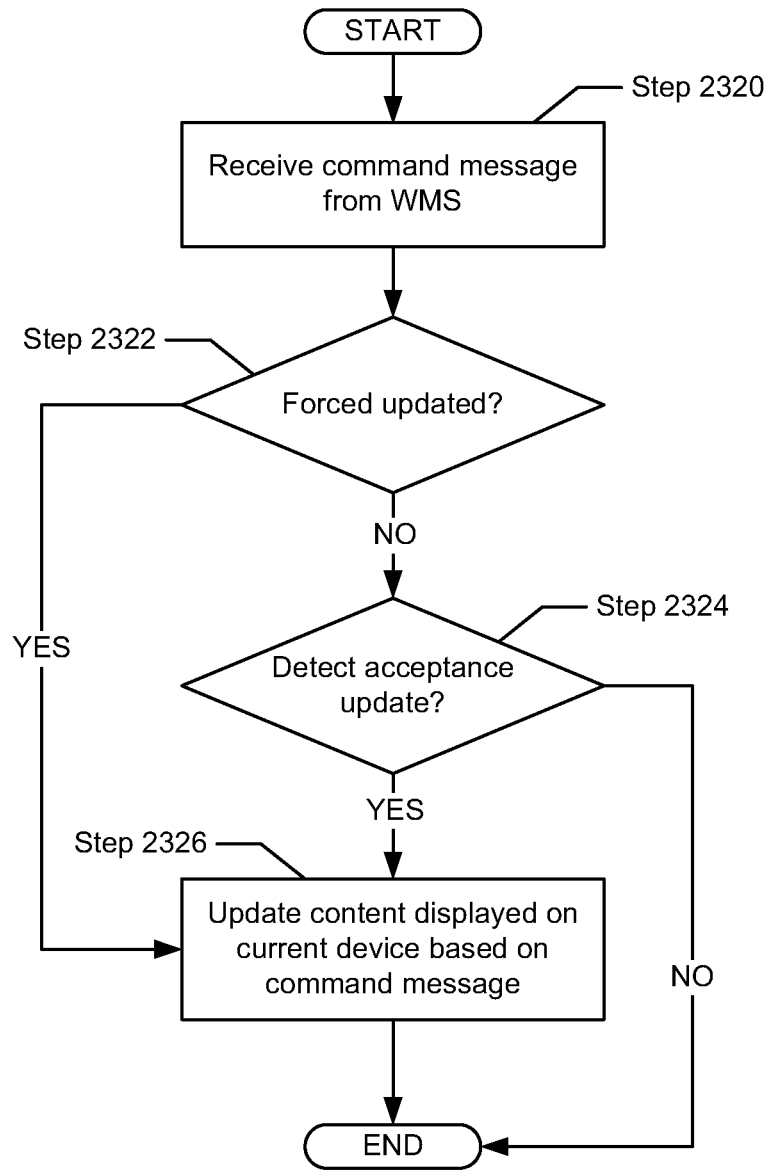
Figure 24:
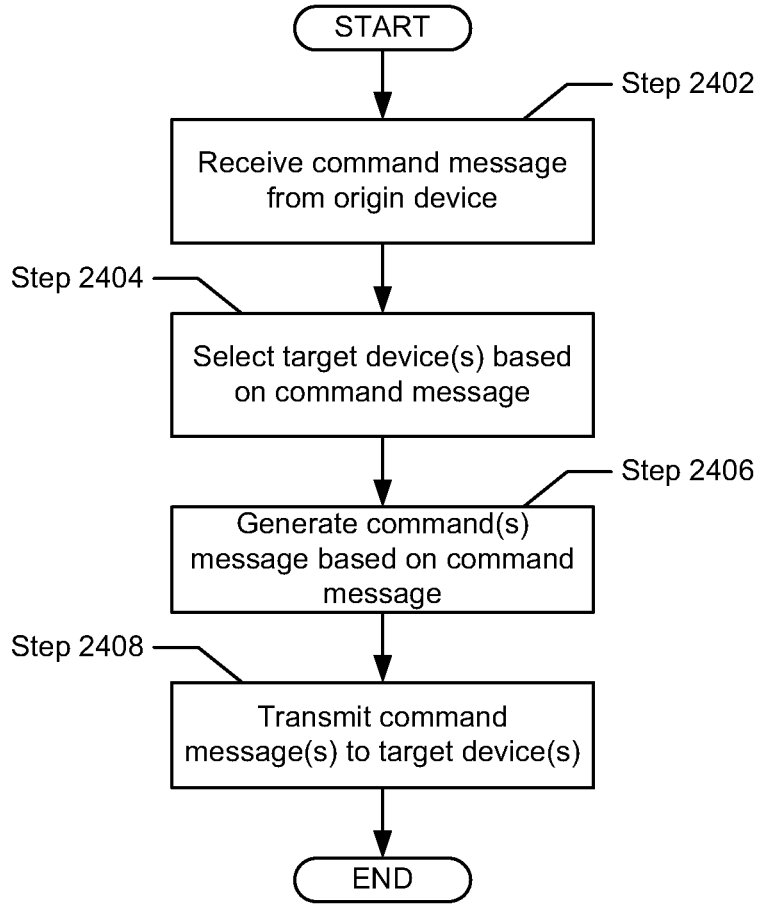

FIGS. 23A, 23B, and 24 show flowcharts in accordance with one or more embodiments of the invention. While the various steps in these flowcharts are presented and described sequentially, one of ordinary skill, having benefit of this disclosure, will appreciate that some or all steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

FIG. 23A shows a flowchart that describes a method for updating content based on user input in accordance with one or more embodiments of the invention.

In step 2302, input by the user is detected by the current device. Step 2302 is substantially similar to step 2102 in FIG. 21A.

In step 2304, a command corresponding to the input is determined. The determination of the command which corresponds to the input is performed in a manner that is substantially similar to step 2104 in FIG. 21A. In one embodiment of the invention, the command may include a TSO (as defined above) and, if appropriate, may specify target content. Examples of commands may include, but are not limited to, cascade left (which may be referred to as cascade command), cascade right (which may be referred to as cascade command), zoom, zoom and pan, and display content X on device Y. In one embodiment of the invention the target content may be specified using content identification information (CII). The CII may specify the name of the file (or content) (or another identifier that uniquely identifies the file (or content)), which portion of the file (or content) to be displayed, and the zoom level at which to display the file (or content). The CII may include different or additional information without departing from the invention.

In step 2306, a determination is made about whether to update the content that is displayed on the current device in response to the command. If the content that is displayed on the current device is to be updated, then the process proceeds to Step 2308; otherwise, the process proceeds to step 2310.

In one embodiment of the invention, the current device performs the determination in step 2306 by interpreting the command in order to determine whether the command the user has requested necessitates a change in the content that is displayed on the current device. In another embodiment of the invention, step 2306 is performed by the WMS (see e.g., FIG. 11A) as the current device does not include the necessary information and/or functionality to perform the determination in step 2306.

Continuing with the discussion in FIG. 23A, in step 2308, the content that is displayed on the current device is updated, where the updated content to be displayed on the device is determined using the command. For example, prior to step 2308 the current device is displaying page 1 of a file and after step 2308, the current device is displaying page 2 of the file. In one embodiment of the invention, step 2308 may include: (i) obtaining updated content to the be displayed on the current device from the WMS (or from another source) or (ii) modifying which portion of a previously obtained file is displayed on the current device (e.g., a file with 10 pages was previously obtained and after step 2308 a different page in the file is displayed on the current device).

In one embodiment of the invention, the command specifies the specific content to be displayed and, in such instances, step 2308 includes extracting this information from the command and then displaying the content specified in the command. In another embodiment of the invention, in order to determine the content to be displayed on the current device, the command is interpreted in conjunction with a display mode of the current device. For example, referring to FIG. 16, consider a scenario in which device B (1206) is currently displaying page 2 (1213) of a file, has a current display mode of "cascade left", and receives a command "cascade". In such a scenario, device B interprets the command of cascade with the display mode of cascade left to update its display to include page 3 of the file.

Continuing with the discussion of FIG. 23, in step 2310, a command message is generated. In one embodiment of the invention, the command message may only be generated if the current device determines that the command may require content displayed on at least one other device to be updated. In another embodiment of the invention, a command message is always generated or is generated for a certain set of commands.

In one embodiment of the invention, the command message may only specify the command (e.g., cascade right). In another embodiment of the invention, the command message may only specify how the content displayed on the current device has been updated, e.g., device B is displaying page 2 of file foo or device B has zoomed into a particular portion of file foo at zoom level 125%. In another embodiment of the invention, the command message may specify a particular device and specific content to be displayed on the device (e.g., display page 3 of file foo on device B). The invention is not limited to the aforementioned examples. In step 2312, the command message generated in step 2312 is transmitted to the WMS.

FIG. 23B shows a flowchart that describes a method for handling content in response to receiving a command message in accordance with one or more embodiments of the invention.

In step 2320, a command message is received from the WMS (e.g., a command message generated in FIG. 24, described below).

In Step 2322, a determination is made as to whether or not the device (which received the command message) must update its displayed content. In one embodiment of the invention, the determination in step 2322 may be based, e.g., on whether the device settings default to automatically updating what content is displayed on the device in response to receiving a command message or the device settings require a user of the device to affirmatively accept the updated content resulting from processing of the command message. In another embodiment of the invention, the command message may specify (regardless of device settings) that the content displayed on the device must be updated based on the command message.

If the content displayed on the device must be updated based on the command message, the process proceeds to Step 2326; otherwise, the process proceeds to Step 2324.

In Step 2324, a determination is made as to whether or not the user operating the current device has accepted the received target content. In one embodiment of the invention, upon receiving a command message, at least a portion of the updated content (i.e., the content that would be displayed on the device if the command message is processed) may be presented on at least a portion of the display of the current device, whereupon the user may choose to accept or reject the updated content. At this point, if it is detected that the user has accepted the updated content, the process proceeds to Step 2326; otherwise, with the user having rejected the updated content, the process ends.

In step 2326, having determined that the received command includes an instruction to force content onto the current device (following Step 2322), or alternatively, if it is detected that the user has accepted the updated content (following Step 2324), the updated content is displayed on the device. In one embodiment of the invention, the command message may be processed in a manner similar to Step 2308 in FIG. 23A where the processing results in updated content being displayed on the device.

FIG. 24 shows a flowchart that describes a method for the dissemination of command messages by the WMS to devices in accordance with one or more embodiments of the invention.

In step 2402, a command message (i.e., a command message issued in step 2312 of FIG. 23A) is received from an origin device (i.e., a device on which the user provided the input which triggered the generation of the command message).

In step 2404, one or more target devices are identified in response to receiving the command message. In one embodiment of the invention, step 2404 may include identifying all devices that are part of the same multi-device workspace as the origin device. In another embodiment of the invention, if the command message specifies a specific target device(s) then the one or more target devices identified in step 2404 may be determined by extracting information identifying the specific target device(s) from the command message.

In step 2406, one or more command messages are generated. In one embodiment of the invention, one command message may be generated for each target device identified in step 2404. The content of the command messages may vary based on the implementation of the invention. For example, in one embodiment of the invention, the command message generated in step 2406 includes the same content (or substantially the same content) as the command message received in step 2404. In another embodiment of the invention, the command message generated in step 2406 includes information derived from the command message but none (or a very limited amount of information) from the command message received in step 2402. See e.g., FIGS. 26A-32B.

Figure 25:
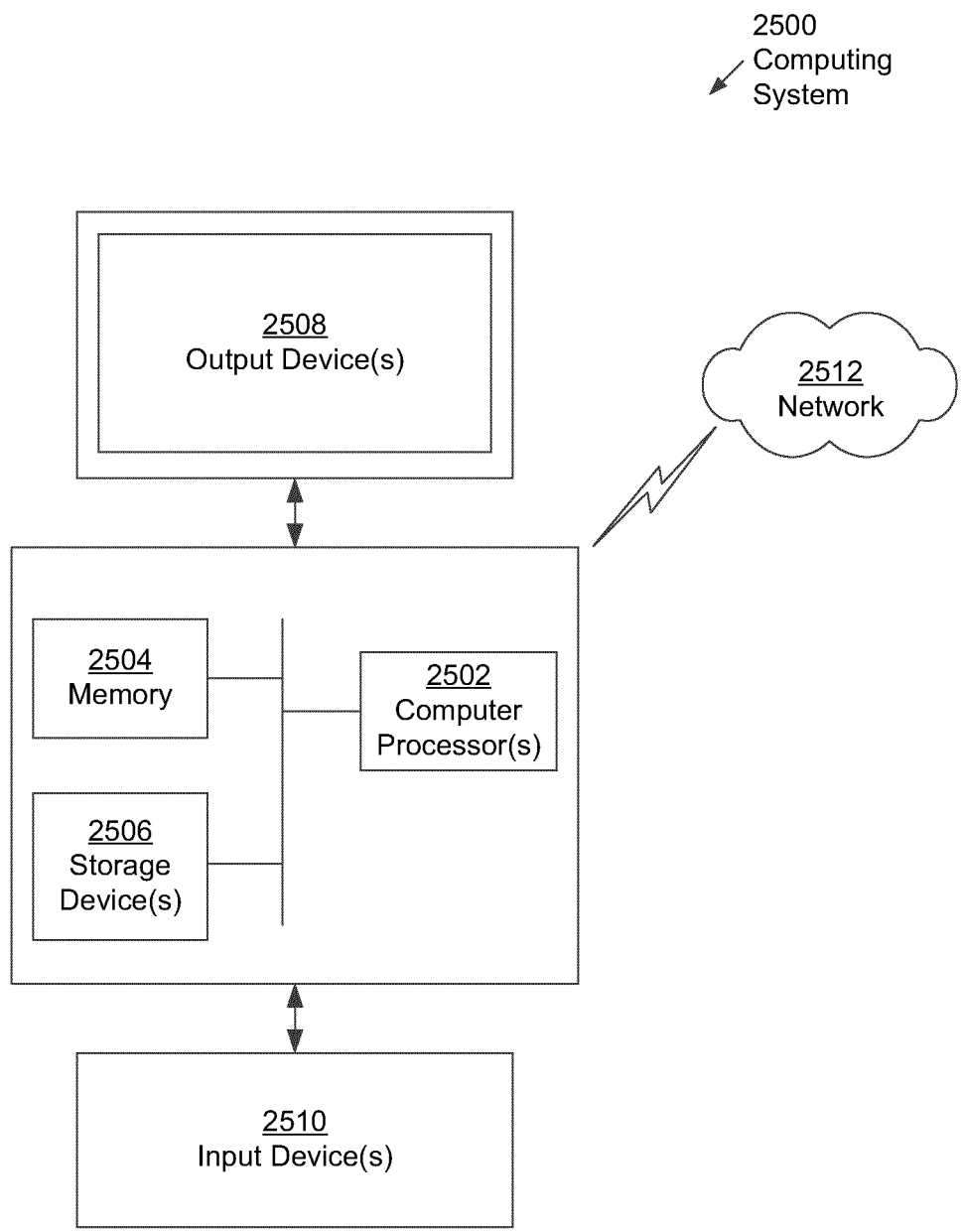
FIG. 25 shows a computing system in accordance with one or more embodiments of the invention.

In step 2408, the command message(s) generated in step 2406 is transmitted to the appropriate target device (i.e., the devices identified in step 2404) using address information. In one embodiment of the invention, the address information used to transmit the command message (s) through the network to their respective target device(s) may be stored in the records on the WMS Embodiments of the invention may be implemented on a computing system. Any combination of mobile, desktop, server, embedded, or other types of hardware may be used. For example, as shown in FIG. 25, the computing system (2500) may include one or more computer processor(s) (2502), associated memory (2504) (e.g., random access memory (RAM), cache memory, flash memory, etc.), one or more storage device(s) (2506) (e.g., a hard disk, an optical drive such as a compact disk (CD) drive or digital versatile disk (DVD) drive, a flash memory stick, etc.), and numerous other elements and functionalities. The computer processor(s) (2502) may be an integrated circuit for processing instructions. For example, the computer processor(s) may be one or more cores, or micro-cores of a processor. The computing system (2500) may also include one or more input device(s) (2510), such as a touchscreen, keyboard, mouse, microphone, touchpad, electronic pen, or any other type of input device. Further, the computing system (2500) may include one or more output device(s) (2508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (2500) may be connected to a network (2512) (e.g., a local area network (LAN), a wide area network (WAN) such as the Internet, mobile network, or any other type of network) via a network interface connection (not shown). The input and output device(s) may be locally or remotely (e.g., via the network (2512)) connected to the computer processor(s) (2502), memory (2504), and storage device(s) (2506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (2500) may be located at a remote location and connected to the other elements over a network (2512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

FIGS. 26A-32B show examples in accordance with one or more embodiments of the invention. Throughout each of the following examples, consider that there are four individual devices (e.g., 2601, 2602, 2603, 2604) linked to a virtual canvas and workspace management system (WMS) via a network. The devices may or may not be co-located, may be operated by a single user or different users, and/or may be private or public devices. Further, for simplicity, consider that the ordering of devices, which may only be known to the WMS (not shown), is as follows: Device 1 (e.g., 2601)↔Device 2 (e.g., 2602)↔Device 3 (e.g., 2603)↔Device 4 (e.g., 2604). The following examples (including the portrayed user inputs, content, etc.) are for explanatory purposes only and are not intended to limit the scope of the invention. As such, throughout the examples, inputs (gestures/controls) may be demonstrated in a particular way, however, other ways to initiate the various content propagations may exist without departing from the invention.

Figure 26A:
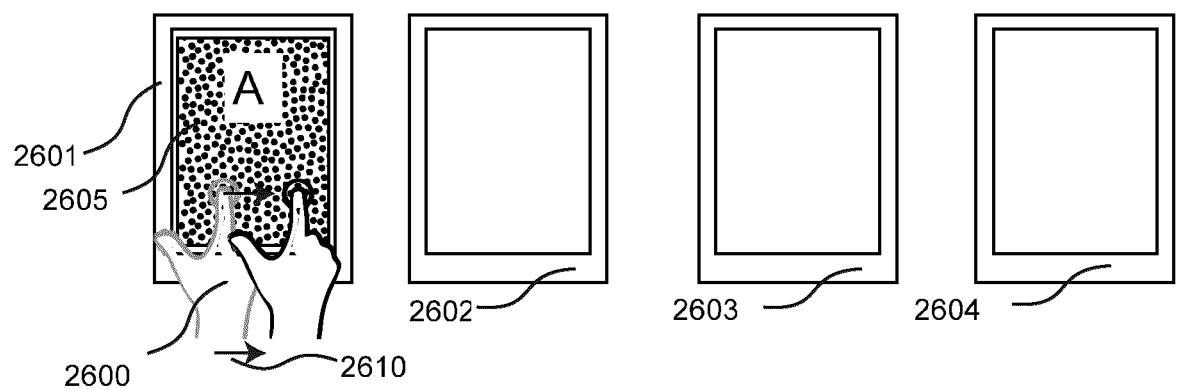
FIGS. 26A-32B show examples in accordance with one or more embodiments of the invention.
Figure 26B:
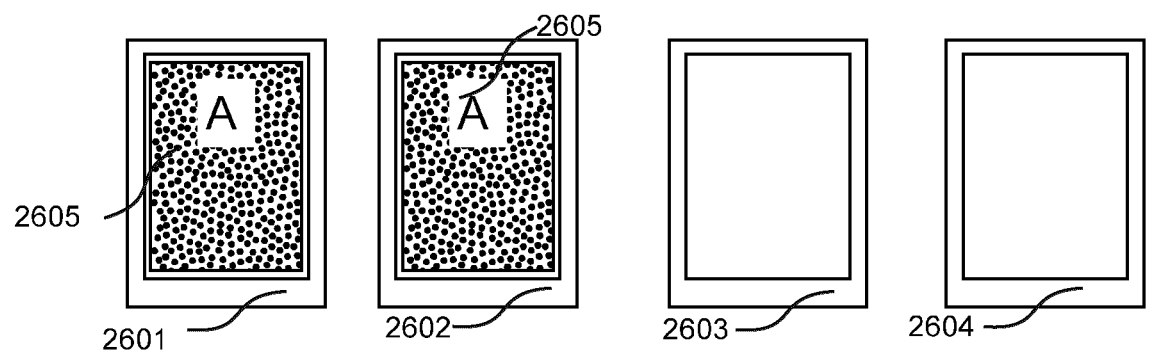

FIGS. 26A-26B show an example describing basic content propagation in accordance with one or more embodiments of the invention. In one embodiment of the invention, basic content propagation refers to the pushing of content from a device to an adjacent device in an ordering of devices. As the initial setting for the example, Device 1 (2601) is displaying content A (2605) corresponding to a first portion of the virtual canvas, whereas the remaining devices (2602, 2603, 2604) have yet to present any content.

In FIG. 26A, a user (2600) initiates an instance of basic content propagation by performing, in one embodiment of the invention, a horizontal sliding gesture (e.g., a touch input) (2610) on the surface of Device 1 (2601). Subsequently, Device 1 detects and proceeds to interpret the captured gesture. As discussed above, in one embodiment of the invention, interpretation of the captured gesture, by Device 1, may include: (i) breaking down the captured gesture into one or more gesture stroke component(s); (ii) accessing a local or network repository of recognized gesture stroke sequences; (iii) comparing the one or more gesture stroke component(s) against the recognized gesture stroke sequences stored in the repository; (iv) identifying a matching recognized gesture stroke sequence corresponding to the captured gesture; and (v) retrieving, from the repository, a target selection operation (TSO) and target content associated with the matching gesture stroke sequence.

In one embodiment of the invention, interpretation of the horizontal sliding gesture may specify the target content as the content currently displayed on the current device, whereas the TSO may include instructions directing the current device to push the target content to an adjacent device in the ordering of devices. Following the method described in FIG. 21A, Device 1 (2601) (e.g., the current device) analyzes the aforementioned TSO and determines the TSO does not include instructions for content to be updated on the current device. Based on this determination, Device 1 moves towards generating a message using the identified TSO and target content (e.g., content A (2605)), which Device 1 promptly transmits to the workspace management system (WMS).

In one embodiment of the invention, upon receiving the message (from Device 1 (2601)), the WMS (not shown) may first examine the received TSO in order to select the one or more target device(s) to which to issue commands (or to whom to propagate the target content). Having benefit of the ordering of devices associated with the virtual canvas (disclosed above), the WMS determines that the device adjacent to Device 1 (2601) is Device 2 (2602). Based on this determination, the WMS generates a command, directed at Device 2, that includes the target content (e.g., content A (2605)) received by Device 1, and further, includes instructions for Device 2 to forcibly apply the target content onto its display. Following generation of the command, the WMS transmits the command through the network towards Device 2. Promptly, Device 2 receives the aforementioned command from the WMS and accordingly, based on the accompanying instructions, updates its currently displayed content using the target content (shown in FIG. 26B). In one embodiment of the invention (see e.g, FIG. 21A-22), with no additional instructions to propagate any content down the line in the ordering of devices, Device 2 does not generate, nor transmit, its own respective message. In another embodiment of the invention (see e.g., FIGS. 23A-24), the WMS only generates a single command message and transmits the command message to Device 2. As a result, only the content displayed on Device 2 is updated and there is no change with respect to what is displayed on any of the other devices (i.e., 2603, 2604).

Figure 27A:
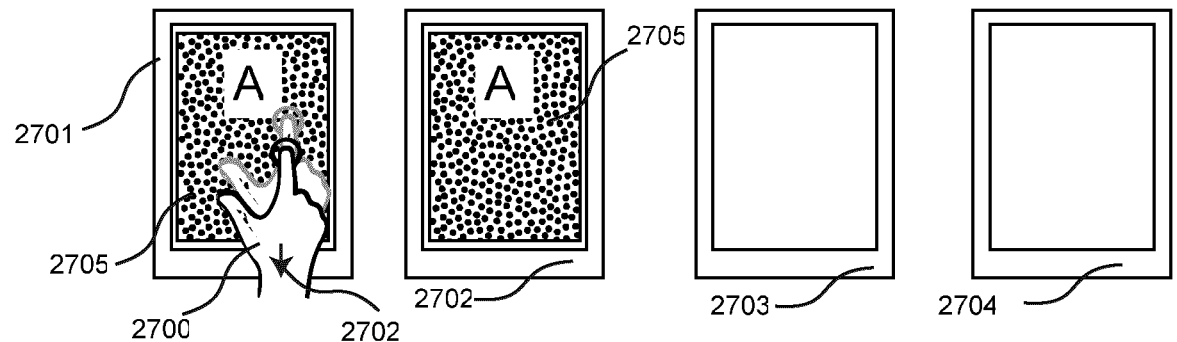
Figure 27B:
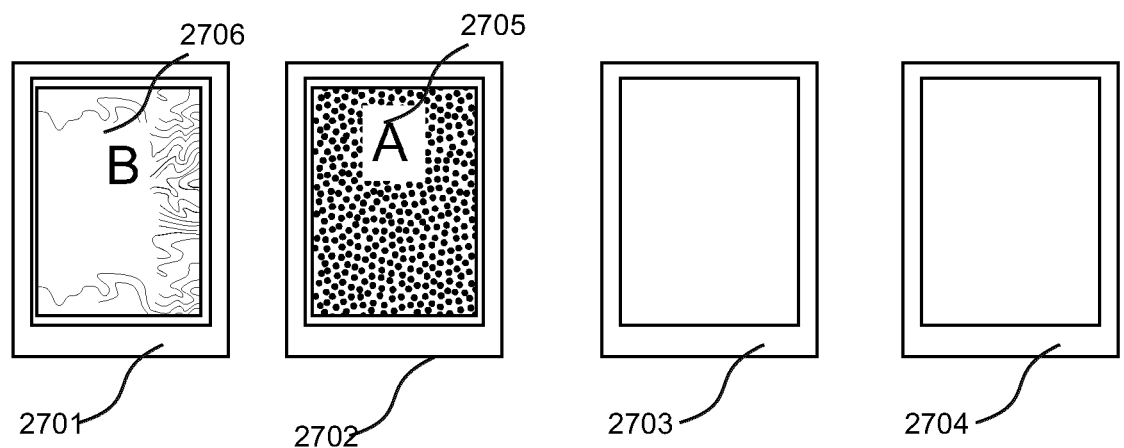

In FIG. 27A, the user (2700) additionally performs a second gesture (2712) on the Device 1 (2701). Interpretation of the second gesture leads to the identification of a second TSO and a second target content. Based on the singular stroke that captures the second gesture, the second TSO includes instructions directing the first device to update the content its currently displaying using the next page or area of the virtual canvas (e.g., the second target content). Subsequent to the instructions of the second TSO, the Device 1 (2701), as portrayed in FIG. 27B, updates the content its currently displaying using the next page of virtual canvas, or some content B (2707). In this case, a second message is not generated and forwarded to the WMS because the second TSO excluded supplemental instructions to propagate the second target content to other devices.

In another embodiment of the invention (see e.g., 23A-24), the gesture (2702) results in the generation of command message, which is then sent to the WMS (not shown). The WMS subsequently generates a second command message, which specifies that Device 1 (2701) is to be updated with new content (2706) and then transmits the second command to Device 1 (2701). Device 1 (2701) subsequently updates its display to show the new content (2706).

FIGS. 28A-28F illustrate the updating and propagating of content according to the performance of two distinct gestures (each captured by a single stroke). In one embodiment of the invention, the compound gesture may encompass the combination of the aforementioned two distinct gestures as a single, continuous movement. In another embodiment of the invention, the compound gesture may encompass multiple discrete movements, wherein the individual movements are performed within a specified time interval from one another in order for the system to bundle and recognize the multiple discrete movements (or strokes) as a compound gesture.

Following the performance of the compound gesture (2812, 2810), the compound gesture is interpreted, which yields a third TSO and third and fourth target content. At this point, whereas the first TSO and second TSO, respective to the first two examples (above), included instructions to either update the adjacent device (e.g., propagate content to another device) or update the current or first device, separately, the third TSO includes instructions to update both the current and adjacent devices with appropriate target content accordingly. In other words, what might occur, in one or more embodiments, as directed by the third TSO is the following: (i) Device 1 (2801) updates its content using the next page or area of the canvas (e.g., content B (2806)), specified as the third target content; (ii) Device 1 then generates a third message containing a fourth TSO (forcibly directing the adjacent device to update its content using the fourth target content) and the fourth target content (e.g., content A (2805)); (iii) the third message is transmitted to the WMS; (iv) the WMS identifies the adjacent device, per the fourth TSO's instructions, as Device 2 (2802) and subsequently, generates and forwards a command to Device 2 relaying the fourth TSO and fourth target content; and (v) then, Device 2 receives the command, issued by the WMS, and based on the command, updates its displayed content using the fourth target content. Summarily, in one embodiment of the invention, the system need only interpret one compound gesture (or one sequence of gesture strokes) in order to realize the potential instructions of multiple individual gestures.

FIGS. 28C-28F render the aftermath of performing the aforementioned compound gesture several more times. More specifically, FIGS. 28C and 28D capture the performance and result of implementing the compound gesture (2812, 2810) a second time. Based on the interpretation of the compound gesture and the content displayed on the individual devices (2801, 2802, 2803, 2804) at the time of the interpretation: (i) Device 1 is updated using a next page or area of the virtual canvas (e.g., content C (2807)), while propagating its prior content (e.g., content B (2806)) to an adjacent device; (ii) Device 2 (e.g., the device adjacent to Device 1) is updated using the content previously displayed on Device 1 (or content B (2806)), while propagating its respective prior content (e.g., content A (2805)) to the subsequent device in the ordering of devices; and (iii) Device 3 (2803) is updated using the previous content of Device 2 (or content A (2805)).

Figure 28A:
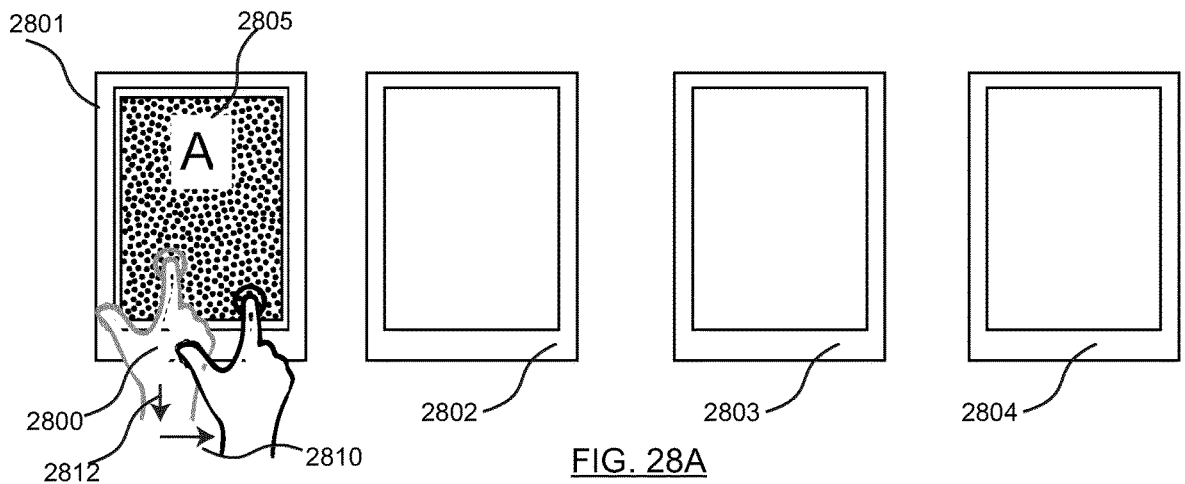
Figure 28B:
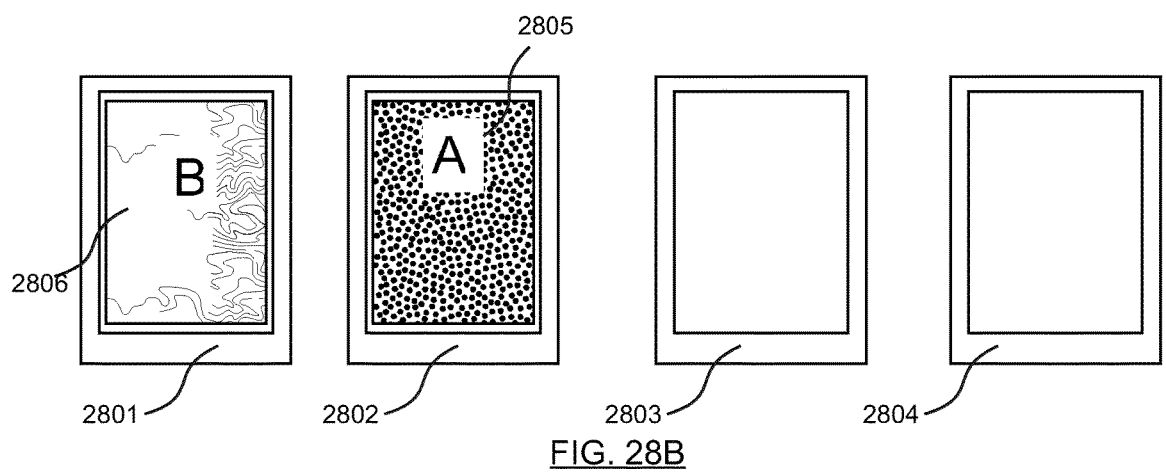
Figure 28C:
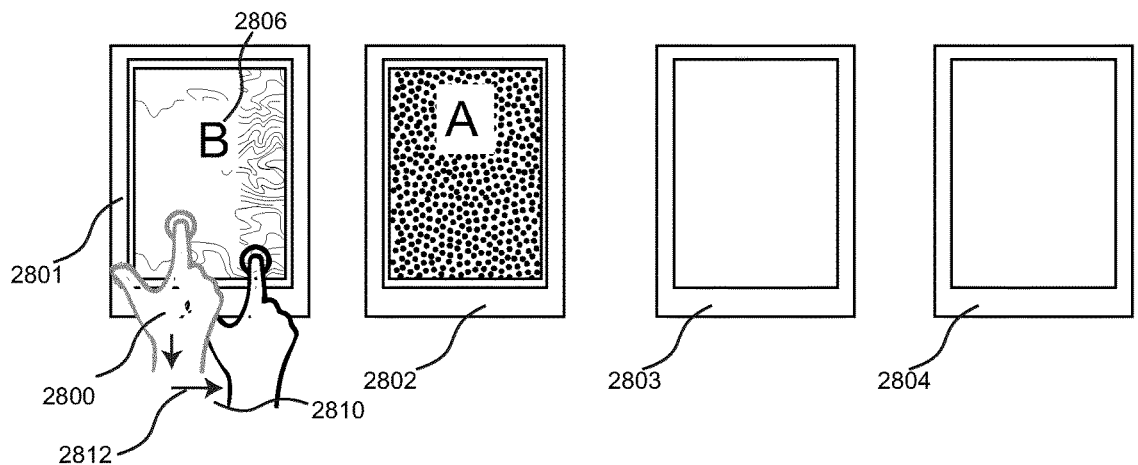
Figure 28D:
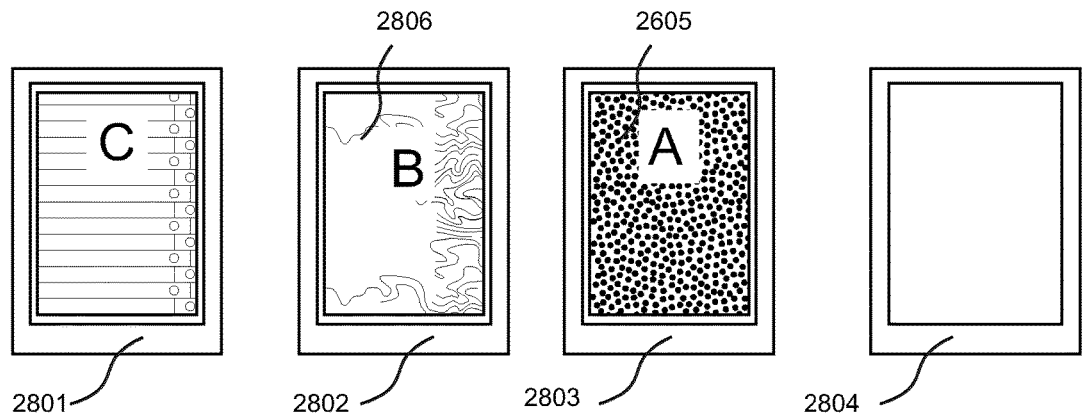
Figure 28E:
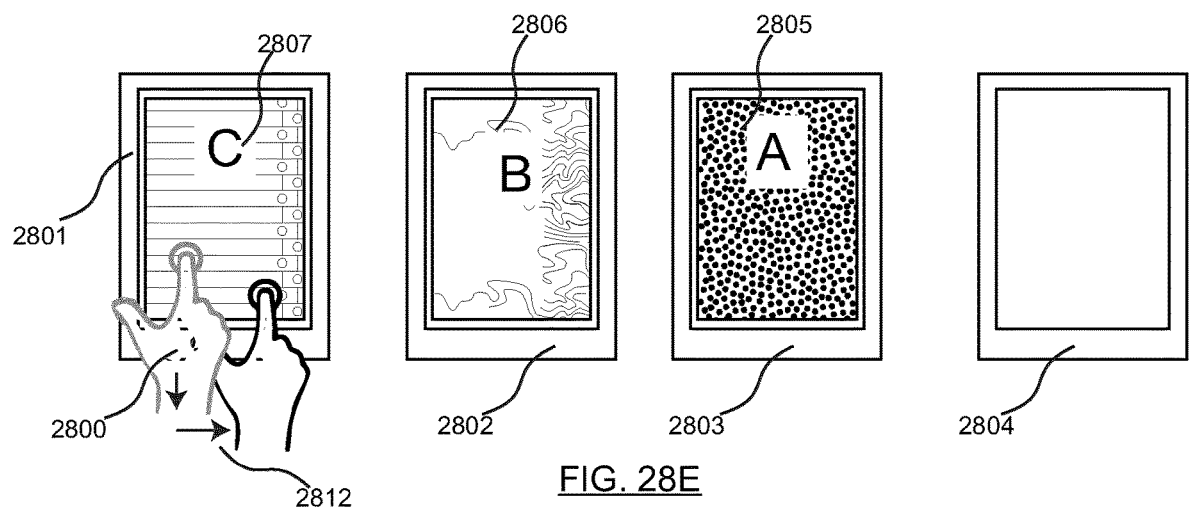
Figure 28F:
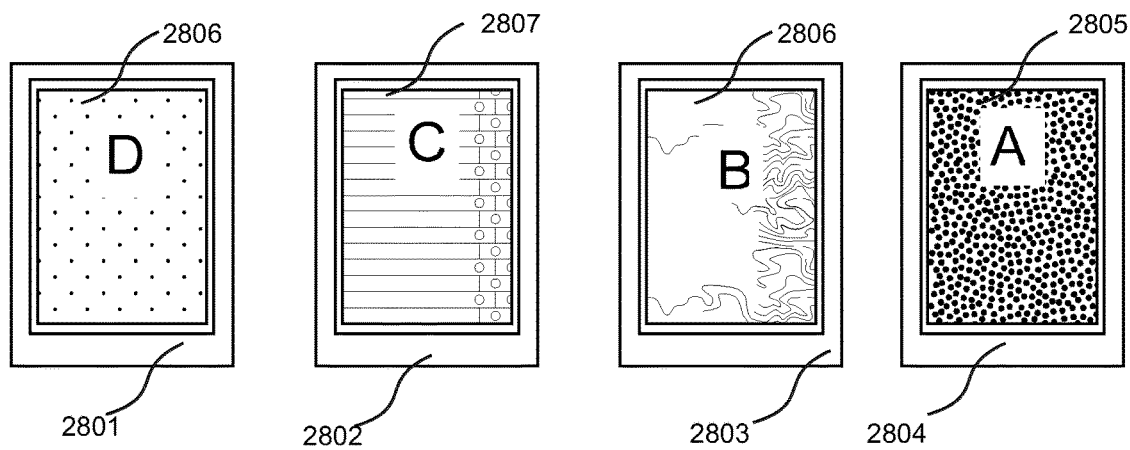

FIGS. 28E and 28F illustrate the performance and result of implementing the particular aforementioned compound gesture a third time. Following the pattern of steps discussed above, the Device 1 (2801) interprets the compound gesture (2812, 2810), which induces the identification of a cascade of TSOs and corresponding target contents that are particular to each of the subsequent devices. Accordingly, (i) the Device 1 updates itself using new content (e.g., content D (2808)) and propagates its previous content to the second device; (ii) Device 2 (2802) updates itself using the previous content of the first device (e.g., content C (2807)), and additionally, propagates its previous content to the third device; (iii) Device 3 updates itself using the previous content of the second device (e.g., content B (2806)), and subsequently, propagates its respective previous content to the fourth device; and lastly, (iv) Device 4 updates itself using the previous content of the third device (e.g., content A (2805)).

In another embodiment of the invention (see e.g., FIGS. 23A-24), the content propagation shown in FIGS. 28A-28F, may be achieved by: (i) Device 1 (2801) updating its content based on the command resulting from the compound gesture (2812, 2810), (ii) Device 1 (2801) sending a command message to a WMS (not shown); (iii) the WMS generating a command message for each of the devices that are to be updated with content and transmitting the generated command messages to each of the identified Devices (e.g., 2802, 2803, 2804). In such scenarios, the command message sent from the WMS may specify, e.g., that Device 1 (2801) is now displaying new content (2806). In response to receiving such a command message, each device (e.g., 2802, 2803, 2804) may determine what content to display based on the information in the received command message and the display mode of the device. For example, if Device 2 (2802) receives a command message from the WMS which specified that Device 1 (2801) is now displaying content (2806), then Device 2 (2802) determines using the command message and the display mode (e.g., cascade right) to display content (2805). In such scenarios, while the WMS transmits command messages between the devices, the interpretation of the command messages is performed on the individual devices.

Figure 29A:
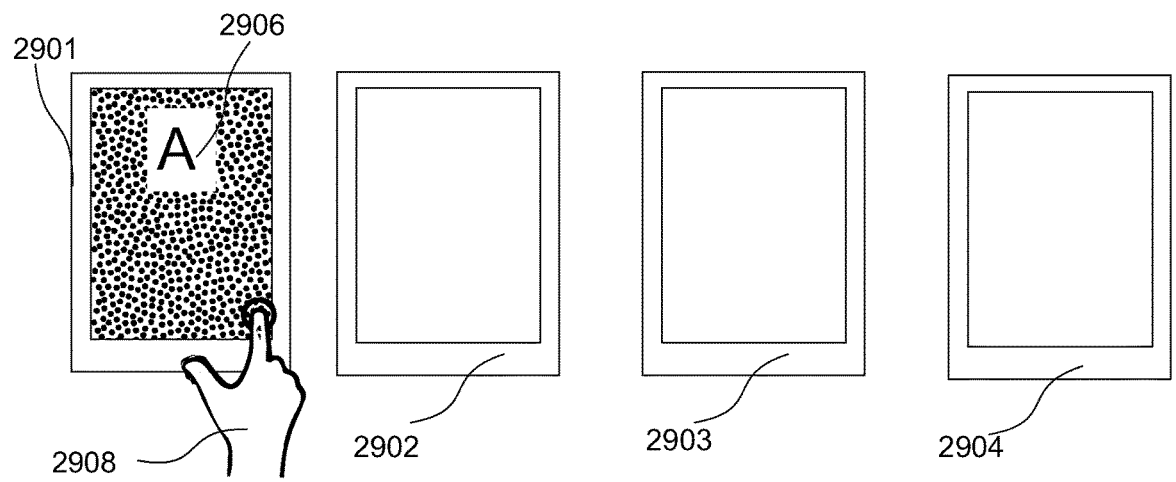
Figure 29B:
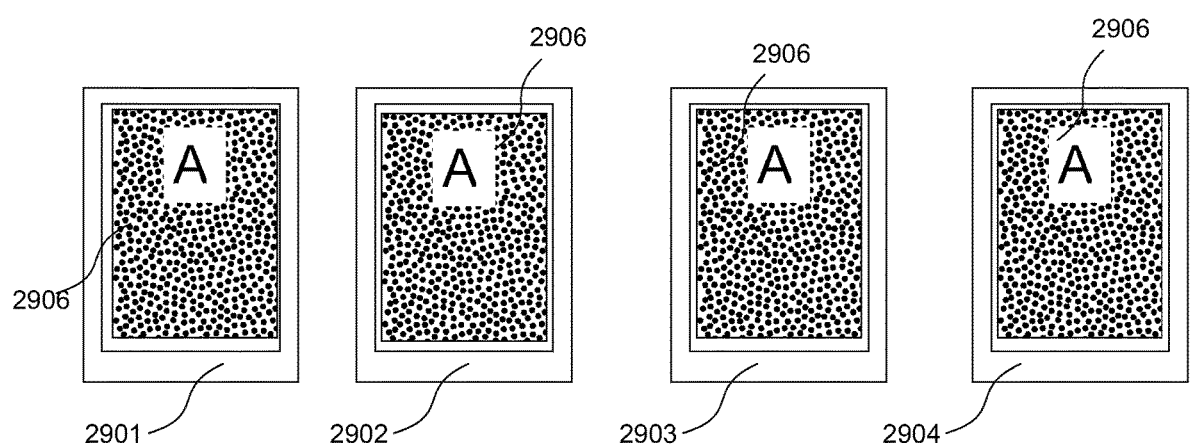

FIGS. 29A-29B shows the mirroring of content across devices in a multi-device workspace in accordance one or more embodiments of the invention. Referring to FIG. 29A, content (2906) is initially displayed on Device 1 (2901) and then the user subsequently performs a gesture (2908). Referring to FIG. 29B, in response to the gesture, Device 1 (2901) does not update its content but generates a command message to update the content of the other devices (2902, 2903, 2904) in the multi-device workspace and transmits the command message to the WMS (not shown). In this example, the command message specifies that the content displayed on Device 1 (2901) is to be mirrored across the other devices (2902, 2903, 2904). The WMS subsequently generates a command message for each of the devices which specifies that they are to display content (2906). The command message is subsequently sent to each of the devices (2902, 2903, 2904). The devices subsequently processes the command message, if necessary obtains the content (2906) from the WMS (or another source), and then displays the content (2906) as shown in FIG. 29B.

Figure 30A:
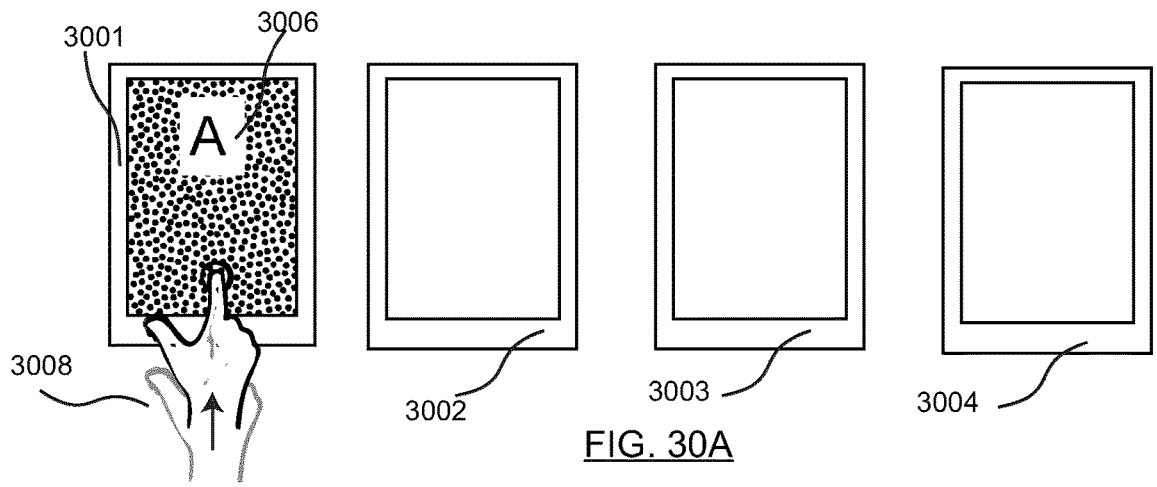
Figure 30B:
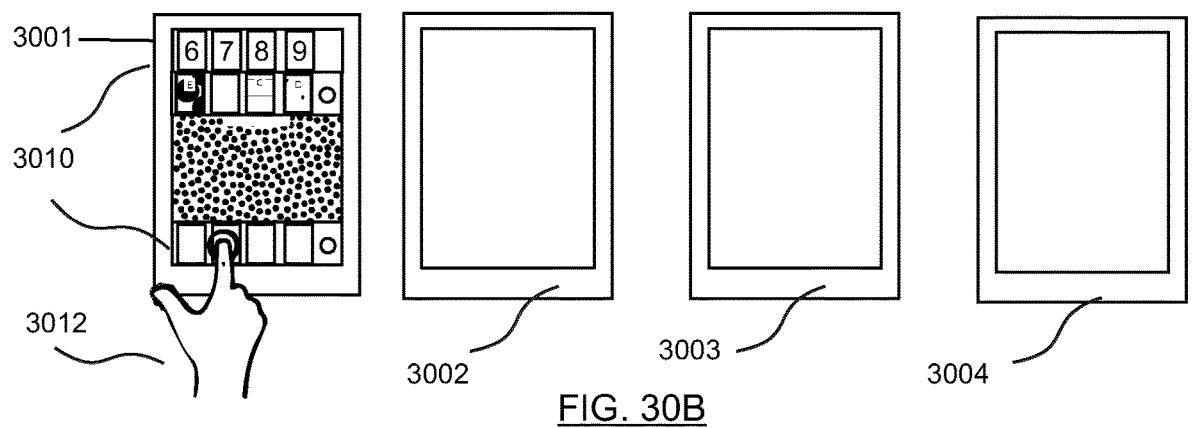
Figure 30C:
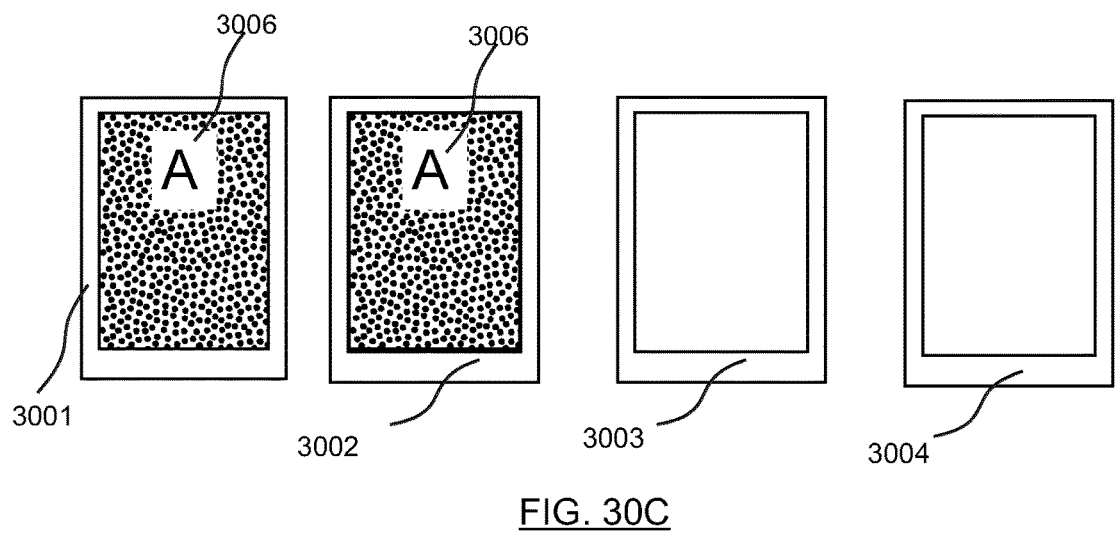

FIGS. 30A-30C shows the use of a complex user interface to modifies the content displayed on the device in accordance one or more embodiments of the invention. Referring to FIG. 30A, Device 1 (3001) initially displays content (3006). The user subsequently makes a gesture (3008), which is interpreted as a command to display a user interface (3010 in FIG. 30B). The user interface (3010) shows, e.g., a virtual layout of devices (including 3002, 3003, 3004) in a multi-device workspace along with all or a portion of content currently being displayed on each of the devices in the multi-device workspace. The user may subsequently select a device (i.e., 3002) in this example as the location on which to mirror the content (3006) currently shown in Device 1 (3001). In response to the user selection in the user interface (3010), the user interface is no longer displayed on Device 1 (3001) and the content (3006) is displayed on Device 2 (3002) (See e.g., FIG. 30C).

Figure 31:
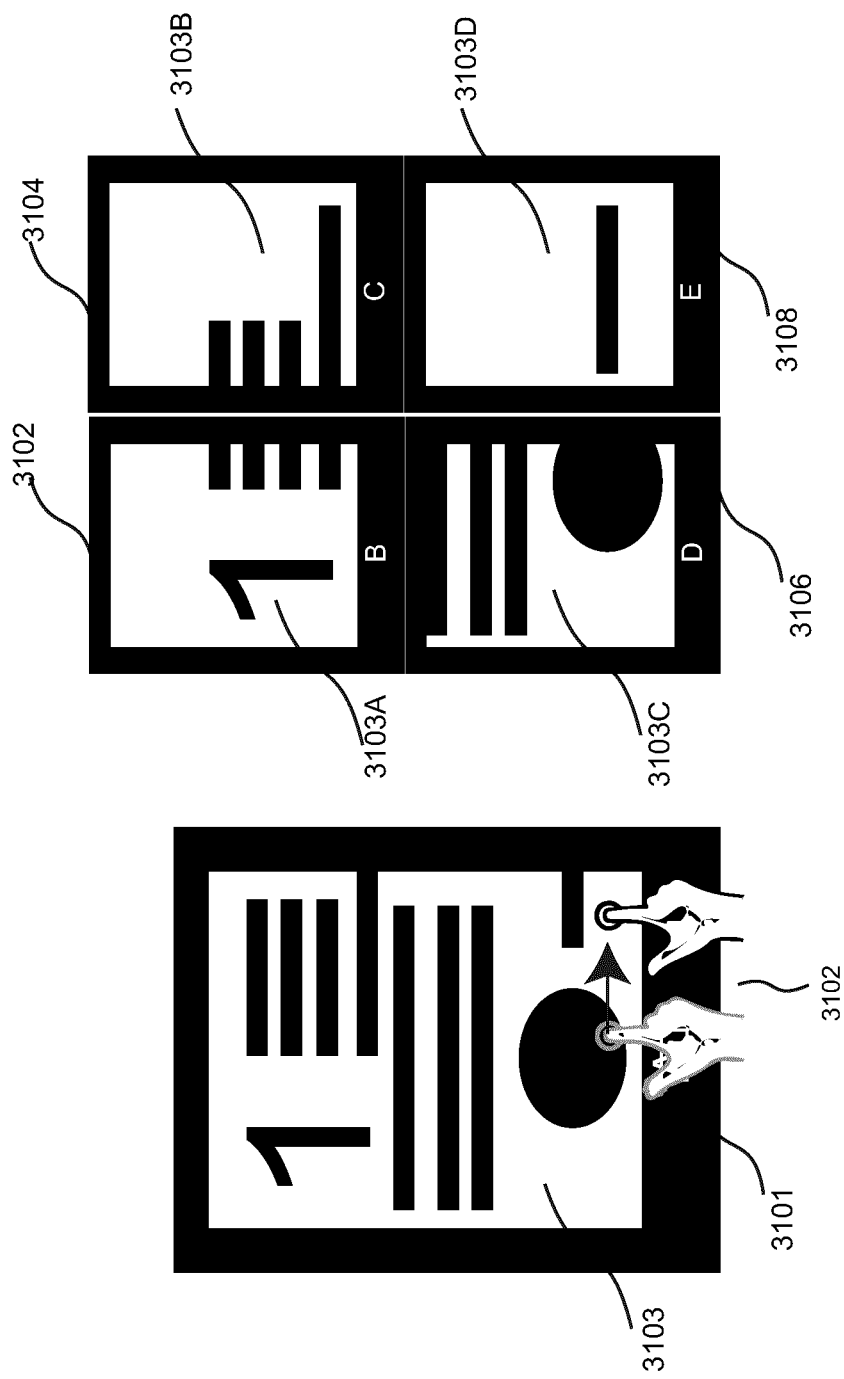

FIG. 31 shows the distribution of content from one device to multiple devices in a multi-device workspace in accordance one or more embodiments of the invention.

Consider a scenario in which content (3103) is initially displayed on Device 1 (3101). The user subsequently makes a gesture (3102) which is interpreted as command to display the content (3101) across devices (3102, 3104, 3106, 3108) in a multi-device workspace. A corresponding command message is generated and sent to the WMS. The WMS subsequently generates a command message for each of the devices (3102, 3104, 3016, 3108), where the command message specifies that content (3103) is to be displayed across the devices in the multi-device workspace. However, in this example, the WMS does not specify which portion of the content is to be displayed on each of the devices or the zoom level at which the content is to be displayed on each of the devices. Rather, each device upon receipt of the command message interprets the command message based on the display mode (which in this example is "big screen mode") and based on information about its location relative to the other devices in the multi-device workspace. Accordingly, each device determines which portion of the content (3103A, 3103B, 3103C, 3103D) it is to display along with the zoom level at which to display the content.

Alternatively, the determination of which portion of the content (3103) to display and the zoom level at which to display the content is performed by the WMS. The WMS subsequently generates command messages based on the aforementioned determination and then transmits the command messages to the devices, which subsequently process the command messages and display the appropriate portion of the content at the appropriate zoom level.

Figure 32A:
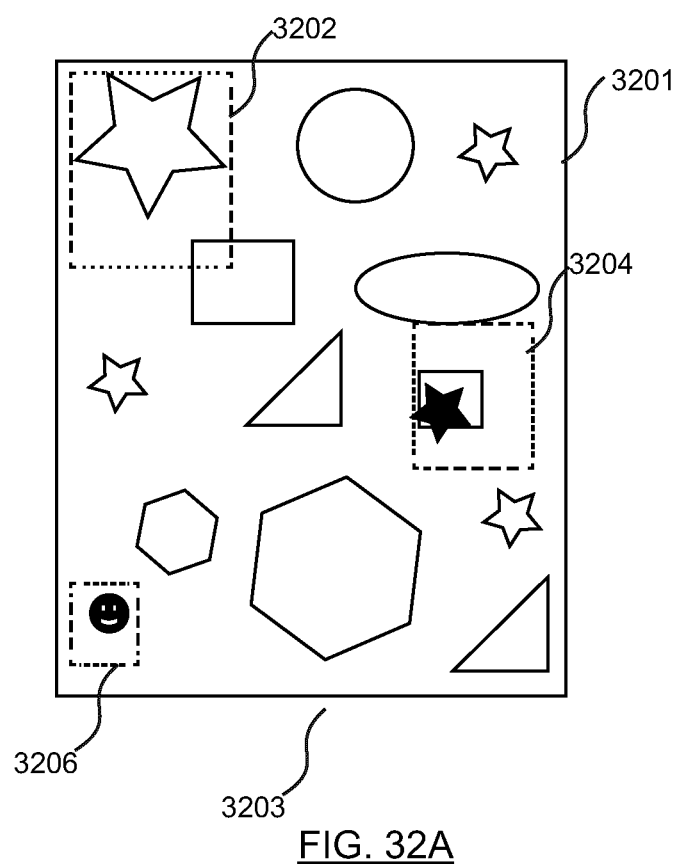
Figure 32B:
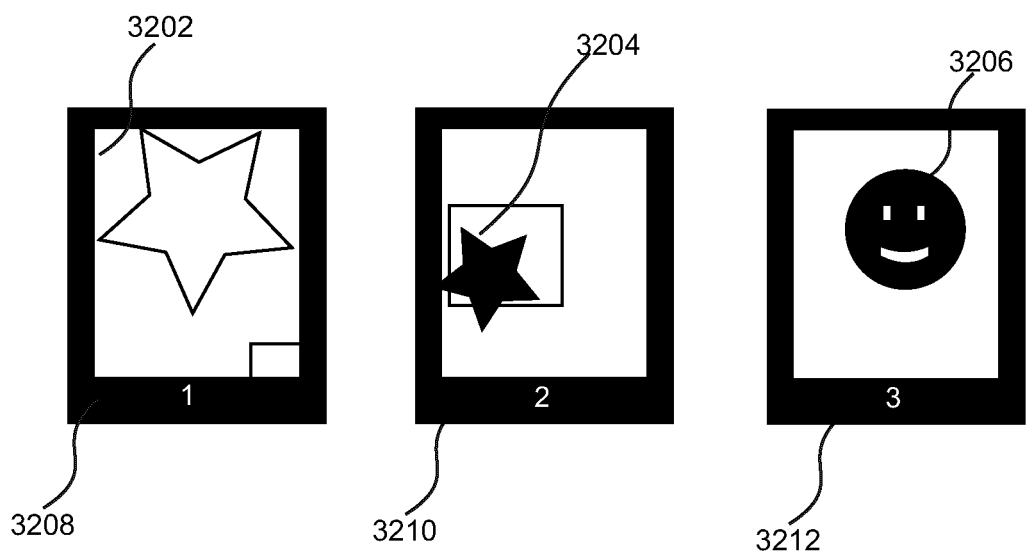

FIGS. 32A-32B show the transmission of selected portions of content from one device to a set of different devices in accordance with one or more embodiments of the invention.

Consider a scenario in which Device 1 (3203) initially displays content (3201). A user subsequently selects individual portions of the content (e.g., 3202, 3204, and 3206). The user, via gestures or a user interface, selects a target device for each portion of content. Command messages are subsequently generated which specify the selected content (3202, 3204, 3206) and target devices (e.g., 3208, 3210, 3212). The generated commands are transmitted to the WMS. The WMS, in turn, transmits each command message to the appropriate device. The devices, upon receipt of the command messages, process the command messages and display the selected content. In another embodiment of the invention, the virtual canvas includes the information displayed (3201), and each device's (3208, 3210, 3212) viewport information can be independently set to different areas of the virtual canvas. As shown on FIG. 32B, device 1 (3208) is set to display with certain viewport information (3202) at a given zoom level. Device 2 (3210) displays a different area (3204) of the virtual canvas (3201) and device 3 (3212) displays another area (3206) of the virtual canvas (3201), where users of all three devices (3208, 3210, 3212) are able to concurrently work in the same virtual canvas (3201) but with different viewport information. If the user at device 1 (3208) sends an appropriate command, the displayed information on device 1 (3208) will be displayed on one or more of the other devices, for instance device 2 (3210). This display mode may be referred as "snap view" mode.

Those skilled in the art will appreciate that embodiments of the invention are not limited to the aforementioned examples. The examples are merely provided to illustrate possible applications of embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for propagating content, comprising:
   detecting, from a user, an input on a first device, wherein the first device displays first content;
   interpreting the input to identify a command; and
   in response to the command:
      making a first determination to display second content on the first device;
      making a second determination to instruct a second device to display the first content; and
      in response to the second determination to instruct the second device to display the first content:
         generating a command message that instructs the second device to display the first content at a same relative location as displayed on the first device; and
         transmitting the command message to a workspace management system (WMS), wherein the second device is operatively connected to the WMS, wherein the WMS is a separate device from the first device and the second device.

2. The method of claim 1, further comprising:
   prior to detecting the input on the first device:
      setting a display mode of the first device, wherein the display mode is used to determine the second content.

3. The method of claim 2, wherein the display mode is one selected from a group consisting of cascade, snap view, and big screen mode.

4. The method of claim 1, further comprising:
receiving a second command message from the second device; and
displaying, in response to the second command message, third content on the first device.

5. The method of claim 4, wherein the second command message specified a second command, wherein displaying the third content on the first device comprises using the second command and a display mode associated with the first device.

6. The method of claim 4, wherein the first device and the second device are part of a multi-device workspace.

7. The method of claim 6, wherein the second command message specifies that the second device is displaying a first portion of a file and the third content corresponds to a second portion of the file.

8. The method of claim 1, wherein the command message specifies a second command to be executed on the second device.

9. The method of claim 8, wherein the command is a cascade command, a snap view command, or a big screen command.

10. The method of claim 1, wherein the command message specifies a second command to be executed on the second device and content identification information that identifies the first content.

11. The method of claim 1, wherein the command message specifies that the first device is displaying the second content.

12. The method of claim 1, further comprising:
receiving, from the WMS, a second command message;
in response to receiving the second command message:
providing a notification to the user informing of receipt of the second command message;
receiving from the user, in response to the notification, an acceptance of the second command message; and
in response to the acceptance, displaying third content on the first device.

13. The method of claim 12, wherein the notification is a visual notification on at least a portion of a display on the first device.

14. The method of claim 13, wherein the visual notification comprises at least a portion of the third content.

15. The method of claim 1, wherein the input comprises one selected from the group consisting of a touch screen finger gesture, a digital pen gesture, and a direct manipulation of a user interface (UI) control component.

16. The method of claim 1, wherein identifying the command comprises:
identifying a first gesture stroke sequence;
accessing a repository that comprises a plurality of gesture stroke sequences;
matching the first gesture stroke sequence with a second gesture stroke sequence of the plurality of gesture stroke sequences; and
identifying, based on the matching, the command.

17. The method of claim 1, wherein the first device is one selected from the group consisting of a smart interactive white board, a computer tablet, a smartphone, an electronic book reader, a computer integrated monitor, e-flipchart apparatus, and a smart television.

18. The method of claim 1, wherein identifying the command, comprises:
detecting a direct manipulation of a user interface (UI) control component; and
identifying, based on the detecting, the command.

19. The method of claim 1, further comprising:
after transmitting the command message to the WMS:
receiving a second command message from the WMS; and
displaying, based on the second command message, second content on the first device, wherein the second command message comprises content identification information.

20. The method of claim 19, wherein the first device is one selected from a group consisting of a smart interactive white board, a computer tablet, a smartphone, an electronic book reader, a computer integrated monitor, e-flipchart apparatus and a smart television.

* * * * *